US009824022B2

(12) United States Patent
    Gschwind

(10) Patent No.: US 9,824,022 B2
(45) Date of Patent: *Nov. 21, 2017

(54) ADDRESS TRANSLATION STRUCTURES TO PROVIDE SEPARATE TRANSLATIONS FOR INSTRUCTION FETCHES AND DATA ACCESSES

(71) Applicant: INTERNATIONAL BUSINESS MACHINES CORPORATION, Armonk, NY (US)

(72) Inventor: Michael K. Gschwind, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 217 days.

This patent is subject to a terminal disclaimer.

(21) Appl. No.: 14/485,676

(22) Filed: Sep. 13, 2014

(65) Prior Publication Data

US 2015/0278112 A1    Oct. 1, 2015

Related U.S. Application Data

(63) Continuation of application No. 14/231,669, filed on Mar. 31, 2014.

(51) Int. Cl.
    *G06F 12/10*        (2016.01)
    *G06F 12/1027*      (2016.01)
    *G06F 12/1045*      (2016.01)

(52) U.S. Cl.
    CPC ...... *G06F 12/1027* (2013.01); *G06F 12/1045* (2013.01); *G06F 2212/654* (2013.01); *G06F 2212/68* (2013.01)

(58) Field of Classification Search
    CPC . G06F 9/262; G06F 9/32; G06F 9/328; G06F 12/10; G06F 12/1009; G06F 12/1027; G06F 12/1036; G06F 12/1045
    See application file for complete search history.

(56) References Cited

U.S. PATENT DOCUMENTS 5,551,013 A    8/1996  Beausoleil et al.
5,574,873 A   11/1996  Davidian
              (Continued)

FOREIGN PATENT DOCUMENTS

WO    WO2013048468 A1    4/2013
WO    WO2013101139 A1    7/2013

OTHER PUBLICATIONS

"Intel® 64 and IA-32 Architectures Software Developer's Manual," Feb. 2014, cited as reference B1 in the second IDS filed Oct. 17, 2014 (Intel SDM).*
"Intel® 64 and IA-32 Architectures Software Developer's Manual—Combined vols. 1, 2A, 2B, 2C, 3A, 3B and 3C," Order No. 325462-050US, Feb. 2014, 3355 pages.
"MMU/SLB/TLB/ERAT"; http://seniordesign,engr.uidaho.edu/2008-2009/hot-threads/docs/TajResearch.docx, pp. 1-7, downloaded from internet Feb. 26, 2014 (no additional date information available).
"z/Architecture—Principles of Operation," IBM Publication No. SA22-7832-09, 10th Edition, Sep. 2012, pp. 1-1568.
(Continued)

*Primary Examiner* — Edward Dudek, Jr.
*Assistant Examiner* — Andrew Russell
(74) *Attorney, Agent, or Firm* — Heslin Rothenberg Farley & Mesiti P.C.

(57) ABSTRACT

An address translation capability in which information is obtained from an address translation structure to be used to translate a first address to a second address, the first address being of a first address type and the second address being of a second address type. The address translation structure includes a first set of information to translate the first address to one address of the second address type and a second set of information to translate the first address to another address of the second address type. To obtain the information, the first set of information or the second set of information is selected as the information to be used to translate the first address to the second address, based on an attribute of the first address.

9 Claims, 35 Drawing Sheets

(56) References Cited

U.S. PATENT DOCUMENTS

| | | | | |
|---|---|---|---|---|
| 5,574,877 A * | 11/1996 | Dixit | ............... | G06F 12/1027 |
| | | | | 711/207 |
| 5,682,495 A | 10/1997 | Beavers et al. | | |
| 5,790,825 A | 8/1998 | Traut | | |
| 6,009,261 A | 12/1999 | Scalzi et al. | | |
| 6,076,134 A * | 6/2000 | Nagae | ............... | G06F 8/66 |
| | | | | 711/1 |
| RE37,305 E | 7/2001 | Chang | | |
| 6,308,255 B1 | 10/2001 | Gorishek, IV et al. | | |
| 6,349,380 B1 | 2/2002 | Shahidzadeh et al. | | |
| 6,427,162 B1 * | 7/2002 | Mohamed | ............... | G06F 12/1036 |
| | | | | 711/E12.065 |
| 6,446,034 B1 | 9/2002 | Egolf | | |
| 6,463,582 B1 | 10/2002 | Lethin et al. | | |
| 6,915,406 B2 * | 7/2005 | Chiba | ............... | G06F 12/1027 |
| | | | | 711/158 |
| 7,124,275 B2 | 10/2006 | Gammel et al. | | |
| 7,146,607 B2 | 12/2006 | Nair et al. | | |
| 7,159,095 B2 | 1/2007 | Dale et al. | | |
| 7,251,811 B2 | 7/2007 | Rosner et al. | | |
| 7,284,112 B2 * | 10/2007 | Bradford | ............... | G06F 12/1036 |
| | | | | 711/202 |
| 7,366,829 B1 * | 4/2008 | Luttrell | ............... | G06F 11/1064 |
| | | | | 711/108 |
| 7,376,807 B2 | 5/2008 | Moyer | | |
| 7,475,220 B1 | 1/2009 | Hastings | | |
| 7,487,330 B2 | 2/2009 | Altman et al. | | |
| 8,141,099 B2 * | 3/2012 | DeWitt, Jr. | ............... | G06F 9/30094 |
| | | | | 710/24 |
| 8,255,880 B2 | 8/2012 | DeWitt, Jr. et al. | | |
| 8,479,195 B2 | 7/2013 | Adams et al. | | |
| 2005/0015378 A1 | 1/2005 | Gammel et al. | | |
| 2006/0004941 A1 | 1/2006 | Shah et al. | | |
| 2006/0075146 A1 | 4/2006 | Schoinas et al. | | |
| 2006/0161758 A1 | 7/2006 | Bradford et al. | | |
| 2007/0079294 A1 | 4/2007 | Knight et al. | | |
| 2007/0174553 A1 | 7/2007 | Morrow et al. | | |
| 2008/0282055 A1 * | 11/2008 | Yang | ............... | G06F 12/1027 |
| | | | | 711/207 |
| 2009/0019252 A1 | 1/2009 | Burns et al. | | |
| 2009/0172713 A1 | 7/2009 | Kim et al. | | |
| 2010/0153776 A1 | 6/2010 | Vick et al. | | |
| 2010/0228943 A1 | 9/2010 | Deshpande et al. | | |
| 2011/0173411 A1 | 7/2011 | Chen et al. | | |
| 2011/0320758 A1 | 12/2011 | Craddock et al. | | |
| 2012/0144167 A1 | 6/2012 | Yates, Jr. et al. | | |
| 2012/0198427 A1 | 8/2012 | Schmidt | | |
| 2012/0255015 A1 | 10/2012 | Sahita et al. | | |
| 2012/0331262 A1 | 12/2012 | Gyuris et al. | | |
| 2013/0326143 A1 | 12/2013 | Chen | | |
| 2014/0075123 A1 | 3/2014 | Hildesheim et al. | | |
| 2015/0032999 A1 * | 1/2015 | Muff | ............... | G06F 9/30149 |
| | | | | 712/210 |
| 2015/0278084 A1 | 10/2015 | Bybll et al. | | |
| 2015/0278085 A1 | 10/2015 | Bybell et al. | | |
| 2015/0278107 A1 | 10/2015 | Gschwind et al. | | |
| 2015/0278108 A1 | 10/2015 | Gschwind | | |
| 2015/0278110 A1 * | 10/2015 | Gschwind | ............... | G06F 13/1663 |
| | | | | 711/137 |
| 2015/0278111 A1 | 10/2015 | Gschwind et al. | | |
| 2015/0278112 A1 * | 10/2015 | Gschwind | ............... | G06F 12/1045 |
| | | | | 711/205 |

OTHER PUBLICATIONS

Gschwind, M., E.R. Altman, "Precise Exception Semantics in Dynamic Compilation," 2002 Symposium on Compiler Construction (CC 2002), Grenoble, France, Apr. 2002, 15 pages.

Hutchinson, Luke, "Memory Address Translation," http://www.altdevblogaday.com/2011/07/24/memory-address-translation/, downloaded from internet Mar. 6, 2014, pp. 1-8.

Intel Itanium Architecture Software Developer's Manual vol. 2: System Architecture, Document No. 245318-005, Jan. 2006, pp. 1-654.

Mell, Peter and Tim Grance, "The NIST Definition of Cloud Computing," National Institute of Standards and Technology, Information Technology Laboratory, Version 15, Oct. 7, 2009, pp. 1-2.

Pagiamtzis, K. and A. Sheikholeslami, "Content-addressable memory (CAM) circuits and architectures: A tutorial and survey," IEEE Journal of Solid-State Circuits, vol. 41, No. 3, pp. 712-727, Mar. 2006.

Bybell, Anthony J., "Separate Memory Address Translations for Instruction Fetches and Data Accesses," U.S. Appl. No. 14/231,599, filed Mar. 31, 2014, 103 pages.

Gschwind, Michael K., et al., "Hierarchical Translation Structures Providing Separate Translations for Instruction Fetches and Data Accesses," U.S. Appl. No. 14/231,665, filed Mar. 31, 2014, 98 pages.

Gschwind, Michael K., "Address Translation Structures to Provide Separate Translations for Instruction Fetches and Data Accesses," U.S. Appl. No. 14/231,669, filed Mar. 31, 2014, 117 pages.

Office Action for U.S. Appl. No. 14/231,665 dated Sep. 24, 2015, pp. 1-21.

Office Action for U.S. Appl. No. 14/485,291 dated Feb. 12, 2016, pp. 1-20.

Office Action for U.S. Appl. No. 14/231,669 dated Feb. 12, 2016, pp. 1-28.

Final Office Action for U.S. Appl. No. 14/231,665 dated Mar. 10, 2016, pp. 1-22.

Office Action for U.S. Appl. No. 14/484,342 dated Apr. 29, 2016, pp. 1-44.

Office Action for U.S. Appl. No. 14/231,599 dated May 4, 2016, pp.

Power ISA TM Version 2.07, May 3, 2013, pp. 1-1496.

Sun, Jianhua, et al. "Kernel Code Integrity Protection Based on a Virtualized Memory Architecture." Computing an Information 32.2 (2013): 295-311.

Frederick. "Processor Architectures: Harvard, von Neumann, and Modified Harvard Architectures", Embedded Matters. Published Feb. 5, 2010. <http://embeddedknowledge.blogspot.com/2012/02processorarchitecturesharvardvon.html>.

Final Office Action, dated Mar. 6, 2017, U.S. Appl. No. 14/231,669, 23 pages.

Notice of Allowance and Fee(s) Due, dated Mar. 8, 2017, U.S. Appl. No. 14/231,665, 18 pages.

Notice of Allowance and Fee(s) Due, dated Mar. 8, 2017, U.S. Appl. No. 14/485,291, 18 pages.

Notice of Allowance and Fee(s) Due, dated Apr. 6, 2017, U.S. Appl. No. 14/231,599, 17 pages.

Notice of Allowance and Fee(s) Due, dated Apr. 6, 2017, U.S. Appl. No. 14/484,342, 15 pages.

* cited by examiner

EFFECTIVE TO REAL ADDRESS TRANSLATION (ERAT) 1300

| EFFECTIVE ADDRESS | PHYSICAL ADDRESS | NOA |
|---|---|---|
| 1304 | 1306 | 1308 |
| EFFECTIVE ADDRESS | PHYSICAL ADDRESS | NOA |

1302 → (first row)

FIG. 13A

TRANSLATION LOOKASIDE BUFFER (TLB) 1350

| VIRTUAL ADDRESS | PHYSICAL ADDRESS | NOA |
|---|---|---|
| 1354 | 1356 | 1358 |
| VIRTUAL ADDRESS | PHYSICAL ADDRESS | NOA |

1352 → (first row)

FIG. 13B

6-TRANSISTOR SRAM CELL

BINARY CAM CELL

TERNARY CAM CELL

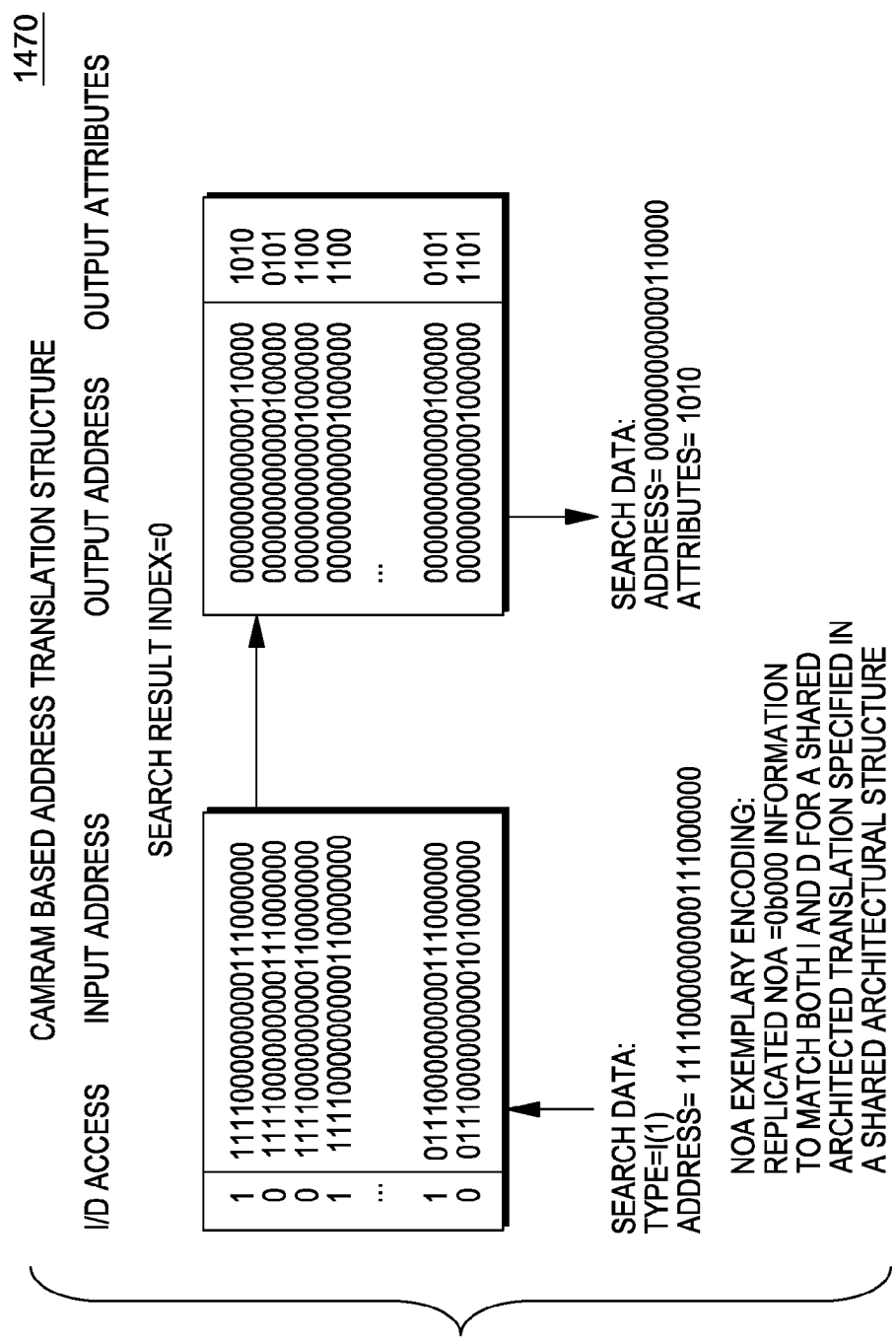

ADDRESS TRANSLATION STRUCTURES TO PROVIDE SEPARATE TRANSLATIONS FOR INSTRUCTION FETCHES AND DATA ACCESSES

CROSS-REFERENCE TO RELATED APPLICATIONS

This application is a continuation of co-pending U.S. patent application Ser. No. 14/231,669, filed Mar. 31, 2014, entitled "ADDRESS TRANSLATION STRUCTURES TO PROVIDE SEPARATE TRANSLATIONS FOR INSTRUCTION FETCHES AND DATA ACCESSES," which is hereby incorporated herein by reference in its entirety.

BACKGROUND

One or more aspects relate, in general, to processing within a computing environment, and in particular, to memory accesses within the computing environment.

System configurations include physical memory used to store applications and data. The amount of physical memory is fixed and often inadequate to support the needs of users. Therefore, to provide additional memory or at least the appearance of additional memory, a memory management technique, referred to as virtual memory, is utilized. Virtual memory uses virtual addressing, which provides ranges of addresses that can appear to be much larger than the physical size of main memory.

To access main memory in a system configuration that includes virtual memory, a memory access is requested that includes an effective address. The effective address is translated into a real address used to access the physical memory.

Translation is performed using an address translation technique. Several address translation techniques are available. For instance, in PowerPC systems offered by International Business Machines Corporation, an effective address is translated to a corresponding real address by way of page table entries found by selecting an effective segment identifier (ESID) table entry associated with the effective address, and using the entry to locate a group of page table entries by way of a hashing algorithm. In a further example, in the z/Architecture, also offered by International Business Machines Corporation, an effective address is translated to a corresponding real address by way of a hierarchy of translation tables. Translation tables are indexed by a portion of the effective address to find the address of the next translation table of the hierarchy until a real (or absolute) address is obtained. Both address translation techniques provide advantages to their respective operating systems.

SUMMARY

Shortcomings of the prior art are overcome and advantages are provided through the provision of a method of facilitating address translation. The method includes, for instance, obtaining, by a processor, information from an address translation structure to be used to translate a first address to a second address, the first address being of a first address type and the second address being of a second address type, the address translation structure including a first set of information to translate the first address to one address of the second address type and a second set of information to translate the first address to another address of the second address type, the first set of information and the second set of information concurrently stored within the address translation structure to provide multiple addresses of the second address type to which the first address can be translated, and wherein the obtaining the information to be used to translate the first address includes selecting, based on an attribute of the first address, the first set of information or the second set of information as the information obtained to be used to translate the first address to the second address; and translating the first address to the second address using the information obtained from the address translation structure, the second address being the one address of the second address type or the another address of the second address type depending on the information obtained.

Computer program products and systems relating to one or more embodiments are also described and claimed herein. Further, services relating to one or more embodiments are also described and may be claimed herein.

Additional features and advantages are realized. Other embodiments and aspects are described in detail herein and are considered a part of the claimed invention.

BRIEF DESCRIPTION OF THE SEVERAL VIEWS OF THE DRAWINGS

One or more aspects are particularly pointed out and distinctly claimed as examples in the claims at the conclusion of the specification. The foregoing and other objects, features, and advantages are apparent from the following detailed description taken in conjunction with the accompanying drawings in which:

FIG. 13A depicts one embodiment of an effective to real address translation structure;

FIG. 13B depicts one embodiment of a translation lookaside buffer;

FIG. 14F depicts another example of a CAMRAM address translation structure;

DETAILED DESCRIPTION

In accordance with one or more aspects, address translation structures and address translation techniques are provided that enable separate memory address translations based on attributes associated with the addresses to be translated. In one particular example, a capability is provided to enable separate memory address translations for instruction fetches and data accesses to regions of memory, while providing common memory address translations to other regions of memory. This enables, for instance, transparency when code modifications occur by enabling the view of the memory as seen by the programs fetching instructions to be fenced off as compared to that of the data accesses.

Computing environments of different architectures may incorporate and use one or more aspects of the address translation capability provided herein. For instance, environments based on the PowerPC architecture, also referred to as Power ISA, offered by International Business Machines Corporation (IBM®) and described in Power ISA™ Version 2.07, May 3, 2013, hereby incorporated by reference herein in its entirety, may include one or more aspects, as well as computing environments of other architectures, such as the z/Architecture, offered by International Business Machines Corporation, and described in z/Architecture—Principles of Operation, Publication No. SA22-7832-09, 10th Edition, September 2012, which is hereby incorporated by reference herein in its entirety.

POWER, POWER ARCHITECTURE, POWERPC, Z/ARCHITECTURE, IBM, AIX, POWERVM, Z/OS and Z/VM (referenced herein) are registered trademarks of International Business Machines Corporation, Armonk, N.Y. Other names used herein may be registered trademarks, trademarks or product names of International Business Machines Corporation or other companies.

Figure 1:
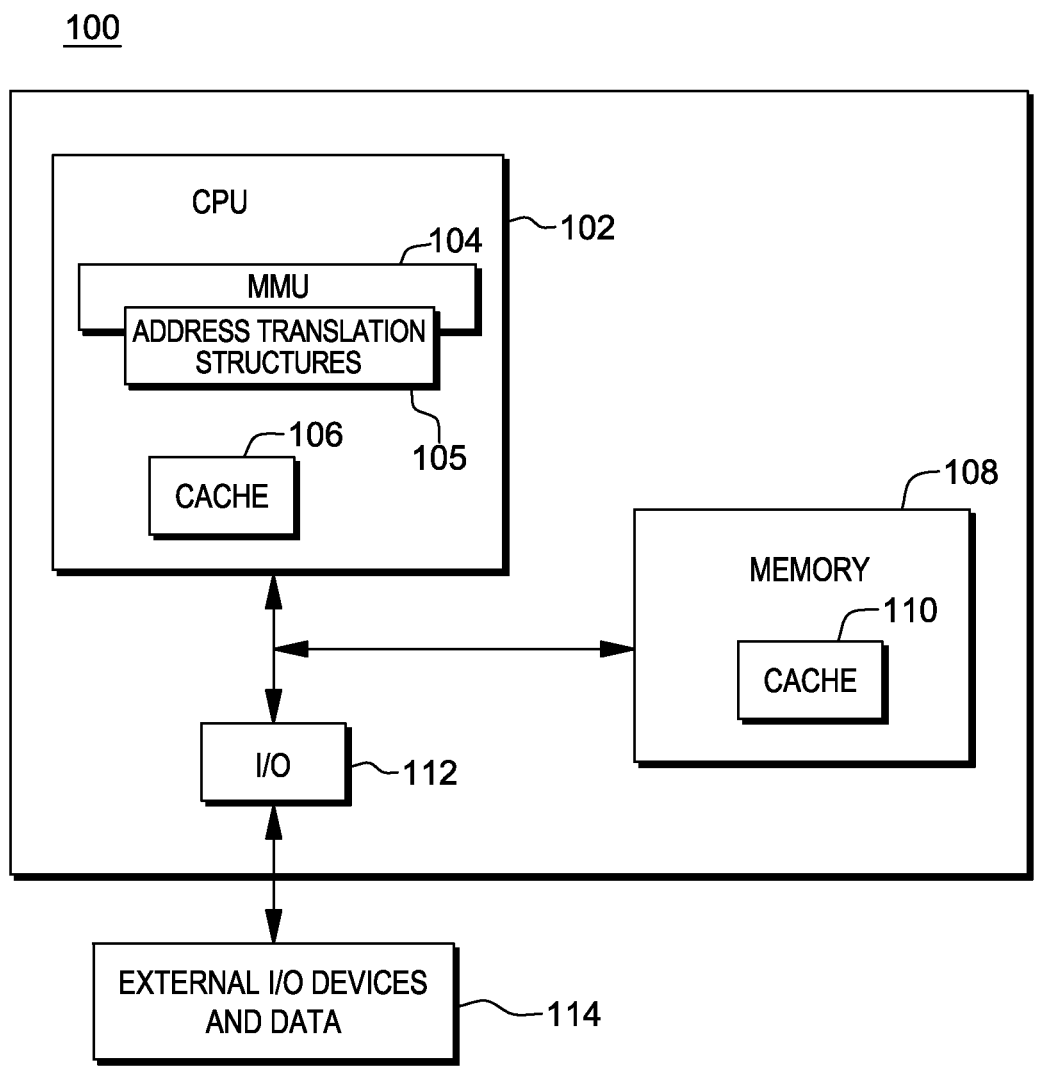
FIG. 1 depicts one example of a computing environment to incorporate and use one or more aspects of an address translation capability.

One example of a computing environment to incorporate and use one or more aspects of the address translation capability is described with reference to FIG. 1. In one example, a computing environment 100 includes a processor (central processing unit—CPU) 102 that includes at least one memory management unit (MMU) 104, one or more address translation structures 105, and one or more caches 106. Processor 102 is communicatively coupled to a memory portion 108 having one or more caches 110, and to an input/output (I/O) subsystem 112. I/O subsystem 112 is communicatively coupled to external I/O devices 114 that may include, for example, data input devices, sensors and/or output devices, such as displays.

Memory management unit 104 is used in managing memory portion 108 including facilitating access to the memory by providing address translation. To improve address translation, the memory management unit utilizes one or more address translation structures 105 including, for instance, a translation lookaside buffer (TLB) and a segment lookaside buffer (SLB), which, in one embodiment, are located in the MMU. In a further embodiment, address translation structures 105 also include an effective to real address translation (ERAT) structure, which is, e.g., located in the processor outside the MMU.

Figure 2:
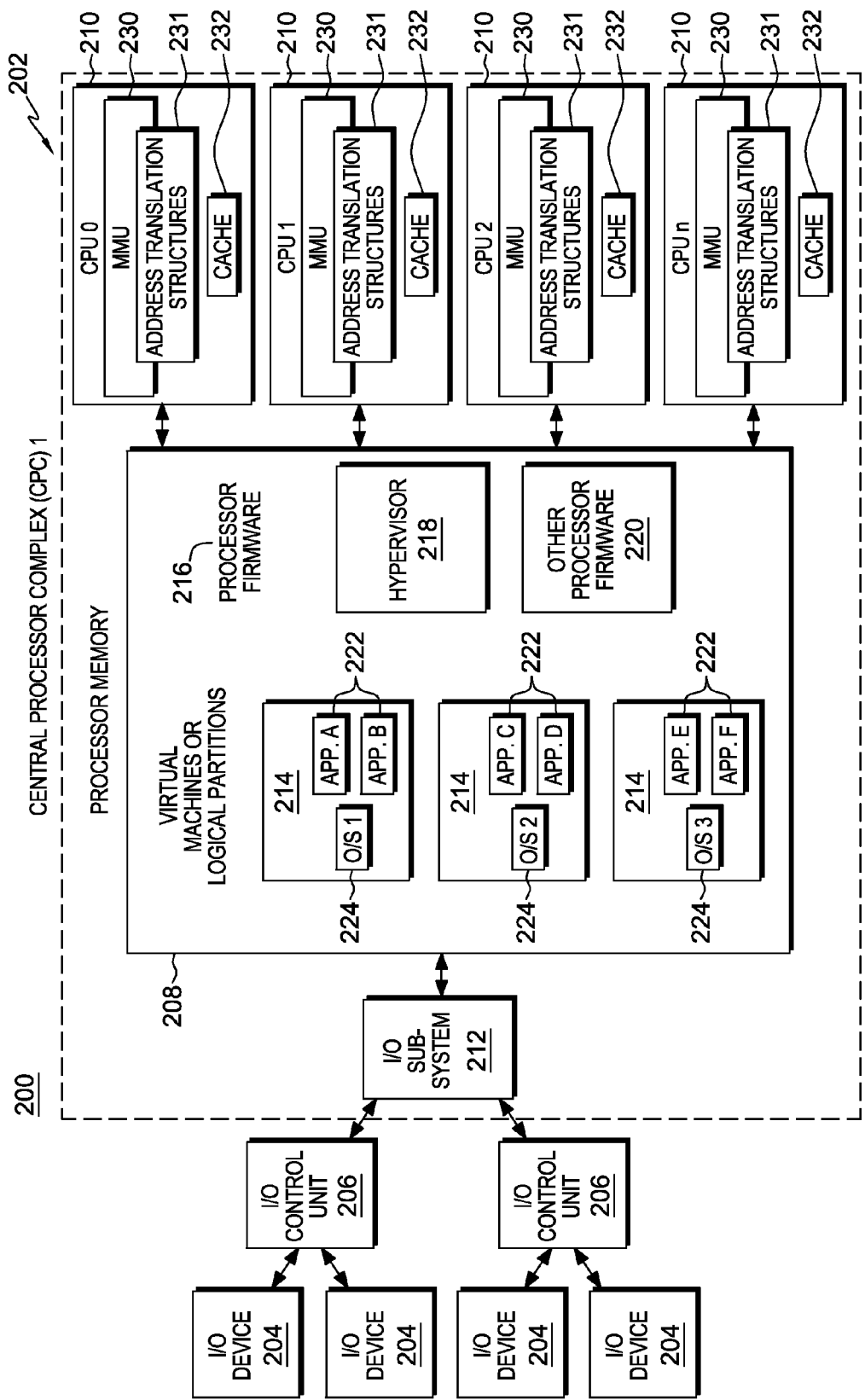
FIG. 2 depicts another example of a computing environment to incorporate and use one or more aspects of an address translation capability.

A further embodiment of a computing environment to incorporate and use one or more aspects of the address translation capability is depicted in FIG. 2. Referring to FIG. 2, in one example, a computing environment 200 includes a central processor complex (CPC) 202 coupled to one or more input/output (I/O) devices 204 via one or more control units 206. Central processor complex 202 includes processor memory 208 (a.k.a., main memory, main storage, central storage) coupled to one or more central processors (a.k.a., central processing units (CPUs)) 210 and an I/O subsystem 212, each of which is further described below.

Processor memory 208 includes one or more virtual machines 214 (for one example of the PowerPC architecture) or one or more logical partitions 214 (for one example of the z/Architecture), and processor firmware 216, which includes a hypervisor 218 and other processor firmware 220. As used herein, firmware includes, e.g., the microcode and/or millicode of the processor. It includes, for instance, the hardware-level instructions and/or data structures used in implementation of higher level machine code. In one embodiment, it includes, for instance, proprietary code that is typically delivered as microcode that includes trusted software or microcode specific to the underlying hardware and controls operating system access to the system hardware.

Each virtual machine or logical partition 214 functions as a separate system and has one or more applications 222, and optionally, a resident operating system 224 therein, which may differ for each virtual machine or logical partition. In one embodiment, the operating system is the z/VM operating system, the z/OS operating system, the z/Linux operating system, the TPF operating system, the AIX operating system, the Power Linux operating system, the IBM i/OS operating system, or another operating system offered by International Business Machines Corporation, Armonk, N.Y.; or another operating system offered by another company. The virtual machines are managed by hypervisor 218, such as PowerVM, offered by International Business Machines Corporation, Armonk, N.Y.; and the logical partitions are managed by hypervisor 218, such as the Processor Resource/System Manager (PR/SM), offered by International Business Machines Corporation, Armonk, N.Y.

Central processors 210 are physical processor resources assignable to the virtual machines or allocated to the logical partitions. For instance, each virtual machine or logical partition 214 includes one or more logical processors, each of which represents all or a share of a physical processor 210 that may be dynamically allocated to the virtual machine or partition. A central processor may include a memory management unit (MMU) 230 and one or more address translation structures 231 providing the address translation capability described herein, as well as at least one cache 232.

Input/output subsystem 212 directs the flow of information between input/output devices 204 and main memory 208. It is coupled to the central processing complex, in that it can be a part of the central processing complex or separate therefrom. The I/O subsystem relieves the central processors of the task of communicating directly with the input/output devices and permits data processing to proceed concurrently with input/output processing. To provide communications, the I/O subsystem employs I/O communications adapters. There are various types of communications adapters including, for instance, channels, I/O adapters, PCI cards, Ethernet cards, Small Computer Storage Interface (SCSI) cards, etc. Further, the I/O subsystem uses one or more input/output paths as communication links in managing the flow of information to or from input/output devices 204.

Figure 3A:
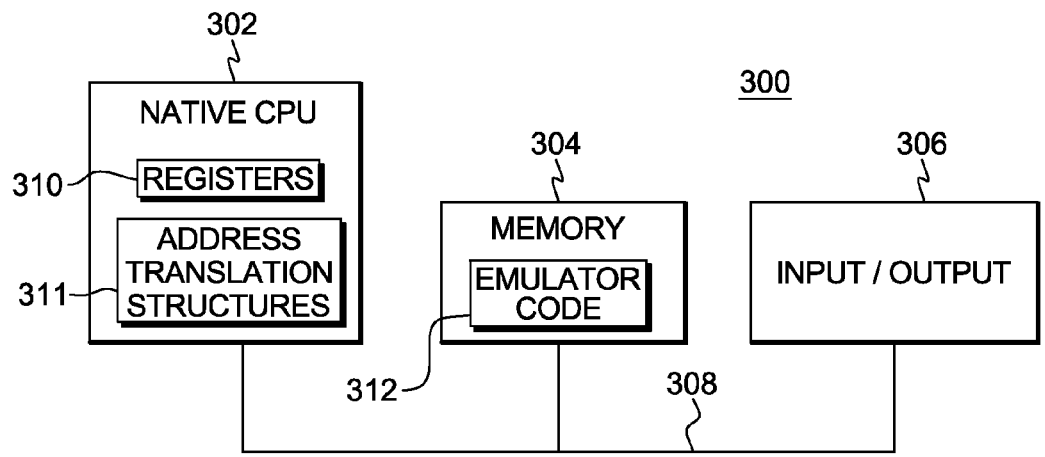
FIG. 3A depicts yet another example of a computing environment to incorporate and use one or more aspects of an address translation capability.

Another embodiment of a computing environment to incorporate and use one or more aspects of the address translation capability is described with reference to FIG. 3A. In this example, a computing environment 300 includes, for instance, a native central processing unit (CPU) 302, a memory 304, and one or more input/output devices and/or interfaces 306 coupled to one another via, for example, one or more buses 308 and/or other connections. As examples, computing environment 300 may include a PowerPC processor, or a Power Systems server offered by International Business Machines Corporation, Armonk, N.Y.; an HP Superdome with Intel Itanium II processors offered by Hewlett Packard Co., Palo Alto, Calif.; and/or other machines based on architectures offered by International Business Machines Corporation, Hewlett Packard, Intel, Oracle, or others.

Native central processing unit 302 includes one or more native registers 310, such as one or more general purpose registers and/or one or more special purpose registers used during processing within the environment, as well as one or more address translation structures 311. These registers include information that represent the state of the environment at any particular point in time.

Moreover, native central processing unit 302 executes instructions and code that are stored in memory 304. In one particular example, the central processing unit executes emulator code 312 stored in memory 304. This code enables the computing environment configured in one architecture to emulate another architecture. For instance, emulator code 312 allows machines based on architectures other than the z/Architecture, such as PowerPC processors, Power Systems servers, HP Superdome servers or others, to emulate the z/Architecture and to execute software and instructions developed based on the z/Architecture, or allows machines based on architectures other than the Power Architecture, such as HP Superdome Servers or others, to emulate the Power Architecture and to execute software and instructions developed based on the Power Architecture.

Figure 3B:
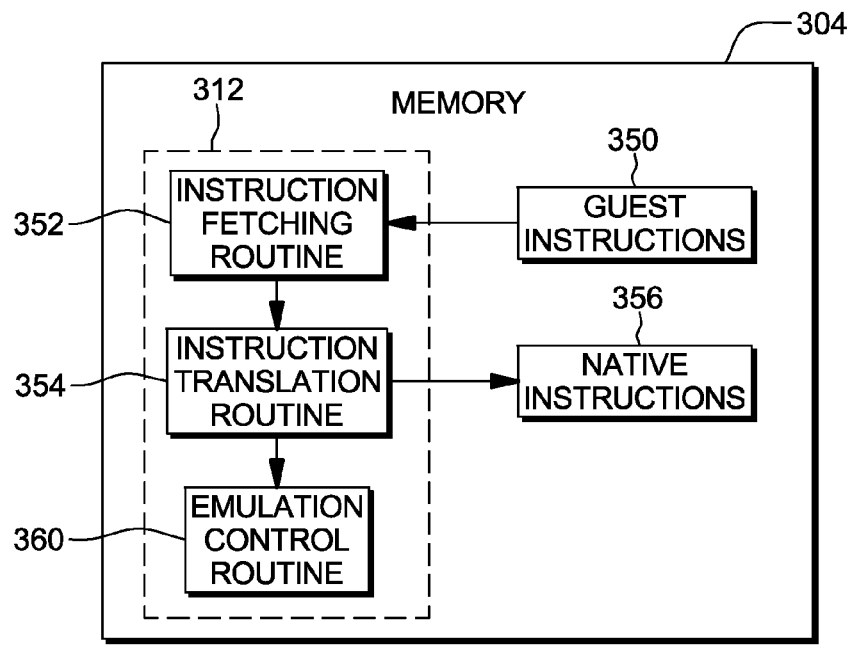
FIG. 3B depicts further details of the memory of FIG. 3A.

Further details relating to emulator code 312 are described with reference to FIG. 3B. Guest instructions 350 stored in memory 304 comprise software instructions (e.g., correlating to machine instructions) that were developed to be executed in an architecture other than that of native CPU 302. For example, guest instructions 350 may have been designed to execute on a Power Architecture or z/Architecture processor 102, but instead, are being emulated on native CPU 302, which may be, for example, an Intel Itanium II processor. In one example, emulator code 312 includes an instruction fetching routine 352 to obtain one or more guest instructions 350 from memory 304, and to optionally provide local buffering for the instructions obtained. It also includes an instruction translation routine 354 to determine the type of guest instruction that has been obtained and to translate the guest instruction into one or more corresponding native instructions 356. This translation includes, for instance, identifying the function to be performed by the guest instruction and choosing the native instruction(s) to perform that function.

Further, emulator code 312 includes an emulation control routine 360 to cause the native instructions to be executed. Emulation control routine 360 may cause native CPU 302 to execute a routine of native instructions that emulate one or more previously obtained guest instructions and, at the conclusion of such execution, return control to the instruction fetch routine to emulate the obtaining of the next guest instruction or a group of guest instructions. Execution of the native instructions 356 may include loading data into a register from memory 304; storing data back to memory from a register; or performing some type of arithmetic or logic operation, as determined by the translation routine.

Each routine is, for instance, implemented in software, which is stored in memory and executed by native central processing unit 302. In other examples, one or more of the routines or operations are implemented in firmware, hardware, software or some combination thereof. The registers of the emulated processor may be emulated using registers 310 of the native CPU or by using locations in memory 304. In embodiments, guest instructions 350, native instructions 356 and emulator code 312 may reside in the same memory or may be disbursed among different memory devices.

The computing environments described above are only examples of computing environments that can be used. Other environments, including but not limited to, other non-partitioned environments, other partitioned environments, and/or other emulated environments, may be used; embodiments are not limited to any one environment.

Computing environments, such as those described above, are enhanced by including components that alter application programs executing within the environments to provide those application programs with additional features. For instance, a component, referred to as dynamic code optimization (DCO), may be provided that examines programs as they are executing, recognizes frequently executed code segments and optimizes those segments. Other types of optimization are also possible, as well as other types of components. Further, changes may be made to programs for other reasons, such as correcting an error, providing workarounds for known hardware errata, enhancing security, etc.

Changing a program while it is executing is complicated and issues may arise. For instance, if a program references itself, i.e., it is self-referential, it may detect the change and refuse to run or the change may cause it to run improperly due to it being self-referential. An example of a self-referential code may be a binary that validates its own correctness by computing the checksum of its program code, and comparing the computed result with an expected result to avoid tampering. Thus, in accordance with one aspect, a capability is provided that allows applications to be modified, while preserving self-referential integrity.

In one example, for dynamic code optimization, code that is not frequently used is maintained unchanged, and code that is frequently used, referred to as hot spots, are dynamically compiled into optimized code and the pre-existing code is patched to integrate the optimized code into the existing code generating patched code. Then, to transfer to the optimized code, the original binary is modified (patched) by inserting a jump instruction to jump to the optimized code and when done, another jump instruction is inserted to jump back to the original code.

Figure 4:
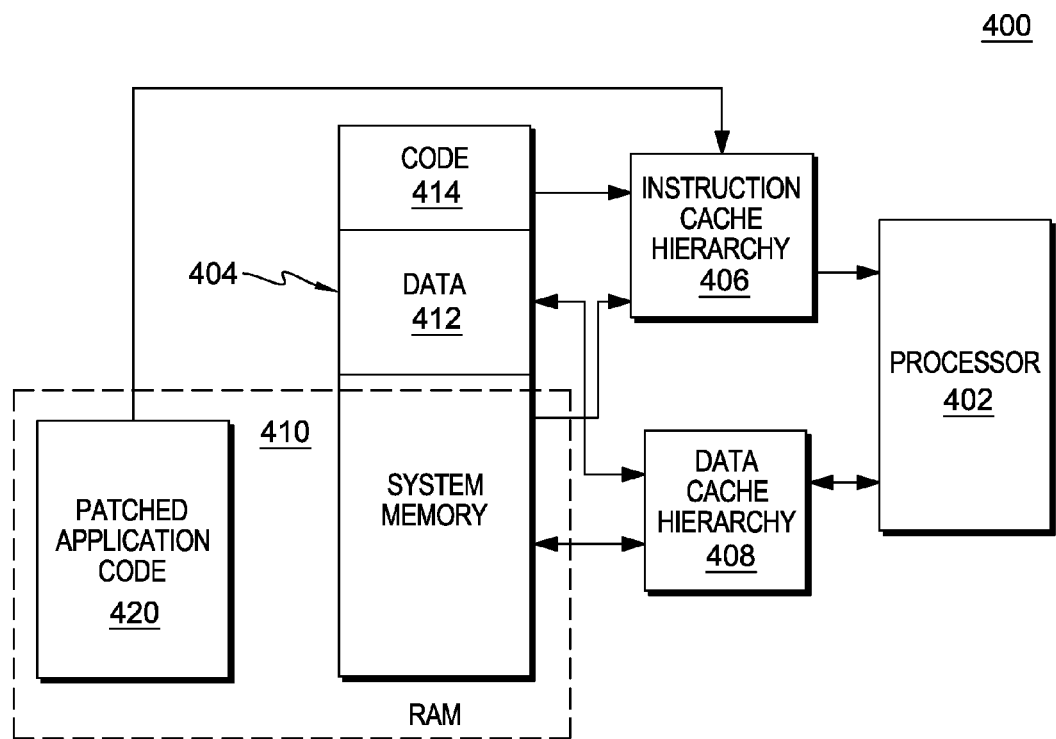
FIG. 4 depicts one example of a computing environment including patched application code.

One example of a computing environment that includes patched code is depicted in FIG. 4. This computing environment is based, for instance, on the PowerPC architecture offered by International Business Machines Corporation, however many other systems may incorporate and use one or more of the aspects described herein. As shown, a computing environment 400 includes, for instance, a processor 402 coupled to a memory 404 via one or more caches 406, 408. Memory 404 is, for instance, random access memory, having a plurality of portions, including, for example, system memory 410, data memory 412, and code memory 414 (also referred to as instruction memory). In one example, system memory 410 includes application code, including, for instance, patched application code 420, and/or data for one or more applications; data memory 412 is memory used by, for instance, an optimizer; and code memory 414 is, for instance, code of the optimizer. Code memory 414 is coupled to instruction cache 406 accessed by processor 402; and data memory 412 and system memory 410 are coupled to data cache 408 accessed by processor 402. Further, system memory 410, including patched application code 420, is also coupled to instruction cache 406.

When code is patched, in accordance with one or more aspects, separate address translation is provided, which depends, for instance, on whether the translation is for an instruction fetch or a data access. For instance, data accesses (e.g., address translation for data accesses) are directed to the unmodified code (i.e., one or more first memory regions), while code translation (e.g., address translation for instruction fetches) is directed to the modified code (i.e., one or more second memory regions). Additionally, instruction fetches and data accesses for code of the application that has not been copied are directed to the same pre-existing code, which are also stored in the one or more first memory regions, in this example. This separate address translation capability, in conjunction with the memory mapping in, for instance, FIG. 4, allows the view of memory from the instruction fetcher to be fenced off, enabling the use of patched code while maintaining referential integrity.

Figure 5:
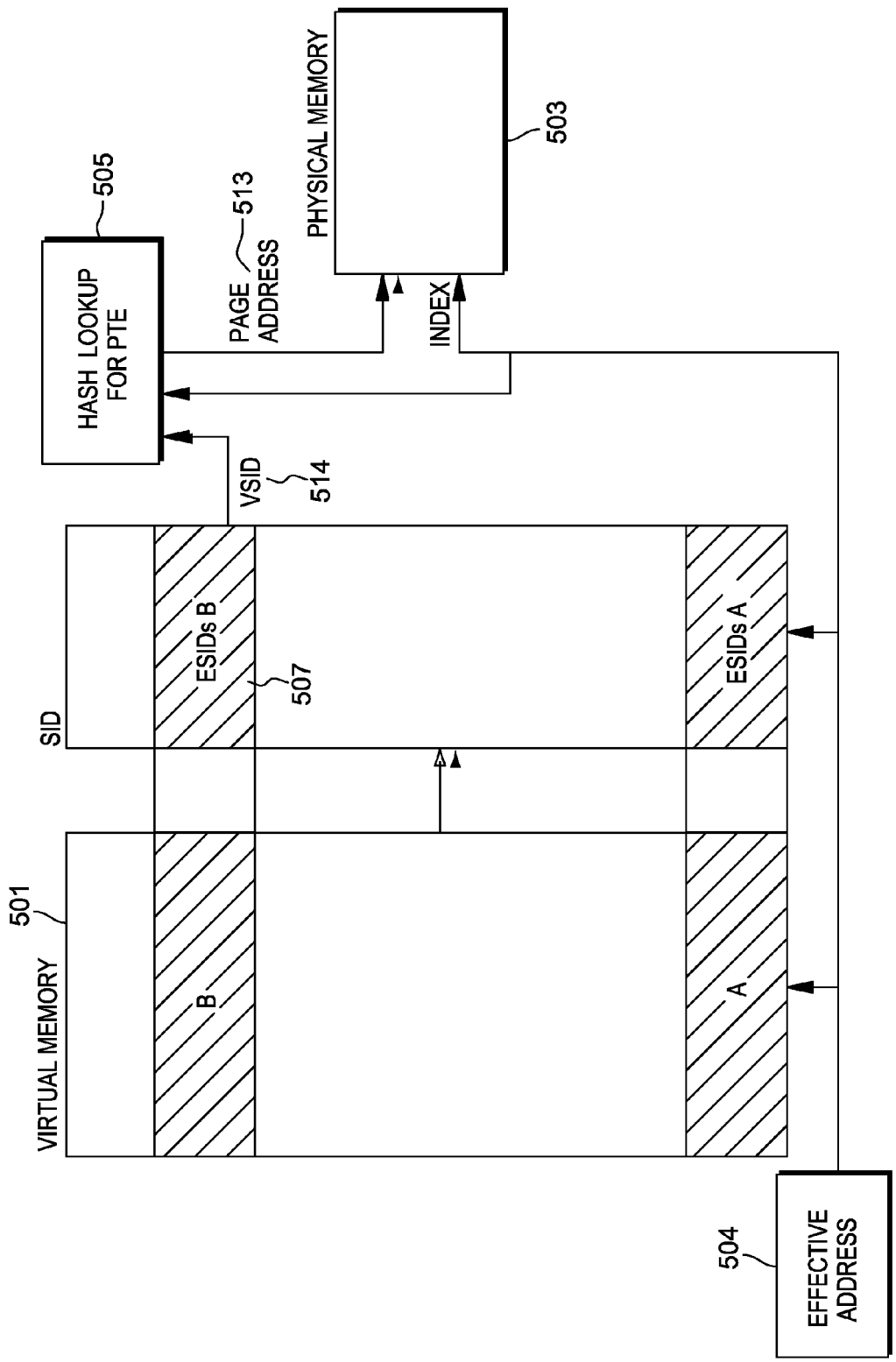
FIG. 5 illustrates an example of a high-level view of a virtual memory mapped to a physical memory using a hash page table technique.

Further details regarding the physical memory used by one or more of the computing environments described herein and access thereto are described with reference to FIG. 5. As is known, physical memory is of a defined size and in order to have the physical memory appear larger than it is, virtual memory is utilized. One example of a high-level view of virtual memory 501 mapped to a physical memory 503 (such as memory 108, 208, 304, 404 or a portion thereof) is depicted in FIG. 5. In this example, the mapping from virtual memory to real memory is via a hash page table (HPT) technique 505 to locate page table entries (PTEs), as used by, for example, Power ISA. In this example, programs only use sections A and B of the virtual memory. Each segment of the virtual memory is mapped to a segment identifier (SID) entry 507 identified by an effective segment ID (ESID) (ESIDs for B and ESIDs for A included). An "effective address" 504 used by the program selects an SID entry, which includes the ESID value, as well as a virtual segment ID (VSID) 514 value. The VSID value represents the high-order bits of a virtual address to be used by hashing algorithm 505 to search the hash page table. A hashed value based on the VSID is used to locate a page table entry (PTE). The page table entry includes an address 513 of a page of physical memory 503.

Figure 6:
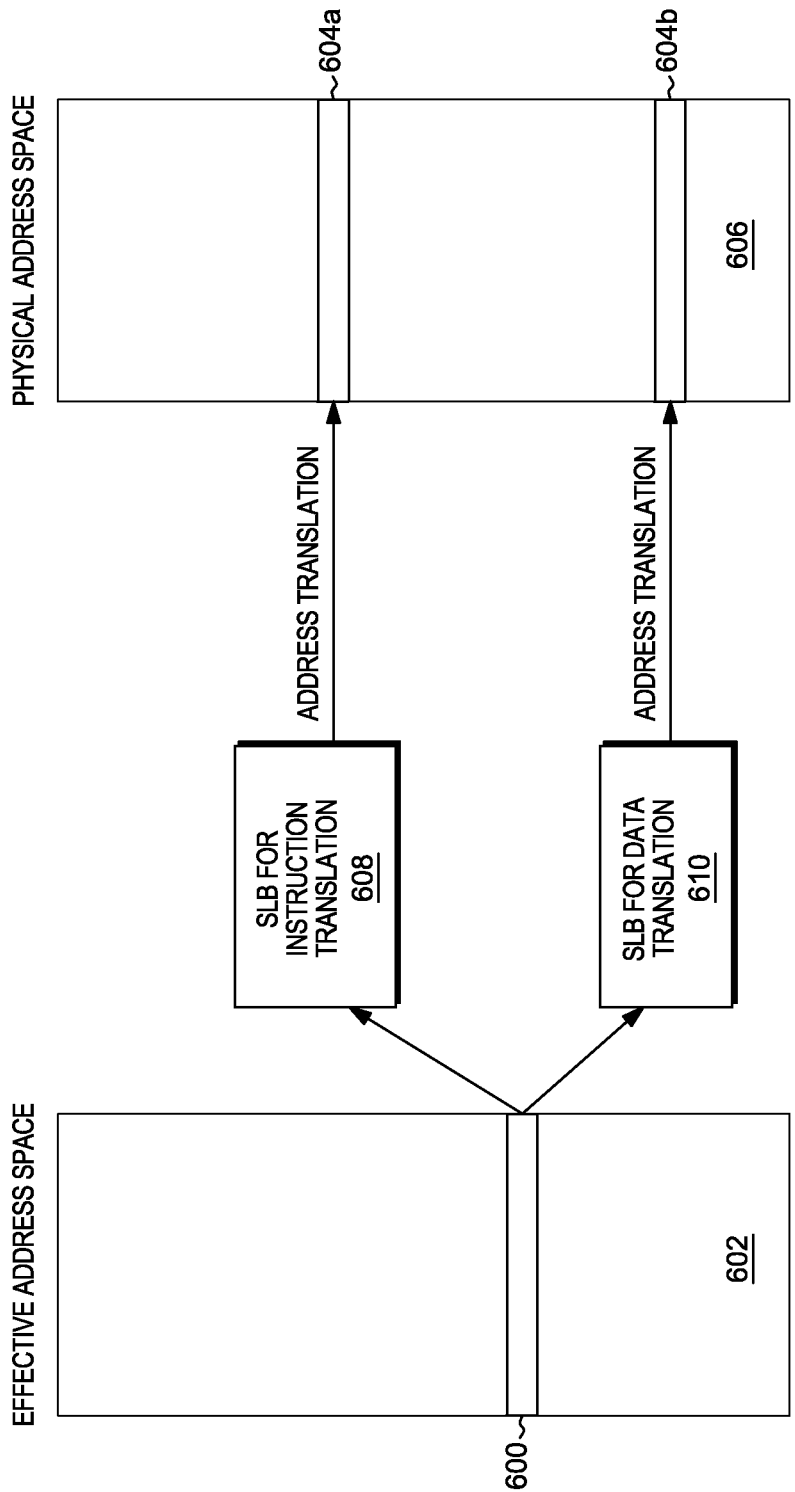
FIG. 6 depicts one example in which one effective address is able to be translated to different physical addresses.

As indicated above, an effective address is used to obtain a physical address in order to access a particular memory location. In accordance with one aspect, as depicted in FIG. 6, one effective address 600 in an effective address space 602 may translate to multiple physical addresses 604a, 604b of a physical address space 606 depending on whether the translation is for an instruction translation 608 or a data translation 610. This allows, for instance, the view of memory the instruction fetcher sees to be fenced off from the view of the data accesses.

In particular, in accordance with one aspect, an address translation capability is described in which the address translation takes into consideration whether the memory access is for an instruction fetch or a data access. One embodiment of address translation is described with reference to FIGS. 7-10. The particular example described herein is for the PowerPC architecture; however, aspects of the address translation capability are not limited to such an architecture.

Figure 7:
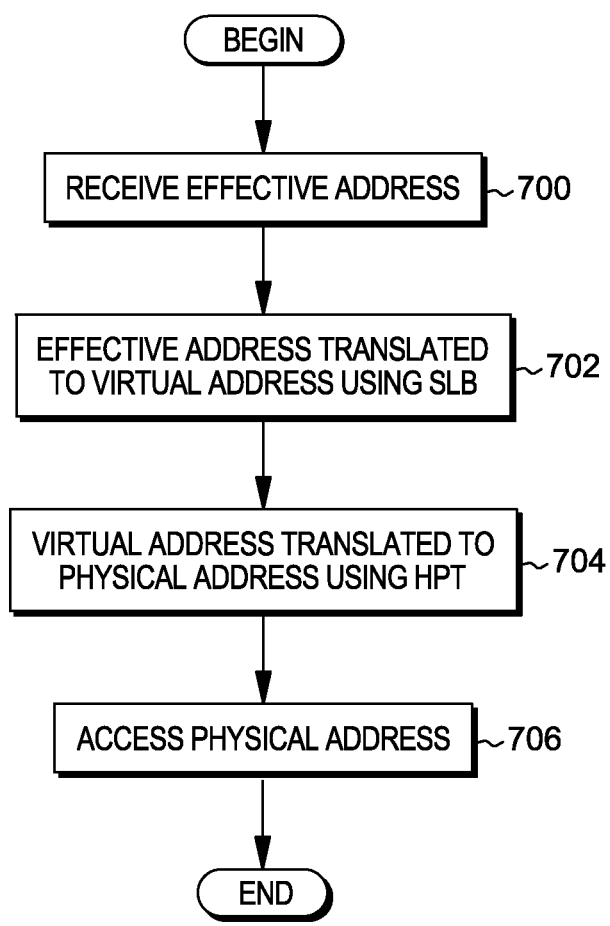
FIG. 7 depicts one embodiment of an address translation process.

Initially, referring to FIG. 7, a memory management unit (MMU) of a processor receives an effective address to be translated, STEP 700. The effective address is, for instance, a 64-bit address that may be received in an address translation request from the processor. As examples, the request may be from an instruction fetch unit of the processor, and therefore, the address to be translated is assumed to be for an instruction fetch, or the request may be from a load/store unit of the processor, and therefore, the address to be translated is assumed to be for a data access. In other embodiments, an indication in the request indicates whether the address translation is for an instruction fetch or a data access. The MMU translates the effective address to a virtual address, STEP 702. In one example, the translation from the effective address to the virtual address uses a segment lookaside buffer (SLB), as described further below. The MMU then translates the virtual address to a physical address, STEP 704. In one particular example, the translation from the virtual address to the physical address uses a hash page table, again as described further below. The MMU then uses the physical address to access the particular memory location, STEP 706.

Figure 8:
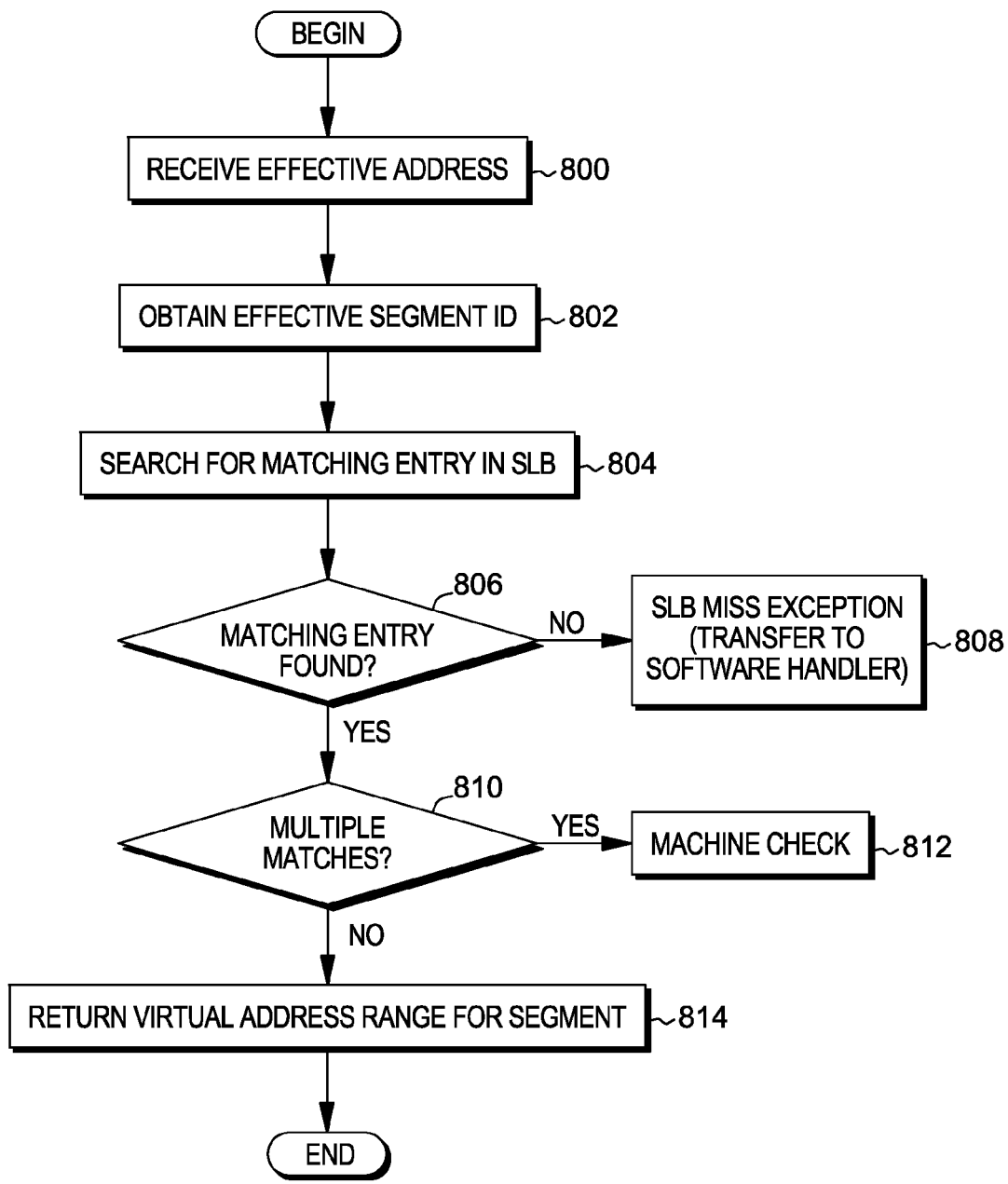
FIG. 8 depicts one embodiment of logic to translate an effective address to a virtual address.

Further details regarding translating from the effective address to the virtual address, by, for instance, the MMU are described with reference to FIGS. 8 and 9. Referring initially to FIG. 8, the MMU receives an effective address via, for instance, an address translation request sent from a particular unit (e.g., instruction fetch, load/store unit) of the CPU, STEP 800. Based on receiving the effective address, the MMU determines whether the address is for an instruction fetch or a data access. This can be determined, in one example, based on which unit (e.g., fetch unit or load/store unit of the CPU) the MMU received the address translation request or by an indicator associated with the request, as examples. For instance, if the address translation request came from the fetch unit, then it is assumed that the request is for an instruction fetch, and if it came from the load/store unit, it is assumed it is for a data access. Based on receiving the effective address, the MMU obtains an effective segment identifier from the effective address, STEP 802. The MMU then uses the effective segment identifier to search a segment lookaside buffer for a matching entry, STEP 804.

Figure 9:
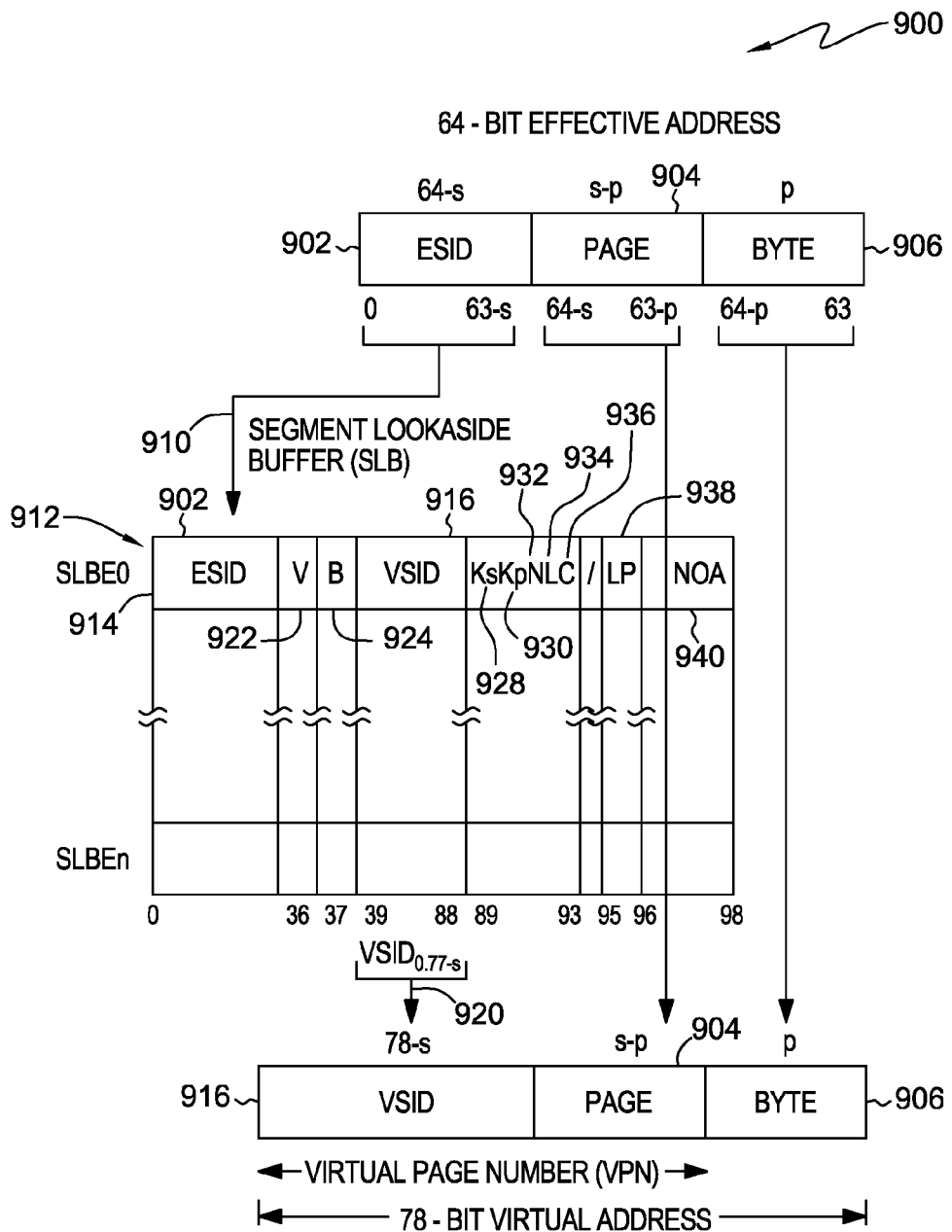
FIG. 9 pictorially depicts one embodiment of translating an effective address to a virtual address.

In particular, as shown in FIG. 9, in one embodiment, an effective address 900 is a 64-bit address including an effective segment identifier (ESID) 902, a page offset 904, and a byte offset 906. The effective segment identifier is extracted 910 from the effective address and used to search a segment lookaside buffer (SLB) 912 for a matching entry 914. A segment lookaside buffer (SLB) 912 is a cache of recently accessed segment ID entries. In one example, it is located in the MMU, but in other examples, it is located elsewhere. It specifies the mapping between effective segment IDs (ES-IDs) and virtual segment IDs (VSIDs). The number of SLB entries (SLBE) in an SLB is implementation dependent, and in one example, includes at least 32 entries. In one example, segment lookaside buffer 912 includes a plurality of SLB entries 914, and each SLB entry 914 maps one ESID 902 to one VSID 916. In one example, SLBE 914 includes the following fields:

Effective segment ID (ESID) 902 (bits 0-35);
Entry valid indicator (V) 922 (bit 36) which indicates whether the entry is valid (V=1) or invalid (V=0);
Segment size selector (B) 924 (bits 37-38), which has the following meaning, in one example: 0b00—256 Megabytes (MB) (s=28); 0b01—1 Terabyte (TB) (s=40); 0b10—256 TB (s=48); and 0b11—reserved;
Virtual segment ID (VSID) 916 (bits 39-88);
Supervisor (privileged) state storage key indicator ($K_s$) 928 (bit 89);
Problem state storage key indicator ($K_p$) 930 (bit 90);
No-execute segment if N=1 indicator (N) 932 (bit 91). Instructions cannot be executed from a No-execute (N=1) segment;
Virtual page size selector bit 0 (L) 934 (bit 92);
Class indicator (C) 936 (bit 93);
The Class field of the SLBE is used in conjunction with, for instance, slbie (SLB invalidate entry) and slbia (SLB invalidate all) instructions. "Class" refers to a grouping of SLB entries and implementation-specific lookaside information so that only entries in a certain group need be invalidated and others might be preserved. The Class value assigned to an implementation-specific lookaside entry derived from the SLB entry is to match the Class value of that SLB entry. The Class value assigned to an implementation-specific lookaside entry that is not derived from an SLB entry (such as real mode address "translations") is 0.
Virtual page size selector bits 1:2 (LP) 938 (bits 95-96);
Segments may contain a mixture of page sizes. The L and LP bits specify the base virtual page size that the segment may contain. The $SLB_{L\|LP}$ encoding are those shown below, in one example. The base virtual page size (also referred to as the "base page size") is the smallest virtual page size for the segment. The base virtual page size is $2^b$ bytes. The actual virtual page size (also referred to as the "actual page size" or "virtual page size") is specified by $PTE_{L\|LP}$, where $\|$ is a concatenation of the two values.

| Encoding | Page Size |
|---|---|
| 0b000 | 4 KB |
| 0b101 | 64 KB |
| additional values[1] | $2^b$ bytes, where b > 12 and b may differ among encoding values |

[1]In one embodiment, the "additional values" are implementation-dependent, as are the corresponding base virtual page sizes. Any values that are not supported by a given implementation are reserved in that implementation, in at least one embodiment.

No Access (NOA) indicator 940 (bits 97:98), which $NOA_0$=No Instruction (NOI); $NOA_1$=No Data (NOD); 0b00—SLBE can be used for both instruction fetches and data accesses; 0b01—SLBE can only be used for instruction fetches; 0b10—SLBE can only be used for data accesses; and 0b11—reserved.

For each SLB entry, software is to ensure the following requirements are satisfied.

L∥LP contains a value supported by the implementation.
The base virtual page size selected by the L and LP fields does not exceed the segment size selected by the B field.
If s=40, the following bits of the SLB entry contain 0s.
$ESID_{24:35}$
$VSID_{39:49}$
The bits in the above two items are ignored by the processor.

In accordance with one aspect, the NOA field specifies for each SLB entry whether the SLB entry is to be used to translate an effective memory address to a virtual address for instruction fetch and data access (NOA=0b00, in one encoding of allowed accesses for a segment in accordance with one aspect), for data accesses but not instruction fetch (NOA=0b10, in one encoding of allowed accesses for a segment in accordance with one aspect), and for instruction fetch but not data access (NOA=0b01, in one encoding of allowed accesses for a segment in accordance with one aspect).

It is legal to have multiple effective to virtual segment id translations, as long as only one is selected to be performed based on the NOA bits. To accomplish this, software is to ensure that the SLB contains at most one entry that translates a given instruction effective address, and that if the SLB contains an entry that translates a given instruction effective address ($NOA_0$=0), then no other entry can translate the same address for instruction fetches. In accordance with one aspect, when installing a new SLB entry for one or more access modes (e.g., instruction fetch), software is to ensure that any previously existing SLB translation entry of that effective address that may translate an address for such access mode has been invalidated. Likewise, software is to ensure that the SLB contains at most one entry that translates a given data effective address ($NOA_1$=0), and that if the SLB contains an entry that translates a given data effective address, then any previously existing translation of that effective address for data accesses has been invalidated. An attempt to create an SLB entry that violates these requirements may cause a machine check. In accordance with one embodiment, a machine check is a high priority interrupt to a firmware, hypervisor or other supervisor component to indicate that system integrity constraints have been violated.

In accordance with one embodiment, it is permissible for software to replace the contents of a valid SLB entry without invalidating the translation specified by that entry provided the specified restrictions are followed.

When the hardware searches the SLB, all entries are tested for a match with the effective address (EA). For a match to exist, the following conditions are to be satisfied for indicated fields in the SLBE.

V=1 (i.e., the valid bit is set for an entry)

$ESID_{0:63-s}=EA_{0:63-s}$, where the value of s is specified by the B field in the SLBE being tested.

The search is an instruction address search and NOI=0, or the search is a data address search and NOD=0.

In particular, in one embodiment, an entry in the SLB is matching if the entry is valid, has an effective segment identifier matching the obtained effective segment identifier from the effective address, and the No Access (NOA) SLB field is set for the type of memory access being performed, e.g., for an instruction fetch or a data access. The NOA includes, for instance, two bits, in which a value of 01 indicates an entry can be used to match addresses associated with instruction access only; 10 indicates an entry can be used to match addresses associated with data access only; and 00 indicates an entry can be used to match addresses associated with both instruction fetches and data accesses. If the NOA field is set for the requested access and the effective SID is the same as the obtained effective SID, then there is a match.

Returning to FIG. 8, a determination is made as to whether a matching entry in the SLB was found, INQUIRY 806. In particular, the matching logic is performed in conjunction with the NOA field of FIG. 9 indicating the types of accesses each particular SLBE may translate. If no matching entry was found, then there is indicated an SLB miss exception, which transfers control to a software handler for handling the exception, STEP 808. In at least one embodiment, the software handler manages the SLB as a cache and reloads a new SLB entry (SLBE) from a table of SLBEs maintained in memory. If, however, a matching entry is found, INQUIRY 806, then a determination is made as to whether multiple matching entries were found, INQUIRY 810. If there are multiple matches, a machine check may be taken, STEP 812, since there should not be multiple matches, or in another embodiment, one of the entries is selected and used.

However, if there is one match (or one is selected), a virtual segment identifier (VSID) 916 (FIG. 9) in the SLB entry is extracted 920 and used as part of the virtual address. The VSID is concatenated with page offset 904 and byte offset 906 from the effective address to create the virtual address. This virtual address is then returned, STEP 814 (FIG. 8).

As described above, for the SLB search, if no match is found, the search fails. If one match is found, the search succeeds. If more than one match is found, one of the matching entries may be used as if it were the only matching entry, or a machine check occurs. If the SLB search succeeds, the virtual address (VA) is formed from the EA and the matching SLB entry fields as follows: VA= $VSID_{0:77-s}||EA_{64-s:63}$. The Virtual Page Number (VPN) is bits 0:77-p of the virtual address. The value of p is the actual virtual page size specified by the PTE used to translate the virtual address. If $SLBE_N=1$, the N (noexecute) value used for the storage access is 1.

On an instruction fetch, if $SLBE_N=1$, an Instruction Storage interrupt may occur without the page table being searched. If the SLB search fails, a segment fault occurs. This is an instruction segment exception or a data segment exception, depending on whether the effective address is for an instruction fetch or for a data access.

The virtual address created from translation of the effective address is then translated to a physical address (a.k.a., a real address) using, for instance, a hash page table. Further details regarding translation using a hash page table are described with reference to FIG. 10.

Figure 10:
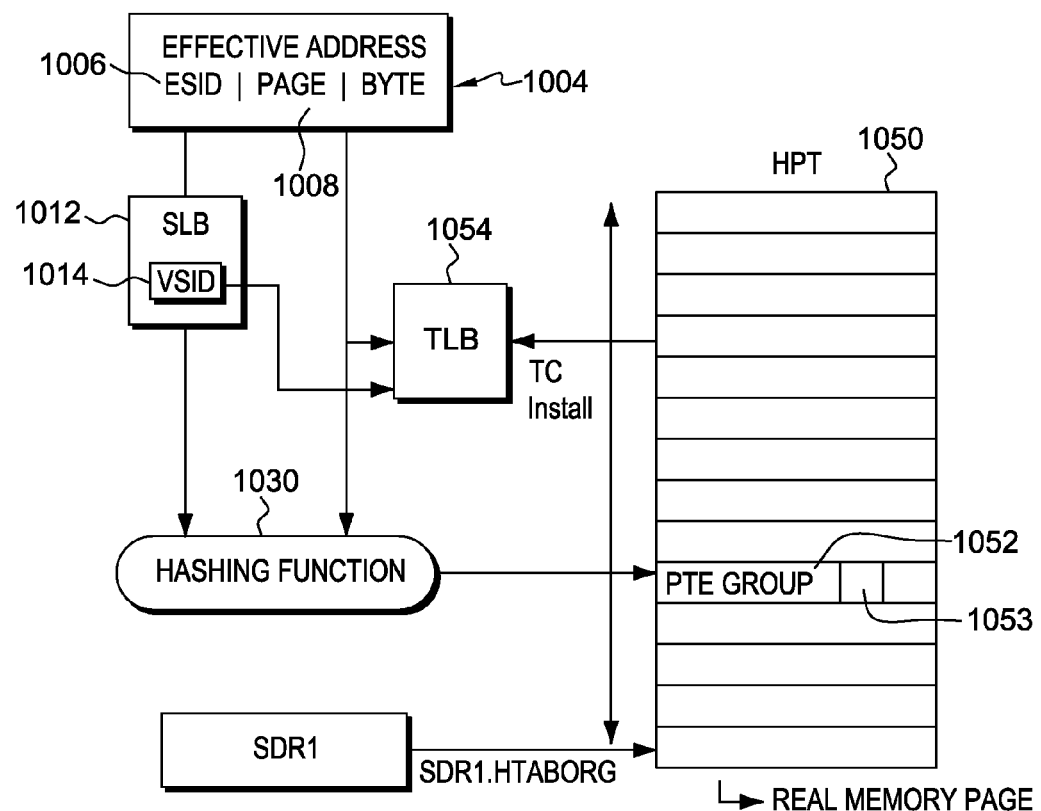
FIG. 10 depicts one example of a hash page table translation structure.

In particular, FIG. 10 illustrates one example of a hash page table (HPT) translation structure used by Power ISA. ESID portion 1006 of an effective address (EA) 1004 is used to locate an entry in SLB 1012. The entry includes a VSID field 1014. The value of VSID field 1014 and the page portion 1008 of EA 1004 are hashed 1030 to produce a hash value that is used to locate a page table entry (PTE) group 1052 in a hash page table (HPT) 1050. (In another embodiment, since the virtual address was previously created, the VSID and page portion may be extracted directly from the formed virtual address.) In at least one embodiment, the hash page table is located by a page table origin address provided by the processor. Page table entries 1053 of PTE group 1052 are searched to locate a corresponding PTE having a field matching a value of a most-significant-portion of the VSID. When a corresponding PTE is found, the address (e.g., real address) of the physical memory page in the PTE is used to access physical memory. In order to improve performance, once a PTE entry is found, the page portion 1008 of EA 1004 and the address of the physical memory page found in the PTE are stored in TLB 1054, such that further accesses to the same EA page will "hit" in TLB 1054 and avoid the PTE search.

As described above, in one example, address translation is performed based on a particular attribute, such as, for instance, the type of access: instruction fetch or data access. To enable this, a mechanism is provided that includes a field in the SLB to prevent SLBEs from being used for instruction-side or data-side accesses. This field, as indicated above, is the No Access (NOA) field. The NOA is used to indicate that a particular SLBE associated with the NOA can be used for only instruction fetches, only data accesses, or for both instruction fetches and data accesses.

In accordance with one embodiment, the NOA field is separately specified for each segment in conjunction with an SLB entry, thereby allowing some effective address segments (memory regions of the input address) to be translated to a common segment address for instruction and data accesses (memory regions of the output address), and other segments (memory regions of the input address) to be translated to separate segment addresses for instruction and data accesses (memory regions of the output address), respectively, or to provide a translation for one type of access (e.g., instruction access), but not another type of access (e.g., data access) by loading an appropriate SLB entry for one type of access, but not another. While the description has been made with respect to the presence of a NO Access field, and to a specific encoding of a NO Access field in the SLB, other encodings for such fields, or both, may be used to identify the types of permissible access for a translation.

Figure 11A:
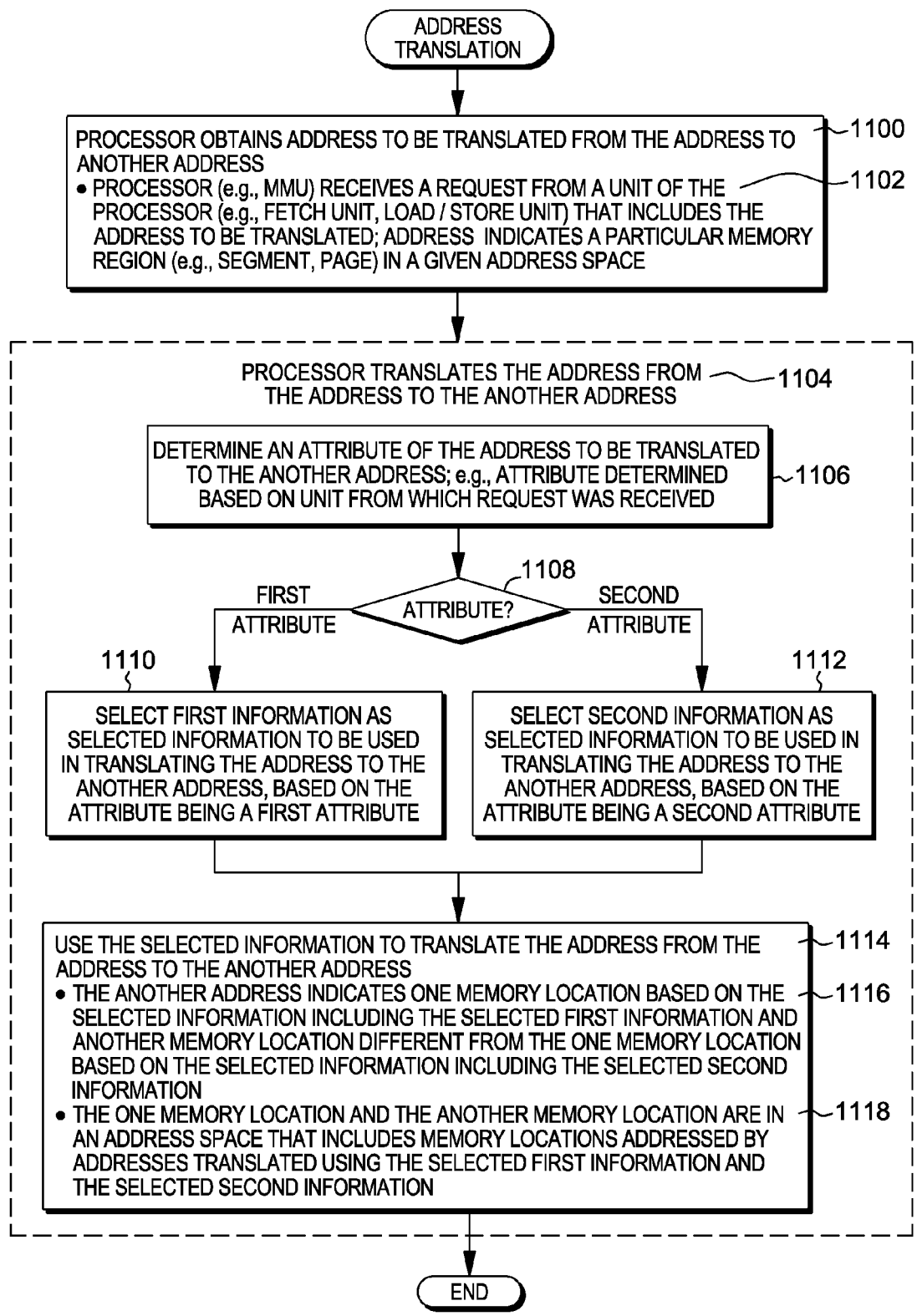
FIGS. 11A-11C depict one embodiment of processing associated with translating an address.
Figure 11B:
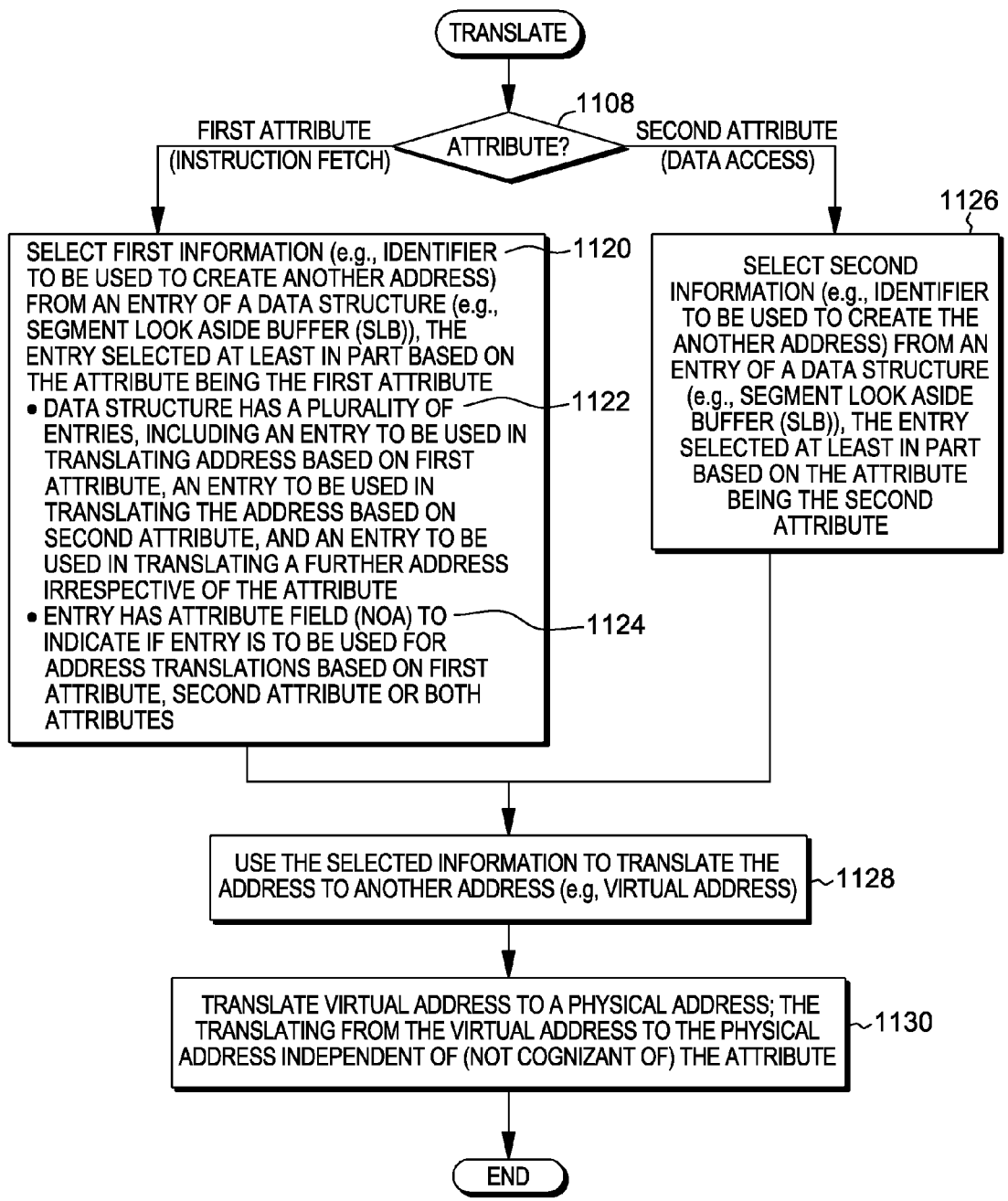

Further details regarding one or more aspects of the address translation capability are described with reference to FIGS. 11A-11C. Referring initially to FIG. 11A, a processor obtains (e.g., receives, is provided, or otherwise gets) an address to be translated from the address to another address, STEP 1100. For instance, in one embodiment, the MMU of the processor receives a request from another unit of the processor, such as a fetch unit or a load/store unit, to translate the address, STEP 1102. The request includes the address to be translated, which indicates, for example, a particular memory region (e.g., a segment of memory, a page of memory, etc.) in a given address space. An address space is a particular range of addresses in accordance with a type of address, e.g., an effective address, a virtual address, a real address, a physical address, a guest virtual address, a guest real address, a host virtual address, a host physical address, and so forth.

Based on receiving the request to translate the address, the processor (e.g., the MMU of the processor) translates the address from the address to the another address, STEP 1104. In translating the address, a determination is made as to an attribute of the address to be translated, STEP 1106. For instance, is the address to be translated for an instruction fetch (e.g., first attribute) or a data access (e.g., second attribute). In one example, this determination is made based on the unit (e.g., instruction fetch or load/store unit) that is requesting the translation. For instance, if it is the instruction fetch unit requesting the translation, then it is assumed that the address is for an instruction fetch. Similarly, if it is the load/store unit requesting the translation, then it is assumed that the address is for a data access. In other embodiments, an indicator may be used, regardless of the unit requesting the translation, to indicate the attribute, or other mechanisms may be used. In at least one embodiment, an indication is provided to indicate that an instruction translation is required when the load/store unit executes an instruction cache management instruction, such as, for example, including but not limited to, the icbi (instruction cache block invalidate) and icbt (instruction cache block touch) instructions.

Based on the attribute being the first attribute (e.g., instruction fetch), INQUIRY 1108, information, referred to as first information (e.g., an identifier), is selected as selected information to be used in translating the address to the another address, STEP 1110. Further, based on the attribute being the second attribute (e.g., data access), information, referred to as second information (e.g., an identifier), is selected as selected information to be used in translating the address to the another address, STEP 1112.

The selected information is then used to translate the address from the address to the another address, STEP 1114. The another address indicates one memory location based on the selected information being the selected first information and another memory location based on the selected information being the selected second information, STEP 1116. The one memory location and the another memory location are in an address space that includes memory locations addressed by addresses translated using the selected first information and the selected second information, STEP 1118.

Further details regarding the selecting and translating are described with reference to FIG. 11B. Referring to FIG. 11B, if the attribute is the first attribute, INQUIRY 1108, then the first information (e.g., an identifier to be used to create the another address) is selected from an entry of a data structure (e.g., a segment lookaside buffer (SLB) entry (SLBE)), STEP 1120. The entry is selected at least in part based on the attribute being the first attribute. In one embodiment, the data structure (e.g., the SLB) has a plurality of entries (SLBEs). In one particular example, the data structure has one or more entries (a first entry) to be used in translating the address based on the attribute being the first attribute; one or more entries (a second entry) to be used in translating the address based on the attribute being the second attribute; and one or more entries (a third entry) to be used in translating a further address irrespective of the attribute being the first attribute or the second attribute, STEP 1122. As one example, the entry has an attribute field (e.g., NOA) to indicate if the entry is to be used for address translations based on the first attribute, the second attribute or both, STEP 1124.

Further, in one embodiment, if the attribute is the second attribute, INQUIRY 1108, then the second information (e.g., an identifier to be used to create the another address) is selected from an entry of a data structure (e.g., SLBE), STEP 1126. Again, the entry is selected at least in part based on the attribute being the second attribute.

The selected information (i.e., the first information or the second information) is used to translate the address from the address to the another address, STEP 1128. In one example, the another address is a virtual address, which is then translated to a physical address, STEP 1130. The translation from the virtual address to the physical address is independent of the attribute, in this embodiment. That is, the translation from the virtual address to the physical address is not based on the attribute and the translation is not even cognizant that the first translation from the address to the another address was based on the attribute.

Figure 11C:
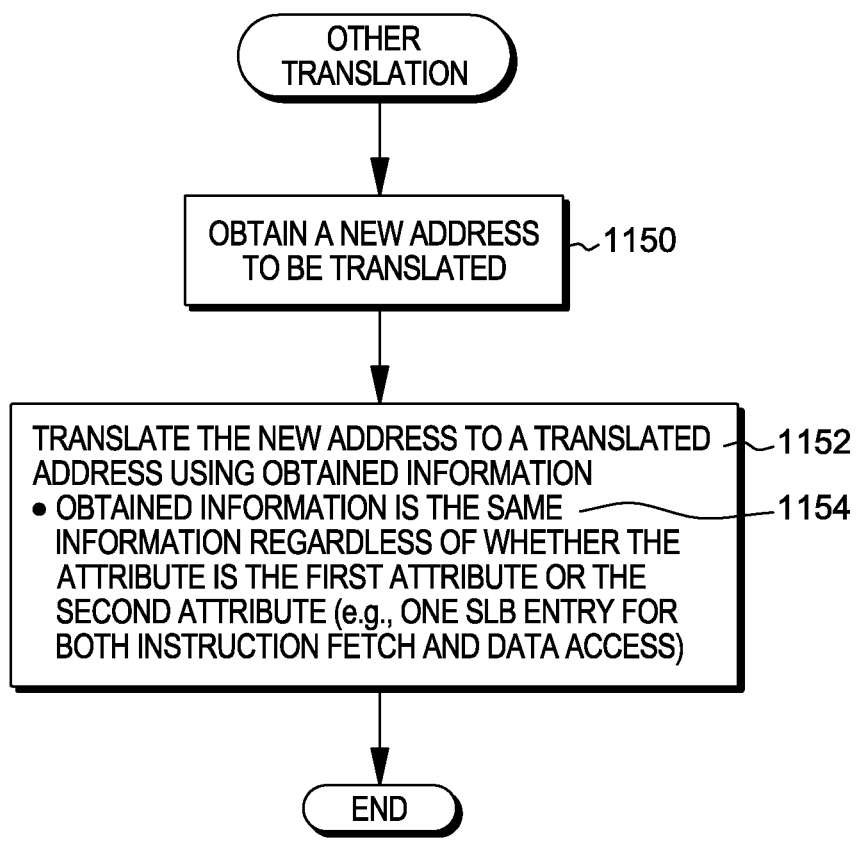

In yet a further embodiment, referring to FIG. 11C, a new address is obtained that is to be translated, STEP 1150. In this case, the attribute is irrelevant. For instance, it does not matter whether the address is for an instruction fetch or a data access, since the entry that is selected, and thus, the information that is obtained, is the same regardless of the attribute (e.g., regardless of whether the address is for an instruction fetch or a data access). Based on obtaining the new address, the new address is translated to a translated address using obtained information, STEP 1152. The obtained information is the same information regardless of whether the attribute is the first attribute or the second attribute (e.g., there is one SLB entry for both instruction fetch and data access), STEP 1154.

As described above, an address translation capability is provided in which a segment lookaside buffer (SLB) is modified to generate different virtual addresses for an effective address. The different virtual addresses can then be translated to different physical addresses, in order to preserve the illusion of an unmodified instruction space even during binary rewriting when an application attempts to read with data access instructions its own instruction stream. In one particular example, each entry of the SLB (SLBE) includes a field having a No Access (NOA) indicator. The NOA indicator includes, for instance, a bit mask to indicate whether each type of access (e.g., instruction fetch, data access) is allowed or not. In one embodiment, one or more entries are to be used for address translations for only instruction fetches, one or more entries are to be used for address translations for only data accesses, and one or more entries are to be used for address translations for both instruction fetches and data accesses. In other embodiments, encodings, other than a mask, may be used.

In further embodiments, other address translation structures may be used that provide address translation based on an attribute.

Figure 12A:
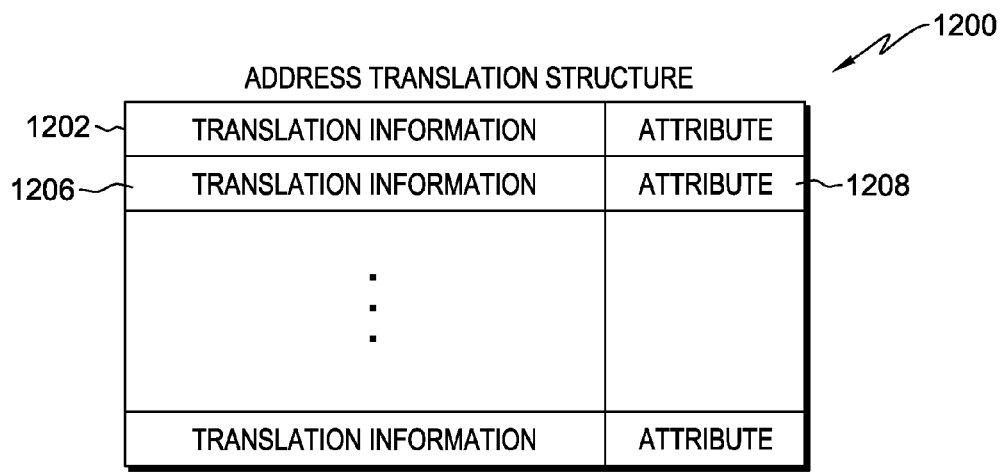
FIG. 12A depicts one embodiment of an address translation structure.

For instance, as shown in FIG. 12A, in general, an address translation structure 1200 includes, for instance, a plurality of entries 1202, each entry 1202 includes, for instance, translation information 1206 and one or more attribute fields or indicators 1208. In one embodiment, translation information 1206 includes information to be used to translate an address from that address to another address depending on the type of address to be translated and/or the type of translation structure. For instance, if the address to be translated is an effective address, the type of address to be translated to is a virtual address, and the type of translation structure is an SLB, such that the effective address is to be translated to a virtual address using the SLB, the translation information includes, for instance, the ESID and the VSID.

Further, the attribute field includes, for instance, the NOA or it may include a different type of attribute.

In one embodiment, address translation structure 1200 may include one or more entries for one attribute value (e.g., instruction fetch), one or more entries for another attribute value (e.g., data access), and/or one or more entries that include information to be used regardless of the attribute.

Figure 12B:
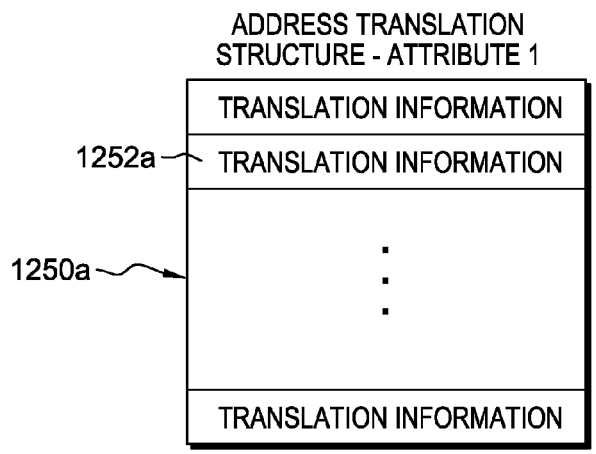
FIGS. 12B-12C depict another embodiment of an address translation structure.
Figure 12C:
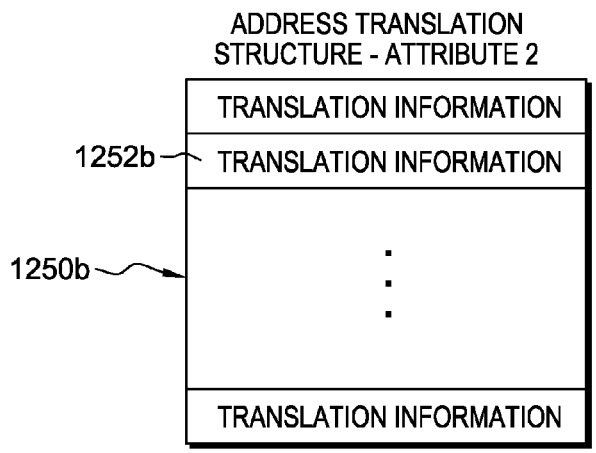

In a further embodiment, an address translation structure may include multiple address translation substructures, one for each attribute value. For instance, if the attribute is NOA and one attribute value is instruction fetch and the other is data access, then there may be one address translation substructure 1250*a* for one attribute value, such as instruction fetch, as shown in FIG. 12B; and one address translation substructure 1250*b* for another attribute value, such as data access, as shown in FIG. 12C. In these examples, each address translation structure 1250*a*, 1250*b*, includes a plurality of entries 1252*a*, 1252*b*, respectively, and each entry includes address translation information. Again, the address translation information depends on the type of address to be translated, the type of address to be translated to, and/or the address translation structure. For instance, if the address to be translated is an effective address, the type of address to be translated to is a virtual address, and the type of translation structure is an SLB, such that the effective address is to be translated to a virtual address using the SLB, the translation information includes, for instance, the ESID and the VSID. It is not necessary in this implementation of the address translation structure to include the attribute field, since a particular substructure is for a particular attribute value. Further, in one embodiment, if the translation does not depend on the attribute, then either substructure may be selected, since an entry will be in both substructures.

The structures of FIG. 12B and FIG. 12C may be, in one embodiment, operatively coupled to distinct and separate function units of a processor, or be located in the function units. For instance, one address translation structure of FIG. 12B may be located in, close by, or otherwise operatively coupled to an instruction fetch unit, while another structure, such as address translation structure of FIG. 12C, may be located in, close by, or otherwise operatively coupled to a load/store unit.

In yet another embodiment, an instruction fetch unit may be operatively coupled to a structure of FIG. 12B, whereas a load/store unit may be operatively coupled to an address translation structure of FIG. 12A. This may be used, for example, to provide only instruction address translation for instruction fetches, so that instruction fetches may perform optimized accesses to instruction translation. Both instruction and data translations may be provided to a load/store unit in at least one embodiment, such that memory access load and store instructions may use data address translations, whereas instruction cache management instructions, such as icbi and icbt, may have access to instruction address translations.

Particular examples of address translation structures, other than an SLB, are described with reference to FIGS. 13A-13B. For instance, an effective to real address translation (ERAT) structure is described with reference to FIG. 13A, and a translation lookaside buffer (TLB) is described with reference to FIG. 13B. Although various address translation structures, including SLB, ERAT and TLB, are described herein, other address translation structures, such as a host page table (HPT) or others, may be used and benefit from one or more aspects described herein. Further, although various translation information may be described with reference to particular structures, it may differ in other embodiments. For instance, it may differ for different architectures.

Referring to FIG. 13A, one example of an effective to real address translation (ERAT) structure is described. In one embodiment, an effective to real address translation (ERAT) structure 1300 includes a plurality of entries 1302 that provide direct mappings between effective and real addresses. Thus, in one embodiment, an ERAT structure effectively includes information from both the SLB and the TLB to eliminate the need to perform two levels of translation. For instance, entry 1302 includes, e.g., an effective address (or one or more portions thereof) 1304 and a real address (a.k.a., a physical address) 1306. In other embodiments, it may include other information, such as a VSID, other identifying information and/or other information. Further, in accordance with one aspect, each entry includes, for instance, a NOA 1308 to indicate whether the entry is to be used for address translations for instruction fetch only, data access only or both. In other embodiments, indicators other than NOA may be used, and/or other types of attributes may be represented.

In one embodiment, ERAT structures corresponding to the separate translation of instruction and data accesses may be operatively coupled, located within or otherwise adapted for operation in conjunction with instruction fetch logic for an ERAT storing only address translations with instruction access attributes, and operatively coupled, located within or otherwise adapted for operation in conjunction with data load/store unit logic for an ERAT storing only address translations with data access attributes. In yet more embodiments, an ERAT storing only instruction address translations may be operatively coupled, located within or otherwise adapted for operation in conjunction with instruction fetch logic, whereas another ERAT storing address translations with instruction and data attributes may be operatively coupled, located within or otherwise adapted for operation in conjunction with data load/store unit logic such that load and store accesses may use address translations directed at translations having data addresses, whereas instruction cache management instructions (such as, for example, including, but not limited to, icbi and icbt) may be used in conjunction with instruction address translations.

In yet another embodiment, a load/store unit may further be operatively coupled to two ERAT structures, one optimized to provide data address translations for data accesses of load and store instructions executed in a load/store unit, whereas another ERAT structure directed at storing instruction address translations for executing instruction cache management instructions may be optimized for storing instruction address translations and be operatively coupled, located or otherwise optimized in conjunction with the load/store unit and be separate from the I-ERAT coupled to an instruction fetch unit. In yet another embodiment, a single I-ERAT translation structure block may be directed at providing instruction address translations for instruction fetch and instruction cache management, and be operatively coupled to both instruction fetch and a unit executing instruction cache management instructions (such as including, but not limited to, icbi and icbt), such as, but not limited to, the load/store unit.

Another address translation structure, referred to as a translation lookaside buffer (TLB), is described with reference to FIG. 13B. In one embodiment, TLB 1350 includes a plurality of entries 1352, each entry including, for instance, information to translate a virtual address 1354 to a physical or real address 1356, as well as an attribute, such as NOA 1358. Again, NOA 1358 is used to determine whether the entry is to be used for a particular address translation (e.g., such as for instruction fetch or data access). In other embodiments, indicators other than NOA may be used, and/or other types of attributes may be represented. Additionally, in other embodiments, each entry may include different and/or additional translation information and/or other information.

An address translation structure, such as address translation structure 1200, or any of the specific address translation structures similarly designed (e.g., SLB, ERAT, TLB, etc.) may be implemented using, for instance, content addressable memory (CAM) random access memory (RAM) circuits (CAMRAM circuits). One example of implementing an address translation structure using such circuits is described below with reference to FIGS. 14A-14F. Further, details relating to CAM circuits are described in K. Pagiamtzis and A. Sheikholeslami, "Content-addressable memory (CAM) circuits and architectures: A tutorial and survey," *IEEE Journal of Solid-State Circuits*, vol. 41, no. 3, pp. 712-727, March 2006, which is hereby incorporated by reference herein in its entirety.

Figure 14A:
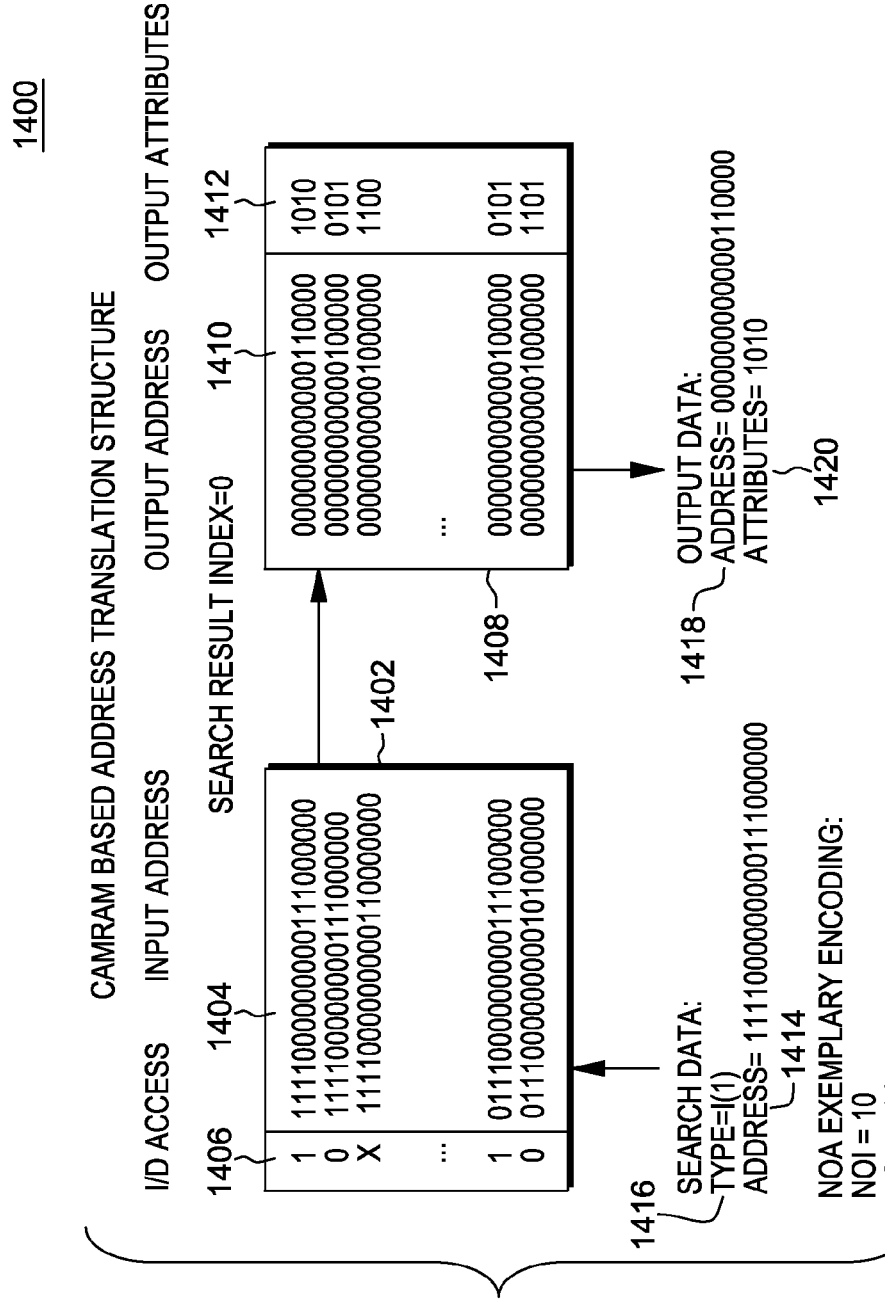
FIG. 14A depicts one example of a content addressable memory (CAM) random access memory (RAM) (CAM-RAM) address translation structure.

Referring initially to FIG. 14A, one embodiment of a CAMRAM type structure 1400 is used to implement an address translation structure. With this design, a first structure 1402 includes a plurality of input addresses 1404 and an input attribute field 1406, and a second structure 1408 includes a plurality of output addresses 1410 and an output attribute field 1412. An address to be translated 1414 along with an input attribute 1416 is entered into first structure 1402 and searched for a match. If a match is found, a translated address 1418 corresponding to the input address is output from the second structure 1408, along with one or more output attributes 1420.

Figure 14B:
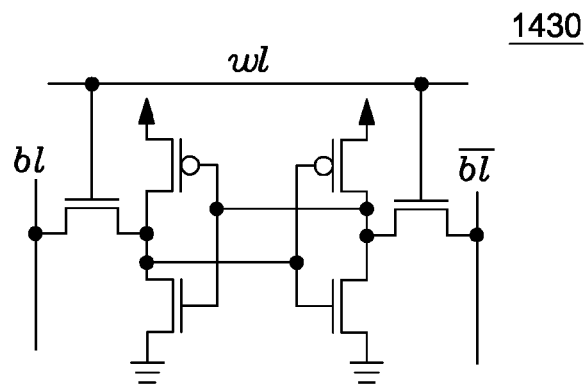
FIG. 14B depicts one example of a 6-transistor SRAM cell.
Figure 14C:
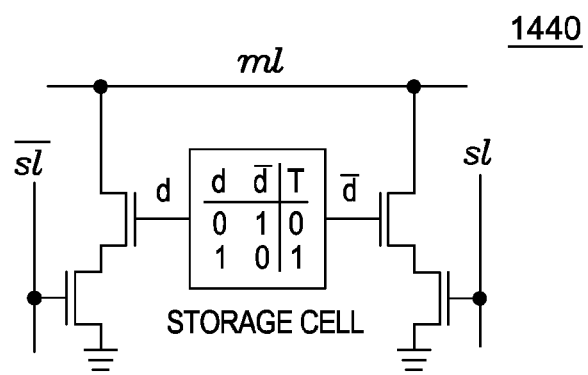
FIG. 14C depicts one example of a binary CAM cell.
Figure 14D:
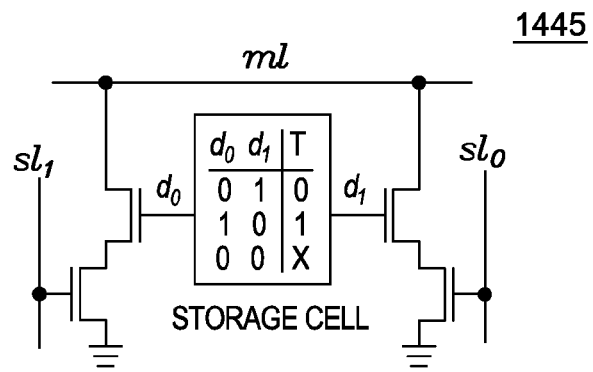
FIG. 14D depicts one example of a ternary CAM cell.

To perform the match, in one example, RAM cells and binary and ternary CAM cells are used. Examples of such cells are depicted in FIGS. 14B-14D. Referring to FIG. 14B, one example of a RAM cell 1430 is shown. In this example, it is a 6-transistor SRAM cell. Further, one example of a binary CAM cell 1440 is depicted in FIG. 14C, and an example of a ternary CAM cell 1445 is depicted in FIG. 14D. The cells are used to store data, match and select binary data, and select one of an exact match and/or a don't care match in accordance with one design.

In one example, at least one type of CAM cells is operatively coupled to at least one style of RAM cells to select output stored in a plurality of RAM cells responsive to matching input to data stored in a plurality of CAM cells. In one example, when multiple matches occur, an error condition is indicated. In another design style, corrupted output is produced. In accordance with one implementation style of circuits producing corrupted output, at least one checking circuit for corrupted output is present to indicate the presence of corrupted output via a notification. In one embodiment, indication may—for example—occur by sampling a plurality of selection lines activated by CAM matches, and ensuring one hot property is met (i.e., at most one line is selected). In another embodiment, indication may occur by storing an integrity checking value (e.g., ECC (error correcting code), CRC (cyclic redundancy check) or other such detection or correction code) in the RAM part in conjunction with the output information, and checking the output with respect to the stored corrective code. In accordance with another embodiment, no separate checking circuit is present in a design style where corrupted output occurs and corrupted output is presented without further indication.

In accordance with one embodiment, a first set of content addressable cells is used to match a line with an input address (e.g., one of an effective or virtual address). Matching is performed, for instance, using a binary CAM cell to exactly match all address bits. In one embodiment, CAM cells are used to match a selection criteria attribute (a.k.a., input attribute) in conjunction with the address. In one such embodiment, ternary CAM cells are used for at least a portion of address bits when multiple pages are stored concurrently in the address translation structure (e.g., address translation structure 1200 in FIG. 12A). Input matching using CAM based selection to identify a matching row further includes, e.g., an attribute indicator for, e.g., instruction or data access.

As one aspect, a selective attribute criteria is included in the lookup circuitry. By including a selective attribute criteria, a logic can select one of two input criteria while both criteria are simultaneously present in a structure. An attribute indicator (such as an instruction/data (or other attribute) is stored, for example, as two bits of a ternary CAM cell adapted to match any value of 0, 1 or both (often indicated as "X", and referred to as a "don't care" value) and is used to select a row of data.

In at least one embodiment, the encoding of NOA bits to indicate one or another attribute in which a translation is not available (e.g., no translation for instruction fetch, or no translation for data access, e.g., when, for instance, a bit is "1" for either the NO-I or NO-D flag, that entry is not to be used to match an instruction or a data translation) is used directly as an encoding for the two bit CAM cell, wherein the matching attribute information for one and a second attribute are encoded as 0b01 and 0b10 corresponding to match a match value of 0 and 1 respectively. Further, in one embodiment, an encoding of 0b00 is used to match either attribute, by encoding the matching attribute itself as a single bit with an attribute of data access being encoded as a single 0 bit, and an instruction access as a single 1 bit, in accordance with one exemplary design style of ternary CAMs. In another circuit design, the opposite encoding of ternary CAM cells, or encoding of attributes is used.

In one embodiment, a design where an attribute matching pattern is stored as a tri-state value and matched using a ternary CAM, a single row of information is stored for information that is encoded in the architectural structure as information that can be used to translate both attributes. When the architecture does not encode NOA or other attribute information in accordance with a suitable ternary CAM content, in one example, coupled circuitry and/or logic is used to convert the architectural representation of attribute matching to a ternary CAM representation, with suitably chosen encodings for ternary match cell content and transmitted match attribute.

Figure 14E:
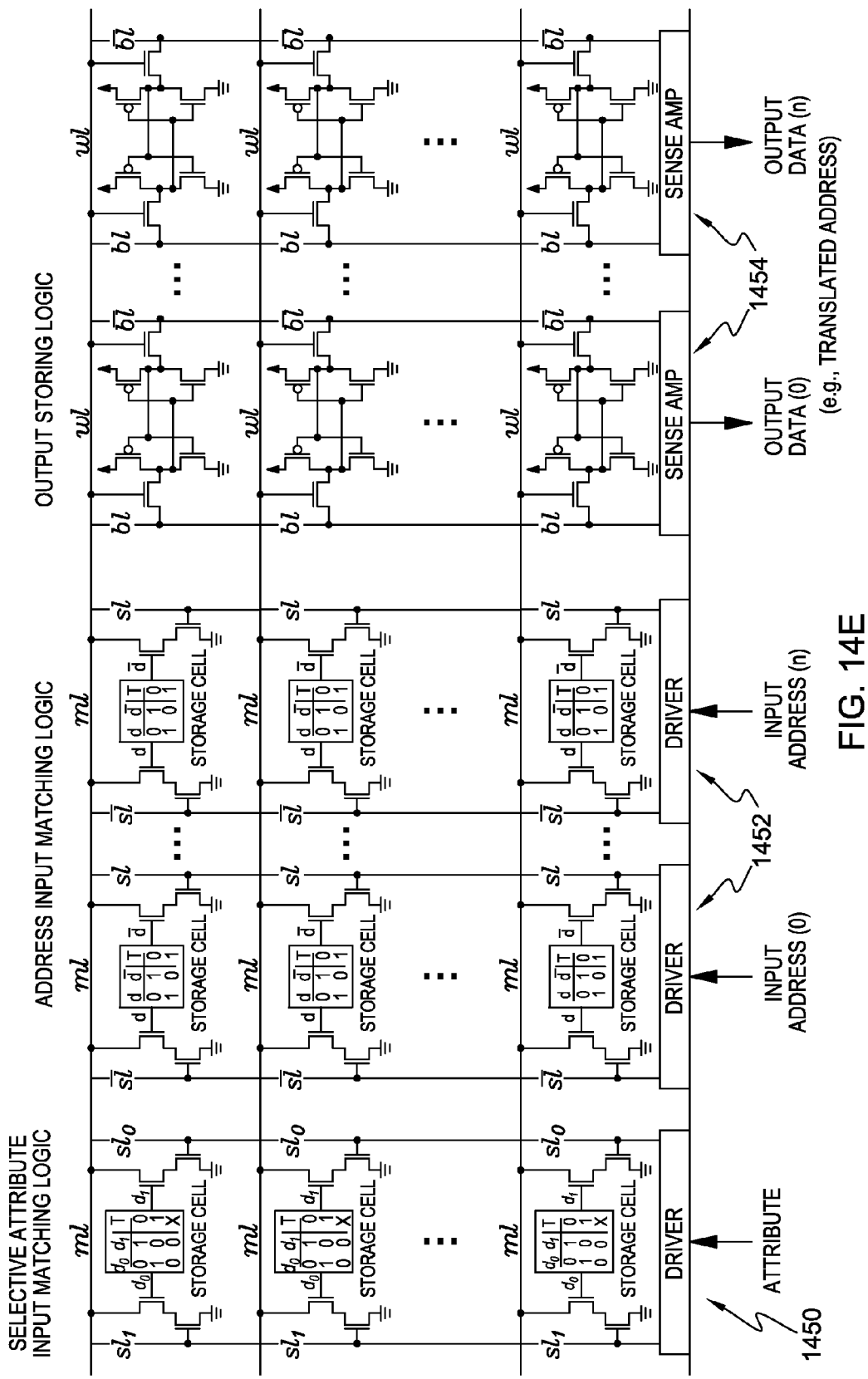
FIG. 14E depicts one example of a matching/selection circuit.

FIG. 14E shows one example of using a CAMRAM design to implement one or more aspects of an address translation structure. Ternary CAM logic 1450 is used to match at least a first and second input attribute for a first information and a second information if an attribute is specified, and ignore at least a first and second attribute for a third information when a third information is specified to be used for translating a memory region irrespective, regardless of and without reference to an attribute corresponding to a memory access. In one embodiment, binary CAM logic 1452 is used to perform address matching.

In another embodiment, at least some address bits can also be ignored by using ternary CAM logic to match at least some address bits, e.g., when multiple page sizes are simultaneously supported in at least one design style. In accordance with one embodiment, CAM cells are operatively coupled to bit lines (typically present in both positive and negative polarity) and attached to a driver. A plurality of CAM cells is each operatively coupled with respective wordlines for each information to match input information having multiple bits. A wordline is further operatively coupled to a plurality of RAM cells 1454 storing output data to be selected when the plurality of CAM cells operatively coupled to the wordline indicate a match. A wordline indicating a match causes storage RAM cells (e.g., with a 6 transistor SRAM cell) to couple the stored data onto bit lines (typically present in positive and negative polarity) and drive the attached bit lines. Sense amps stored to bit lines capture a driven value from the bit lines and make them available as selected output data, e.g., such as stored target address data (i.e., the translation result data) and any corresponding output non-selecting attributes which may be checked for permissions responsive to finding a match.

In a further embodiment of implementing an address translation structure (e.g., structure 1200), ternary CAM data are not used. Instead, binary CAM matching is performed. In accordance with such an implementation style, when an architectural structure specifies a NOA=0b00 attribute for a translated address, i.e., an address translation that may be used for both I and D translation, two entries are generated: one entry storing the translation information and being reactive to a selection with a first attribute value, and one entry storing the translation information and being reactive to a selection with a second attribute value. This design avoids, for instance, the use of ternary CAM structures. However, with this design, duplicate information is stored in a plurality of entries, each attribute value selection corresponding to one distinct entry, as shown in FIG. 14F.

When an address translation is being generated in accordance with an embodiment of the design of FIG. 14F, in one embodiment, a translation entry in an address translation structure 1470 for an attribute is only loaded when a translation for the attribute is requested for the first time, thereby avoiding the eviction of other entries of the finite address translation structure by an entry that may not be used in the future. In another embodiment, when an address translation is being generated in accordance with an embodiment of the design of FIG. 14F, multiple translation entries in the address translation structure are loaded with a plurality of entries corresponding to a plurality of available attribute values that an architected address translation indication indicates as matching, thereby avoiding the need for multiple repeated translations for each attribute value.

In one embodiment, in accordance with the design of FIGS. 14A and 14E, when a translation is performed and a value is loaded to an address translation CAMRAM structure, only a single entry is loaded with a don't care cell, thereby using only a single entry and avoiding repeated translation processes.

As another example, a CAMRAM design may be used to build structures of FIGS. 12B and 12C and not including a selective attribute as part of the input selection logic, the attribute being implicit by the request being directed to a structure directed at storing only address translations adapted to store such selected attributes.

In at least one particular embodiment, ERAT structures (as well as other structures) may be implemented using CAMRAM designs and in conjunction with translation structures of FIGS. 14A-14F. An input address and attribute may be matched using binary or ternary CAM logic. In at least one embodiment, an effective address is matched using CAM logic, e.g., binary CAM matching circuits. In at least one such embodiment, NOA information may be stored and encoded using ternary CAM structures for simultaneously matching a plurality of attribute information. In at least one other embodiment, NOA information may be stored and encoded using binary CAM structures for matching a single attribute per entry, and be loaded in conjunction with techniques previously described with reference to implementations of FIG. 14A.

In one embodiment, an ERAT corresponding to an ERAT storing address translations for both instruction and data translations may be structurally adapted in a manner similar to the address translation structure shown in FIG. 12A, and shown with reference to FIGS. 14A-14F.

Figure 15:
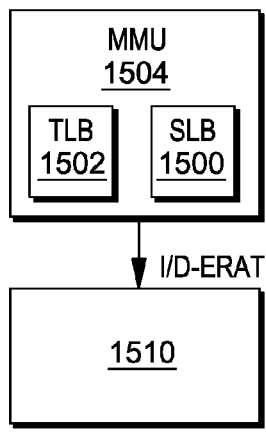
FIG. 15 depicts one example of a translation architecture.

The use of various address translation structures is depicted in FIG. 15, which pictorially depicts a translation architecture. In this particular example, an SLB 1500 and a TLB 1502 are located within a memory management unit 1504 of the processor, and are coupled to ERAT 1510, which is also located within the processor. ERAT 1510, in this example, includes entries to be used only for instruction fetch, only for data access, as well as for both.

Figure 16:
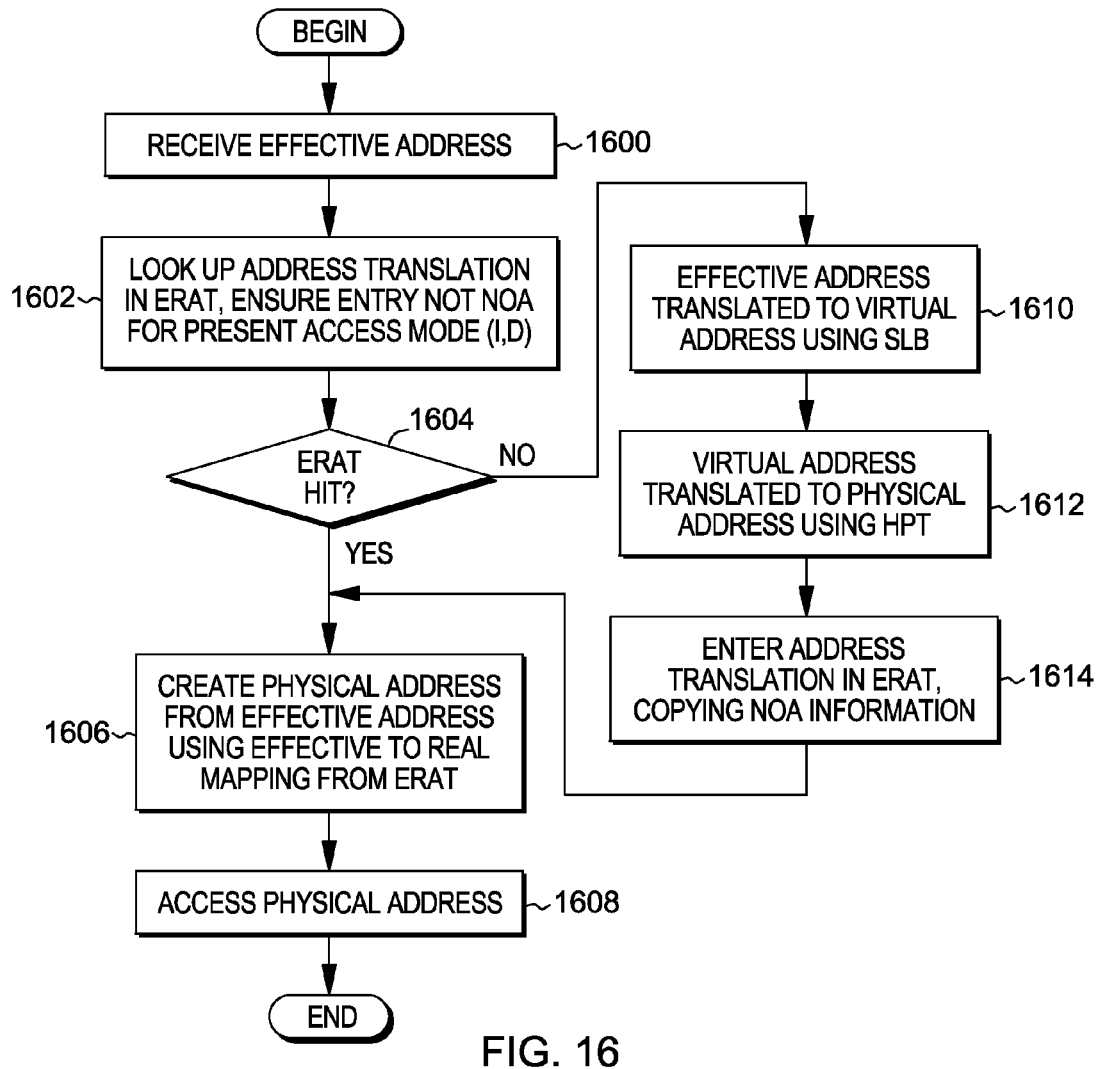
FIG. 16 depicts one embodiment of a translation process using an effective to real address translation structure.

Further details regarding using an ERAT to perform address translation are described below. In particular, one embodiment of the logic associated with ERAT based translation is described with reference to FIG. 16. Initially, a processor obtains (e.g., receives, is provided, or otherwise gets) an effective address to be translated, STEP 1600. The effective address (or a portion thereof) is searched in an ERAT to determine whether a translation of the effective address to a real address already exists, STEP 1602. In one embodiment, this search for a match not only determines if the effective address (or a portion thereof) is in the ERAT, but whether an entry having the effective address (or a portion thereof) also has a NOA set for the attribute associated with the effective address (e.g., type of access being performed, such as instruction fetch or data access). If there is a match in the ERAT, INQUIRY 1604, then a physical (a.k.a., real) address is created using the effective address to real mapping from the ERAT, STEP 1606. That is, the physical address is selected from the entry or created using information in the entry. The physical address can then be used to access a particular memory location, STEP 1608.

When performing a search for a matching entry, STEP 1602, and an effective address is to be matched in conjunction with an attribute, a number of significant address bits (i.e., those address bits that are to be used for the translation) are to match the corresponding address bits of an entry, and the current access attribute is to correspond to the attributes for which an entry is configured. In one embodiment, a match is indicated when an entry is configured for the attribute of a current access, and the attribute encoded for matching the entry directly matches the desired attribute of the current access. In another embodiment, when the entry is configured to match multiple attributes, and the attribute to be matched corresponds to one of the multiple attributes for which an entry is configured, a match is indicated. In one such embodiment, such a matching may be performed in conjunction with a ternary CAM cell and don't care matching to a single ERAT entry directed at translating both instruction and data addresses from an effective to a real address, e.g., in conjunction with structures described with reference to FIGS. 12A and 14A-14E. In another embodiment, such matching may be performed in conjunction with a binary matching logic and with reference to FIGS. 12A and 14F, wherein an entry may match a single attribute, and third information corresponding to translating both instruction and data attributes (or other at least two attributes) may be represented by at least two distinct entries, each specifying one attribute to be matched precisely and without reference to don't care ternary information.

However, returning to INQUIRY 1604, if there is no match in ERAT, then translation is performed. For instance, the effective address is translated to a virtual address using, e.g., the SLB, as described above, STEP 1610, and then the virtual address is translated to a physical address using, e.g., HPT, as described above, STEP 1612. Thereafter, the translated address is placed in ERAT along with the appropriate NOA information (e.g., obtained from SLB, as an example), STEP 1614. Processing may then continue to STEP 1606, to STEP 1602 (reinitiating a memory translation process after the ERAT reload of 1614), or the translated address may just be used (without reinitiating translation in STEP 1608), as examples.

In a further embodiment, the virtual address to physical address translation in STEP 1612 may use a TLB. In one aspect, the ERAT includes combined translations drawn from two distinct architectural translation steps (e.g., SLB, TLB) and provides the translation in a single step. In one embodiment, separate I/D attributes (i.e., the NOA information) are indicated by a first structure of the two translation steps (e.g., the SLB in one embodiment), and the stored region granularity in the merged translation structure (e.g., the ERAT) does not correspond to the granularity of the architected structure. Instead, the separate I/D attributes stored in conjunction with the translation for a larger region in a first translation structure (e.g., SLB, in one embodiment) is propagated to each of the subregions of the first structure translated by a second address translation structure (e.g., the PTE as cached in the TLB), and stored in the third structure in conjunction with the memory region size translated by the ERAT structure (which may correspond to a page size of a PTE, or another size such as a smaller size than the page translated by a PTE). In another embodiment, the I/D information is obtained in conjunction with performing a second translation (e.g., using the TLB caching the PTE, in one embodiment), and stored in conjunction with the translation in the ERAT structure, in conjunction with the size of the ERAT (e.g., of the same size as that translated by the PTE, or another size, e.g., a fraction of the page of the PTE).

In at least one further optimized embodiment, when a ternary CAM is used to implement attribute matching, and when separate I/D attributes are present in the translation flow of 1610 to 1612, when an address translation from one input address (such as effective address) to one output address (such as real address) and associated output address information is to be entered for one attribute, and the same one input address (such as effective address) to the one same output address (such as real address) and the same (or compatible) associated output attribute information is to be entered for the other attribute, the entering can merge two distinct entries with separate I/D access attributes but similar input and output addresses. (Output attributes are for example compatible when one output attribute only applies to a specific one type of access corresponding to an input attribute.)

In at least one TLB structure, NOA information is obtained from NOA information stored in conjunction with PTE entries in a PTE group of an HPT, e.g., in accordance with the Power ISA. In at least one such embodiment, multiple translations for a virtual address may be specified in a PTE group, corresponding to a first and a second attribute and having different output target addresses, when an HPT is used to translate an input address to a different output address, responsive to differences in attributes. In a further embodiment, another HPT entry may indicate a translation of an input virtual address to an output address irrespective of and without reference to access attribute.

In at least one TLB structure, NOA information is generated from a radix structure, such that a translation of a PTE corresponding to a shared translation is stored in conjunction with NOA match information corresponding to matching both attributes, whereas PTE translations corresponding to separate target (output) address translations for accesses having an instruction and data attribute are stored as having NOA attributes corresponding to one or the other property.

In at least one embodiment, a single entry may be used for a NOA value that represents a matching capability for multiple attributes and performing matching with a ternary CAM. In at least one other embodiment, multiple entries corresponding to each specific selected attribute (and not using don't care encoding for matching) may be used, with one entry corresponding to each attribute value.

Figure 17:
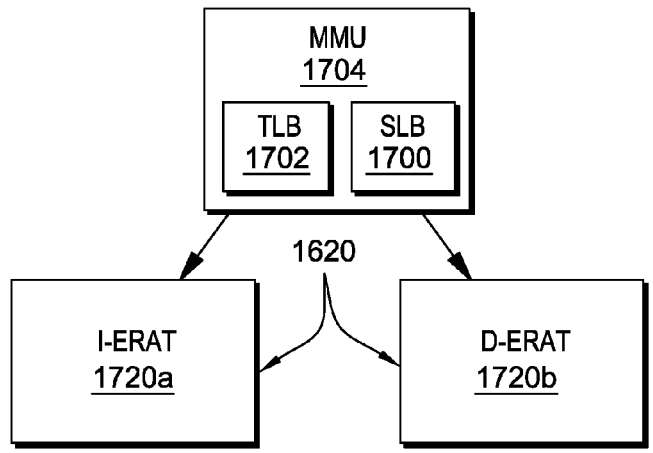
FIG. 17 depicts another example of a translation architecture.

Another translation architecture is depicted in FIG. 17, which also includes, for instance, an SLB 1700 and a TLB 1702 located within an MMU 1704, which is coupled to an ERAT structure 1720. In this example, however, ERAT structure 1720 includes an instruction ERAT substructure 1720*a* for address translations for instruction fetches, and a data ERAT substructure 1720*b* for address translations for data accesses. In one embodiment, each ERAT substructure includes address translation information, but does not include an attribute field or indicator, such as NOA.

Figure 18:
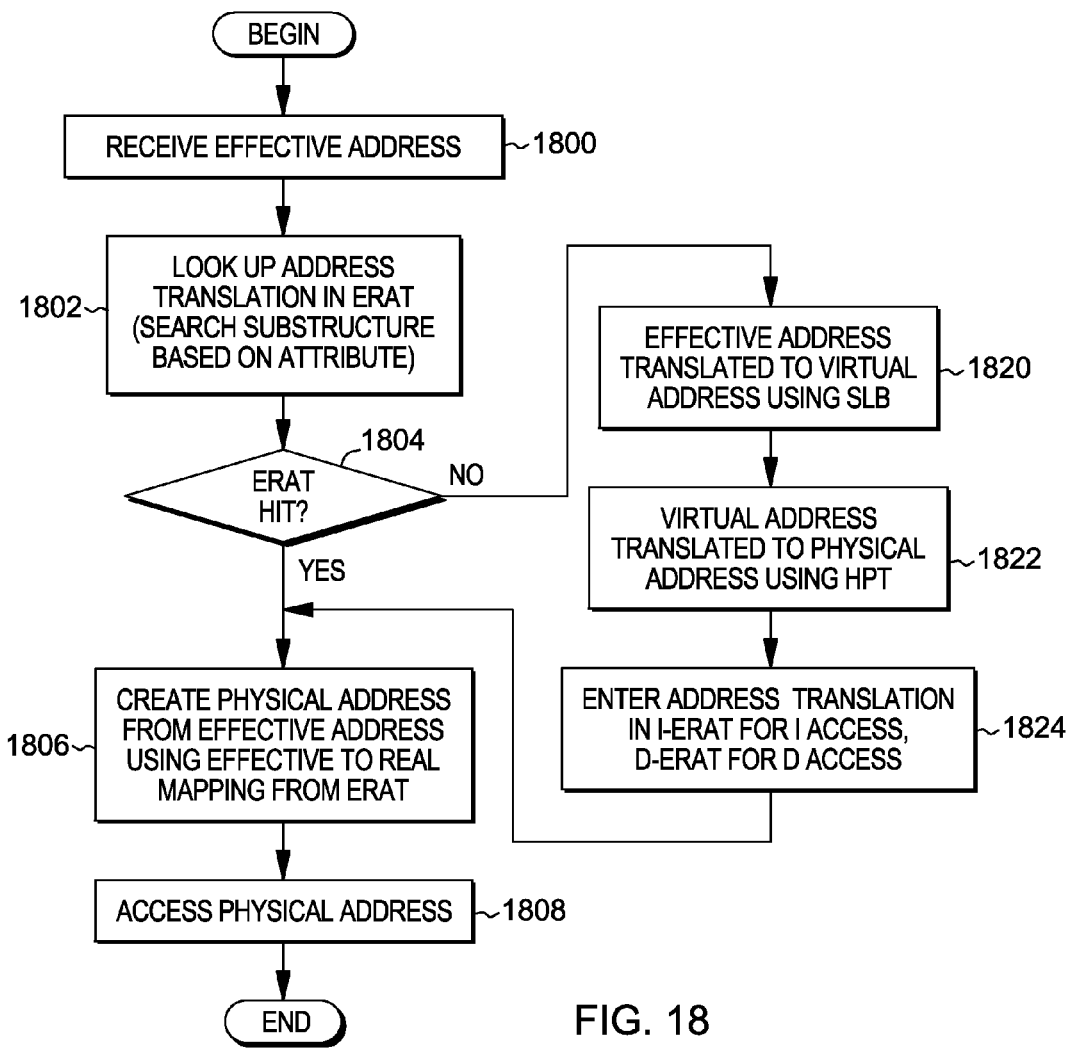
FIG. 18 depicts another embodiment of a translation process using an effective to real address translation structure.

One embodiment of the logic associated with address translations when the ERAT is a plurality of substructures is described with reference to FIG. 18. Initially, the MMU obtains (e.g., receives, is provided, or otherwise gets) an effective address to be translated to a physical address, STEP 1800. A search is performed in the ERAT to determine if the translation already exists, STEP 1802. In this example, the ERAT is architected as a plurality of substructures, and thus, a determination is made as to the attribute associated with the effective address (e.g., instruction fetch or data access). Then, depending on the attribute, the appropriate substructure is searched. For instance, if the address translation is for an instruction fetch, then the instruction ERAT substructure is searched; and if the address translation is for a data access, then the data ERAT substructure is searched. If there is a match in the appropriate ERAT, INQUIRY 1804, then the physical address is obtained from the mapping in the ERAT substructure, STEP 1806. The physical address may then be used to access the particular memory location, STEP 1808.

Returning to INQUIRY 1804, if a match was not found, then the effective address is translated to a virtual address using, e.g., an SLB, STEP 1820. The virtual address is then translated to a physical address using, e.g., the HPT or TLB, STEP 1822. The translated address is then added to the appropriate ERAT substructure, STEP 1824. For instance, if the address is translated for an instruction fetch, then the translated address is added to the I-ERAT substructure, and if the address is translated for a data access, then the translated address is added to the D-ERAT substructure. In yet another embodiment, when a translation is located that may translate both instruction and data addresses, an address translation entry may be simultaneously entered in both I and D ERAT structures 1720*a* and 1720*b* responsive to an access using just a single attribute. Processing then continues with STEP 1806, or in other embodiments, STEP 1802, or the address just created is used.

Although in the above examples, the attribute is instruction fetch or data access, other attributes may be used, including, but not limited to, load and store, as well as others. Further, although the attribute is related to address translations, one or more aspects may be related to other types of mechanisms using other types of attributes.

In a further embodiment, aspects of the address translation capability may be used in virtual environments and may be included in guest translations, host translations or both. One example of a computing environment incorporating the use of attributes in address translations for guest, host and/or guest and host translations is described with reference to FIG. 19.

Figure 19:
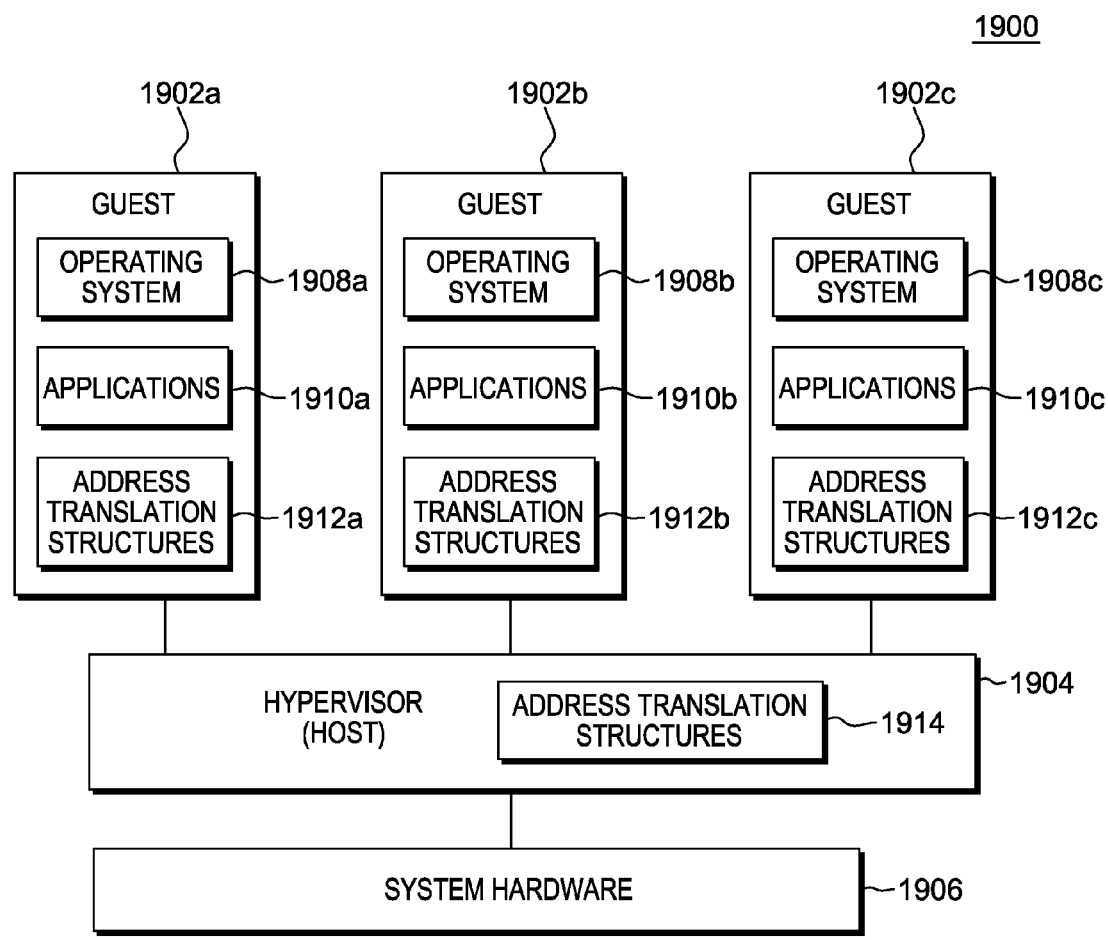
FIG. 19 depicts one embodiment of a computing environment having a host supporting one or more guests.

Referring to FIG. 19, a system configuration 1900 is depicted having guests 1902a, 1902b, and 1902c. The guests may be homogeneous with one another or one or more of the guests may be heterogeneous. In this particular example, guest 1902a is heterogeneous from guests 1902b and 1902c, as described below. Each guest may include, for instance, an operating system 1908a-1908c, one or more applications 1910a-1910c, and/or one or more address translation structures 1912a-1912c.

The guests are supported by a hypervisor 1904 running on system hardware 1906. In this example, the hypervisor is a paravirtualized hypervisor in which guest 1902a, as an example, has the ability to communicate with hypervisor 1904 to translate an address from a guest virtual address to a host physical address. That is, the guest manages, at least in part, the address space associated with the address being translated. For instance, if there is an address translation fault (a.k.a., a miss) during host address translation, operating system 1908a (e.g., AIX) is notified (e.g., by the hypervisor, firmware or hardware), and the operating system inserts the missing entry in a host address translation table 1914, although some information will be missing and is to be filled in by the hypervisor. In one example, the address translation table for guest 1902a is a hash page table.

Additionally, in one embodiment, hypervisor 1904 also supports guests 1902b, 1902c. However, unlike guest 1902a, guests 1902b, 1902c use a multilevel (a.k.a., nested) translation in which a guest virtual address is first translated to a guest physical address within the partition (e.g., using radix translation), and then the guest physical address is translated to the host physical address during host level translation using, for instance, radix translation, hash page table translation, etc. In this scenario, however, the guests are unaware of the hypervisor and do not communicate with the hypervisor. In one aspect of this scenario, the guests are unaware of the hypervisor with respect to host translation operations and do not communicate with the hypervisor with respect to host translations, but may be aware of the hypervisor with respect to other properties (e.g., such as I/O).

In the above environment, one or more of the guest address translations, host address translations or both may use the address translation capability described herein which utilizes an attribute in performing the address translations.

In one embodiment, when a paravirtualized environment is used (i.e., an environment in which the guest operating system manages address translation in conjunction with the hypervisor), the hypervisor may augment a HPT with separate I/D translation attribute information.

Figure 20:
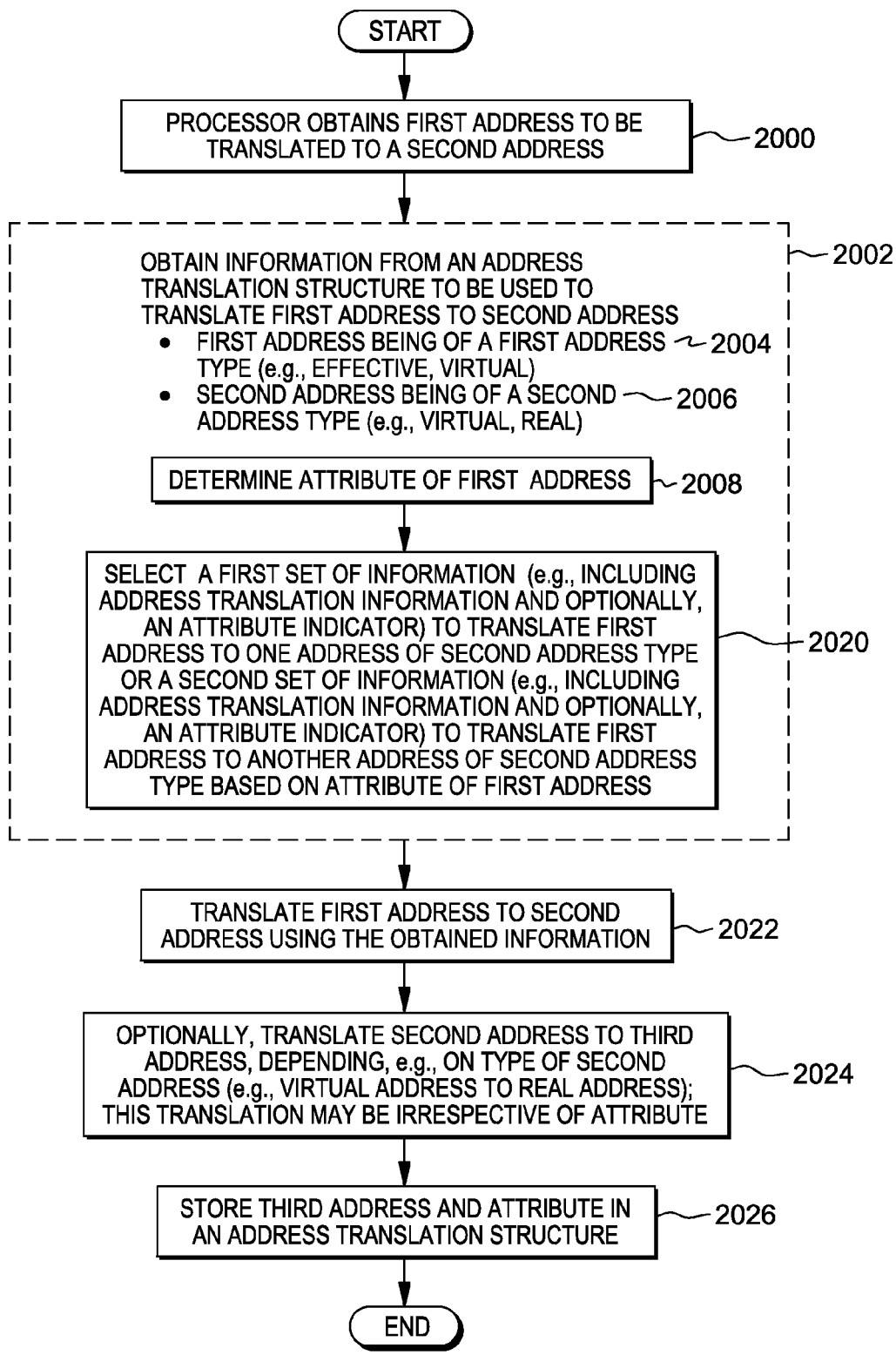
FIG. 20 depicts one embodiment of the logic associated with an address translation process.

Further details regarding translating an address to another address, regardless of the computing environment, are described with reference to FIG. 20. Initially, the processor (e.g., the MMU) obtains (e.g., receives, is provided or otherwise gets) a first address to be translated to a second address, STEP 2000. In one example, the first address is included in an address translation request sent to the MMU from a unit of the computing environment, such as a load/store unit or a fetch unit.

The processor then obtains, based on receiving the translation request, information from an address translation structure to be used to translate the first address to the second address, STEP 2002. The first address is of a first address type (e.g., effective address, virtual address) 2004, and the second address is of a second address type (e.g., a virtual address, a real address) 2006. To obtain the information, initially, an attribute of the first address is determined, STEP 2008. This may be determined based on the unit that forwarded the request. For instance, if the unit is a fetch unit, then it is assumed that the attribute is that the address is to be translated for an instruction fetch, and similarly, if the request is forwarded by the load/store unit, then it is assumed that the attribute is that the address is to be translated for data access. In other embodiments, an indicator may be included in the request to indicate whether the translation is for an instruction fetch or a data access. Also, other attributes may be used and indicated in a variety of ways.

Thereafter, a first set of information is selected to translate the first address to one address of the second address type or a second set of information is selected to translate the first address to another address of the second address type based on the attribute of the first address, STEP 2020. In one example, the first set of information and the second set of information each include address translation information and optionally an attribute indicator. For instance, if the address translation structure combines translations for different attributes, then an attribute indicator may be included in the set of information; however, if the address translation structure is implemented as separate substructures for different attributes, then an attribute indicator may not be included with this information.

In one embodiment, the first set of information and the second set of information are concurrently stored within the address translation structure to provide multiple addresses of the second address type to which the first address can be translated.

Based on obtaining the information, the first address is translated to the second address using the obtained information, STEP 2022. This may include using the address provided in the obtained information as the second address, or creating the second address based on the obtained information. For instance, if the translation is from an effective address to a real address and the obtained information includes the real address, then that address is used. In a further example, if the translation is from an effective address to a virtual address, then in one example, the VSID in the obtained information is used to create the virtual address.

Thereafter, optionally, if the second address is to be further translated, it may be translated to a third address, STEP 2024. For instance, if the second address is a virtual address, then the virtual address may be translated to a real address. In one aspect, the translating from the second address to the third address is independent of the attribute of the first address. That is, this translation is separate from and not even cognizant of the attribute. It is irrespective of the attribute. However, in a further embodiment, the translation from the second address to the third address also is based on an attribute. The third address may then be stored in an address translation structure (e.g., ERAT) with or without the attribute of the first address.

In another embodiment of multilevel translation, the first translation step is not cognizant of an attribute (e.g., the SLB effective to virtual translation, or a first radix MMU translation from guest virtual to guest real address (a first address to a second address)), and the second translation is cognizant of such attributes (e.g., the HPT translation from virtual to real address, or a second radix translation from host virtual to host real address (second address to a third address)), and a translation cognizant of the attributes from the first to the third address is stored in an address translation structure in conjunction with a selective input attribute.

Described in detail herein is an address translation capability that selectively chooses information to be used in the translation based on an attribute of the address to be translated. In one particular, example, information with different attributes are included in one structure, and in another embodiment, different substructures include information for different attributes. In one aspect, an address translation mechanism is provided that selectively performs address translation unique for instruction and data accesses, and that marks the resulting translation in a TLB or cache as being an instruction address or a data address. In an embodiment, the two address translation mechanisms utilize different translation structures (e.g., radix v. page table walk, etc.).

Figure 21:
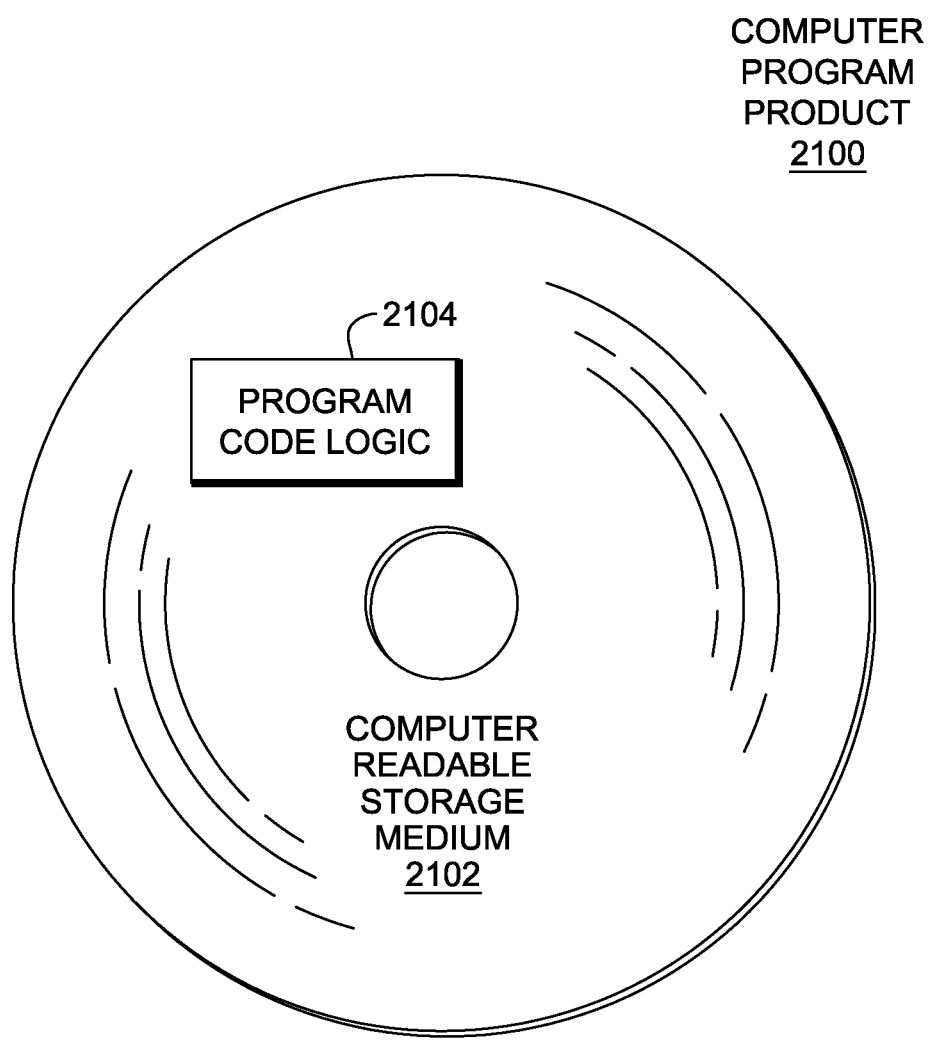
FIG. 21 depicts one embodiment of a computer program product.

Referring to FIG. 21, in one example, a computer program product 2100 includes, for instance, one or more non-transitory computer readable storage media 2102 to store computer readable program code means, logic and/or instructions 2104 thereon to provide and facilitate one or more embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments. Further, different instructions, instruction formats, instruction fields and/or instruction values may be used. Yet further, other types of address translation may benefit from one or more aspects. Many variations are possible.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

Figure 22:
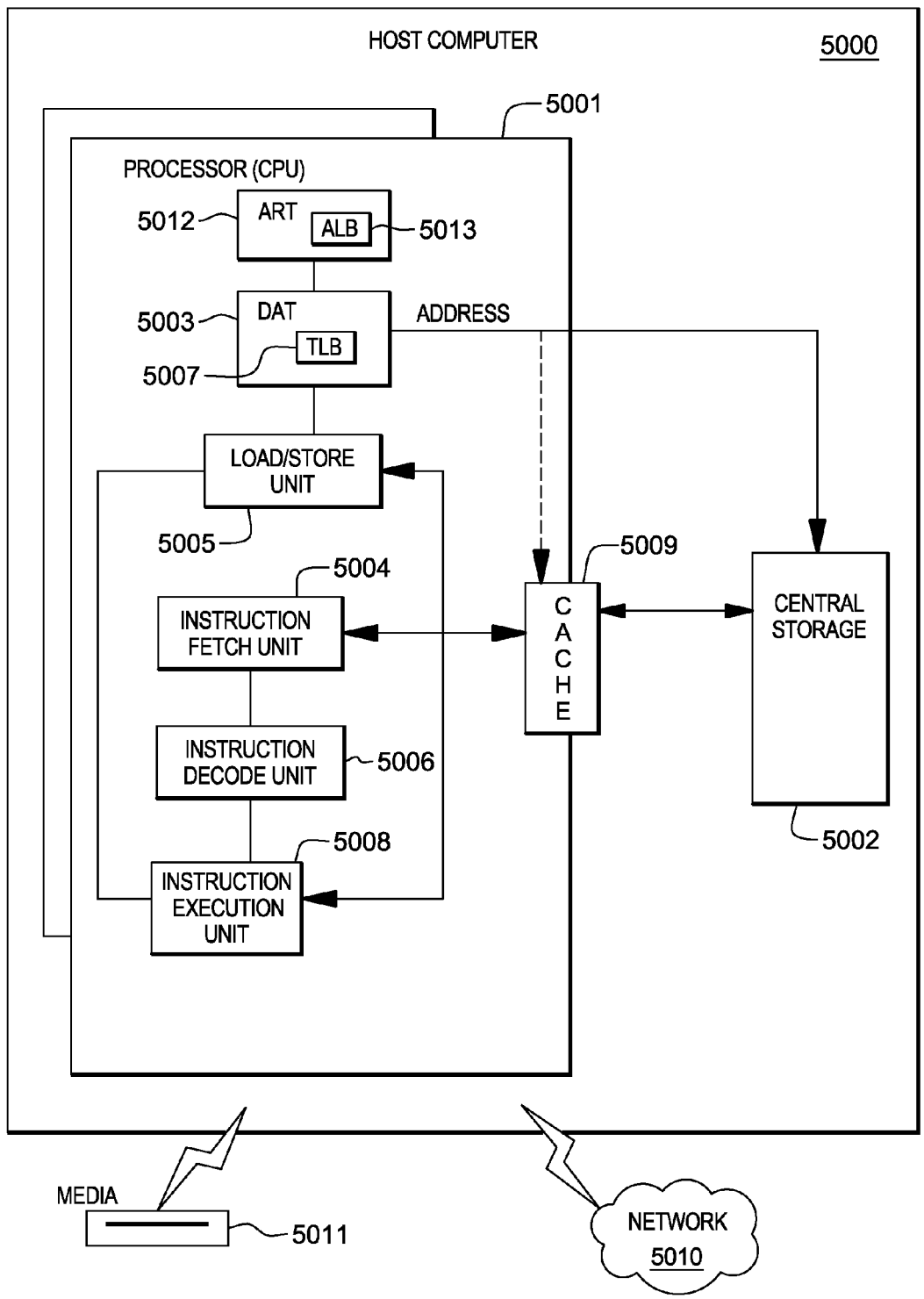
FIG. 22 depicts one embodiment of a host computer system.

Referring to FIG. 22, representative components of a Host Computer system 5000 to implement one or more embodiments are portrayed. The representative host computer 5000 comprises one or more CPUs 5001 in communication with computer memory (i.e., central storage) 5002, as well as I/O interfaces to storage media devices 5011 and networks 5010 for communicating with other computers or SANs and the like. The CPU 5001 is compliant with an architecture having an architected instruction set and architected functionality. The CPU 5001 may have access register translation (ART) 5012, which includes an ART lookaside buffer (ALB) 5013, for selecting an address space to be used by dynamic address translation (DAT) 5003 for transforming program addresses (virtual addresses) into real addresses of memory. A DAT typically includes a translation lookaside buffer (TLB) 5007 for caching translations so that later accesses to the block of computer memory 5002 do not require the delay of address translation. Typically, a cache 5009 is employed between computer memory 5002 and the processor 5001. The cache 5009 may be hierarchical having a large cache available to more than one CPU and smaller, faster (lower level) caches between the large cache and each CPU. In some implementations, the lower level caches are split to provide separate low level caches for instruction fetching and data accesses.

In one embodiment, an instruction is fetched from memory 5002 by an instruction fetch unit 5004 via a cache 5009. The instruction is decoded in an instruction decode unit 5006 and dispatched (with other instructions in some embodiments) to instruction execution unit or units 5008. Typically several execution units 5008 are employed, for example an arithmetic execution unit, a floating point execution unit and a branch instruction execution unit. The instruction is executed by the execution unit, accessing operands from instruction specified registers or memory as needed. If an operand is to be accessed (loaded or stored) from memory 5002, a load/store unit 5005 typically handles the access under control of the instruction being executed. Instructions may be executed in hardware circuits or in internal microcode (firmware) or by a combination of both.

As noted, a computer system includes information in local (or main) storage, as well as addressing, protection, and reference and change recording. Some aspects of addressing include the format of addresses, the concept of address spaces, the various types of addresses, and the manner in which one type of address is translated to another type of address. Some of main storage includes permanently assigned storage locations. Main storage provides the system with directly addressable fast-access storage of data. Both data and programs are to be loaded into main storage (from input devices) before they can be processed.

Main storage may include one or more smaller, faster-access buffer storages, sometimes called caches. A cache is typically physically associated with a CPU or an I/O processor. The effects, except on performance, of the physical construction and use of distinct storage media are generally not observable by the program.

Separate caches may be maintained for instructions and for data operands. Information within a cache is maintained in contiguous bytes on an integral boundary called a cache block or cache line (or line, for short). A model may provide an EXTRACT CACHE ATTRIBUTE instruction which returns the size of a cache line in bytes. In another embodiment, this information may be obtained from firmware, e.g., in accordance with interfaces specified by the Power Architecture Platform Reference specification. A model may also provide one or more of data cache block touch (dcbt), PREFETCH DATA and PREFETCH DATA RELATIVE LONG instructions which effects the prefetching of storage into the data or instruction cache or the releasing of data from the cache.

Storage is viewed as a long horizontal string of bits. For most operations, accesses to storage proceed in a left-to-right sequence. The string of bits is subdivided into units of eight bits. An eight-bit unit is called a byte, which is the basic building block of all information formats. Each byte location in storage is identified by a unique nonnegative integer, which is the address of that byte location or, simply, the byte address. Adjacent byte locations have consecutive addresses, starting with 0 on the left and proceeding in a left-to-right sequence. Addresses are unsigned binary integers and are 24, 31, or 64 bits.

Information is transmitted between storage and a CPU or a channel subsystem one byte, or a group of bytes, at a time. Unless otherwise specified, in, for instance, the Power ISA and z/Architecture, a group of bytes in storage is addressed by the leftmost byte of the group. The number of bytes in the group is either implied or explicitly specified by the operation to be performed. When used in a CPU operation, a group of bytes is called a field. Within each group of bytes, in, for instance, the Power ISA and z/Architecture, bits are numbered in a left-to-right sequence. In the Power ISA and z/Architecture, the leftmost bits are sometimes referred to as the "high-order" bits and the rightmost bits as the "low-order" bits. Bit numbers are not storage addresses, however. Only bytes can be addressed. To operate on individual bits of a byte in storage, the entire byte is accessed. The bits in a byte are numbered 0 through 7, from left to right (in, e.g., the z/Architecture). The bits in an address may be numbered 8-31 or 40-63 for 24-bit addresses, or 1-31 or 33-63 for 31-bit addresses; they are numbered 0-63 for 64-bit addresses. In one example, bits 8-31 and 1-31 apply to addresses that are in a location (e.g., register) that is 32 bits wide, whereas bits 40-63 and 33-63 apply to addresses that are in a 64-bit wide location. Within any other fixed-length format of multiple bytes, the bits making up the format are consecutively numbered starting from 0. For purposes of error detection, and in preferably for correction, one or more check bits may be transmitted with each byte or with a group of bytes. Such check bits are generated automatically by the machine and cannot be directly controlled by the program. Storage capacities are expressed in number of bytes. When the length of a storage-operand field is implied by the operation code of an instruction, the field is said to have a fixed length, which can be one, two, four, eight, or sixteen bytes. Larger fields may be implied for some instructions. When the length of a storage-operand field is not implied but is stated explicitly, the field is said to have a variable length. Variable-length operands can vary in length by increments of one byte (or with some instructions, in multiples of two bytes or other multiples). When information is placed in storage, the contents of only those byte locations are replaced that are included in the designated field, even though the width of the physical path to storage may be greater than the length of the field being stored.

Certain units of information are to be on an integral boundary in storage. A boundary is called integral for a unit of information when its storage address is a multiple of the length of the unit in bytes. Special names are given to fields of 2, 4, 8, 16, and 32 bytes on an integral boundary. A halfword is a group of two consecutive bytes on a two-byte boundary and is the basic building block of instructions. A word is a group of four consecutive bytes on a four-byte boundary. A doubleword is a group of eight consecutive bytes on an eight-byte boundary. A quadword is a group of 16 consecutive bytes on a 16-byte boundary. An octoword is a group of 32 consecutive bytes on a 32-byte boundary. When storage addresses designate halfwords, words, doublewords, quadwords, and octowords, the binary representation of the address contains one, two, three, four, or five rightmost zero bits, respectively. Instructions are to be on two-byte integral boundaries. The storage operands of most instructions do not have boundary-alignment requirements.

On devices that implement separate caches for instructions and data operands, a significant delay may be experienced if the program stores into a cache line from which instructions are subsequently fetched, regardless of whether the store alters the instructions that are subsequently fetched.

In one example, the embodiment may be practiced by software (sometimes referred to licensed internal code, firmware, micro-code, milli-code, pico-code and the like, any of which would be consistent with one or more embodiments). Referring to FIG. 22, software program code which embodies one or more aspects may be accessed by processor 5001 of the host system 5000 from long-term storage media devices 5011, such as a CD-ROM drive, tape drive or hard drive. The software program code may be embodied on any of a variety of known media for use with a data processing system, such as a diskette, hard drive, or CD-ROM. The code may be distributed on such media, or may be distributed to users from computer memory 5002 or storage of one computer system over a network 5010 to other computer systems for use by users of such other systems.

The software program code includes an operating system which controls the function and interaction of the various computer components and one or more application programs. Program code is normally paged from storage media device 5011 to the relatively higher-speed computer storage 5002 where it is available for processing by processor 5001. The techniques and methods for embodying software program code in memory, on physical media, and/or distributing software code via networks are well known and will not be further discussed herein. Program code, when created and stored on a tangible medium (including but not limited to electronic memory modules (RAM), flash memory, Compact Discs (CDs), DVDs, Magnetic Tape and the like is often referred to as a "computer program product". The computer program product medium is typically readable by a processing circuit preferably in a computer system for execution by the processing circuit.

Figure 23:
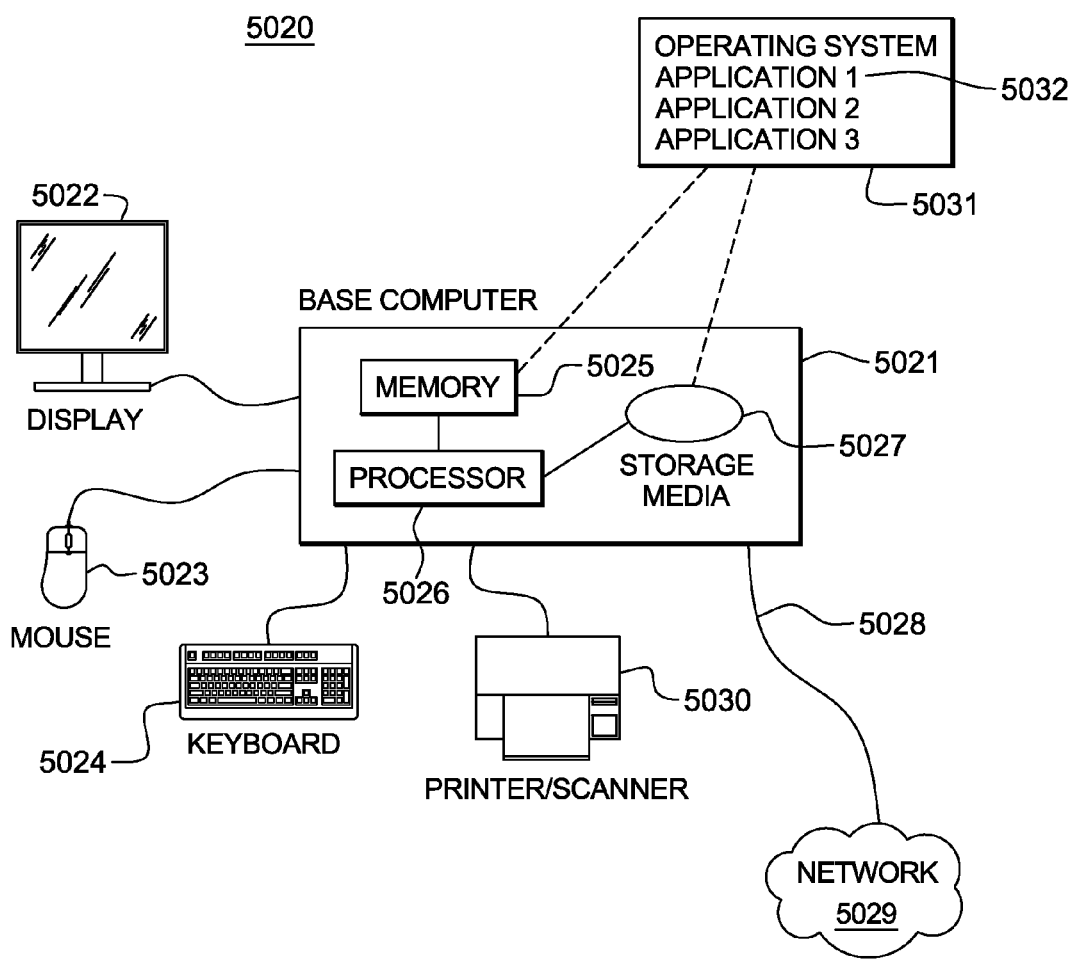
FIG. 23 depicts a further example of a computer system.

FIG. 23 illustrates a representative workstation or server hardware system in which one or more embodiments may be practiced. The system 5020 of FIG. 23 comprises a representative base computer system 5021, such as a personal computer, a workstation or a server, including optional peripheral devices. The base computer system 5021 includes one or more processors 5026 and a bus employed to connect and enable communication between the processor(s) 5026 and the other components of the system 5021 in accordance with known techniques. The bus connects the processor 5026 to memory 5025 and long-term storage 5027 which can include a hard drive (including any of magnetic media, CD, DVD and Flash Memory for example) or a tape drive for example. The system 5021 might also include a user interface adapter, which connects the microprocessor 5026 via the bus to one or more interface devices, such as a keyboard 5024, a mouse 5023, a printer/scanner 5030 and/or other interface devices, which can be any user interface device, such as a touch sensitive screen, digitized entry pad, etc. The bus also connects a display device 5022, such as an LCD screen or monitor, to the microprocessor 5026 via a display adapter.

The system 5021 may communicate with other computers or networks of computers by way of a network adapter capable of communicating 5028 with a network 5029. Example network adapters are communications channels, token ring, Ethernet or modems. Alternatively, the system 5021 may communicate using a wireless interface, such as a CDPD (cellular digital packet data) card. The system 5021 may be associated with such other computers in a Local Area Network (LAN) or a Wide Area Network (WAN), or the system 5021 can be a client in a client/server arrangement with another computer, etc. All of these configurations, as well as the appropriate communications hardware and software, are known in the art.

Figure 24:
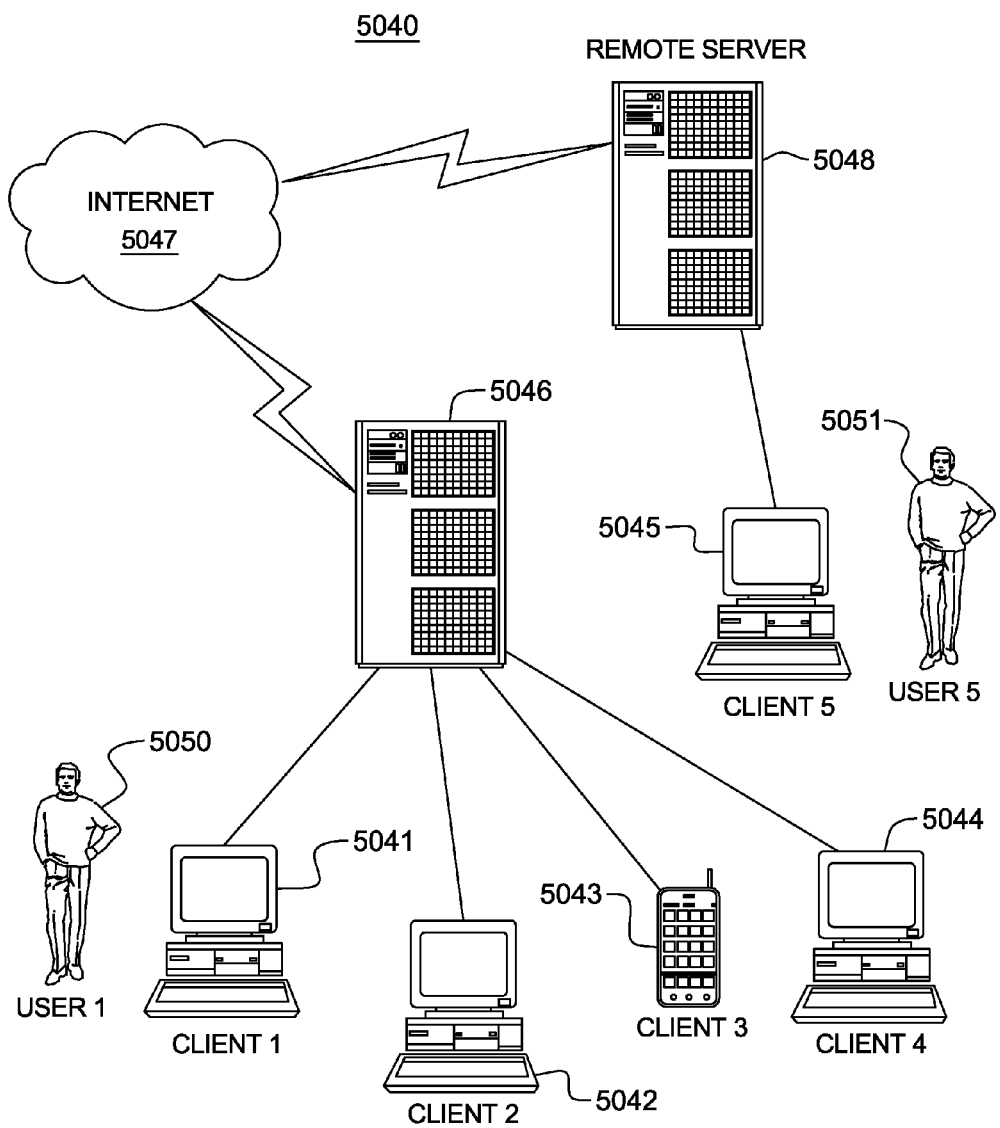
FIG. 24 depicts another example of a computer system comprising a computer network.

FIG. 24 illustrates a data processing network 5040 in which one or more embodiments may be practiced. The data processing network 5040 may include a plurality of individual networks, such as a wireless network and a wired network, each of which may include a plurality of individual workstations 5041, 5042, 5043, 5044. Additionally, as those skilled in the art will appreciate, one or more LANs may be included, where a LAN may comprise a plurality of intelligent workstations coupled to a host processor.

Still referring to FIG. 24, the networks may also include mainframe computers or servers, such as a gateway computer (client server 5046) or application server (remote server 5048 which may access a data repository and may also be accessed directly from a workstation 5045). A gateway computer 5046 serves as a point of entry into each individual network. A gateway is needed when connecting one networking protocol to another. The gateway 5046 may be preferably coupled to another network (the Internet 5047 for example) by means of a communications link. The gateway 5046 may also be directly coupled to one or more workstations 5041, 5042, 5043, 5044 using a communications link. The gateway computer may be implemented utilizing one of an IBM Power Systems server and an IBM System z server available from International Business Machines Corporation.

Referring concurrently to FIG. 23 and FIG. 24, software programming code 5031 which may embody one or more aspects may be accessed by the processor 5026 of the system 5020 from long-term storage media 5027, such as a CD-ROM drive or hard drive. The software programming code may be embodied on any of a variety of known media for use with a data processing system, such as a diskette, hard drive, or CD-ROM. The code may be distributed on such media, or may be distributed to users 5050, 5051 from the memory or storage of one computer system over a network to other computer systems for use by users of such other systems.

Alternatively, the programming code may be embodied in the memory 5025, and accessed by the processor 5026 using the processor bus. Such programming code includes an operating system which controls the function and interaction of the various computer components and one or more application programs 5032. Program code is normally paged from storage media 5027 to high-speed memory 5025 where it is available for processing by the processor 5026. The techniques and methods for embodying software programming code in memory, on physical media, and/or distributing software code via networks are well known and will not be further discussed herein. Program code, when created and stored on a tangible medium (including but not limited to electronic memory modules (RAM), flash memory, Compact Discs (CDs), DVDs, Magnetic Tape and the like is often referred to as a "computer program product". The computer program product medium is typically readable by a processing circuit preferably in a computer system for execution by the processing circuit.

The cache that is most readily available to the processor (normally faster and smaller than other caches of the processor) is the lowest (L1 or level one) cache and main store (main memory) is the highest level cache (L3 if there are 3 levels). The lowest level cache is often divided into an instruction cache (I-Cache) holding machine instructions to be executed and a data cache (D-Cache) holding data operands.

Figure 25:
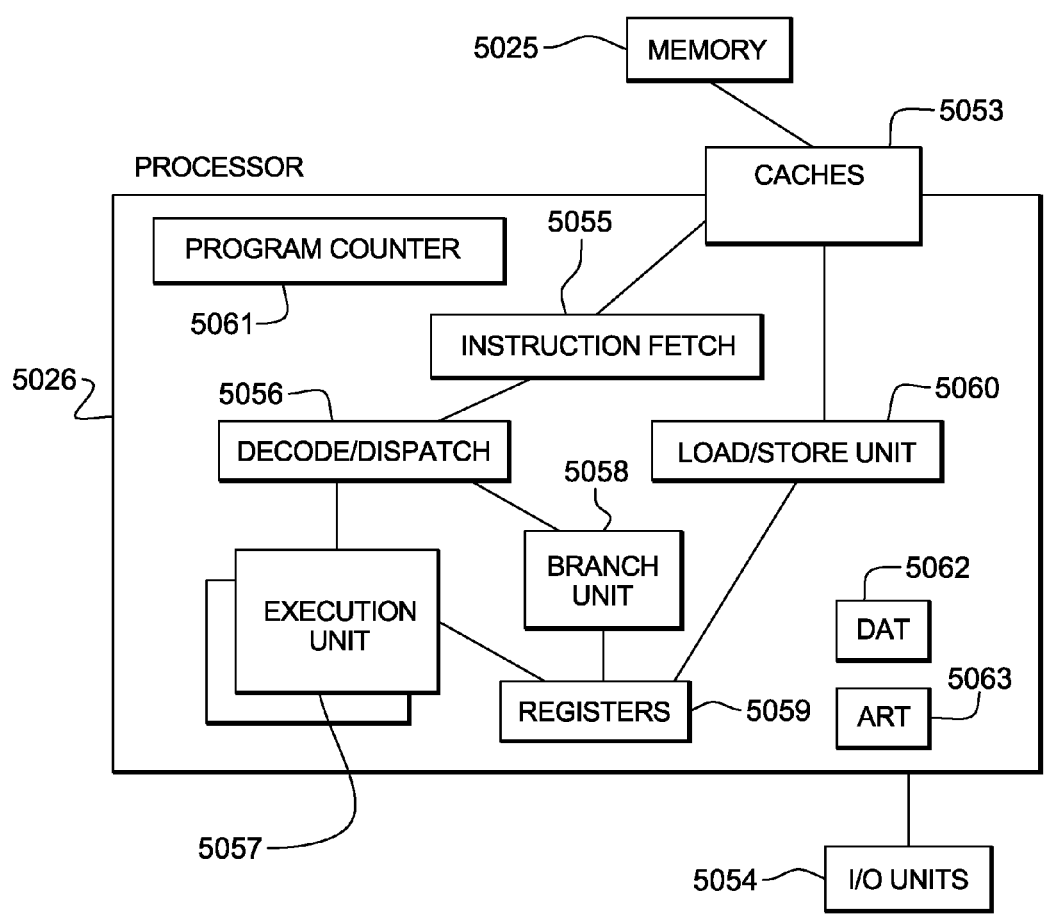
FIG. 25 depicts one embodiment of various elements of a computer system.

Referring to FIG. 25, an exemplary processor embodiment is depicted for processor 5026. Typically one or more levels of cache 5053 are employed to buffer memory blocks in order to improve processor performance. The cache 5053 is a high speed buffer holding cache lines of memory data that are likely to be used. Typical cache lines are 64, 128 or 256 bytes of memory data. Separate caches are often employed for caching instructions than for caching data. Cache coherence (synchronization of copies of lines in memory and the caches) is often provided by various "snoop" algorithms well known in the art. Main memory storage 5025 of a processor system is often referred to as a cache. In a processor system having 4 levels of cache 5053, main storage 5025 is sometimes referred to as the level 5 (L5) cache since it is typically faster and only holds a portion of the non-volatile storage (DASD, tape etc) that is available to a computer system. Main storage 5025 "caches" pages of data paged in and out of the main storage 5025 by the operating system.

A program counter (instruction counter) 5061 keeps track of the address of the current instruction to be executed. A program counter in a z/Architecture processor is 64 bits and can be truncated to 31 or 24 bits to support prior addressing limits. A program counter in a Power Architecture processor is 64 bits and can be truncated to 32 bits to support prior addressing limits. A program counter is typically embodied in a PSW (program status word) of a computer such that it persists during context switching. Thus, a program in progress, having a program counter value, may be interrupted by, for example, the operating system (context switch from the program environment to the operating system environment). The PSW of the program maintains the program counter value while the program is not active, and the program counter (in the PSW) of the operating system is used while the operating system is executing. Typically, the program counter is incremented by an amount equal to the number of bytes of the current instruction. RISC (Reduced Instruction Set Computing) instructions are typically fixed length while CISC (Complex Instruction Set Computing) instructions are typically variable length. Instructions of the IBM z/Architecture are CISC instructions having a length of 2, 4 or 6 bytes. Instructions of the IBM Power ISA are RISC instructions having a length of 4 bytes. The Program counter 5061 is modified by either a context switch operation or a branch taken operation of a branch instruction for example. In a context switch operation, the current program counter value is saved in the program status word along with other state information about the program being executed (such as condition codes), and a new program counter value is loaded pointing to an instruction of a new program module to be executed. A branch taken operation is performed in order to permit the program to make decisions or loop within the program by loading the result of the branch instruction into the program counter 5061.

Typically an instruction fetch unit 5055 is employed to fetch instructions on behalf of the processor 5026. The fetch unit either fetches "next sequential instructions", target instructions of branch taken instructions, or first instructions of a program following a context switch. Modern Instruction fetch units often employ prefetch techniques to speculatively prefetch instructions based on the likelihood that the prefetched instructions might be used. For example, a fetch unit may fetch 16 bytes of instruction that includes the next sequential instruction and additional bytes of further sequential instructions.

The fetched instructions are then executed by the processor 5026. In an embodiment, the fetched instruction(s) are passed to a dispatch unit 5056 of the fetch unit. The dispatch unit decodes the instruction(s) and forwards information about the decoded instruction(s) to appropriate units 5057, 5058, 5060. An execution unit 5057 will typically receive information about decoded arithmetic instructions from the instruction fetch unit 5055 and will perform arithmetic operations on operands according to the opcode of the instruction. Operands are provided to the execution unit 5057 preferably either from memory 5025, architected registers 5059 or from an immediate field of the instruction being executed. Results of the execution, when stored, are stored either in memory 5025, registers 5059 or in other machine hardware (such as control registers, PSW registers and the like).

Virtual addresses are transformed into real addresses using dynamic address translation 5062 and, optionally, using access register translation 5063.

Figure 26A:
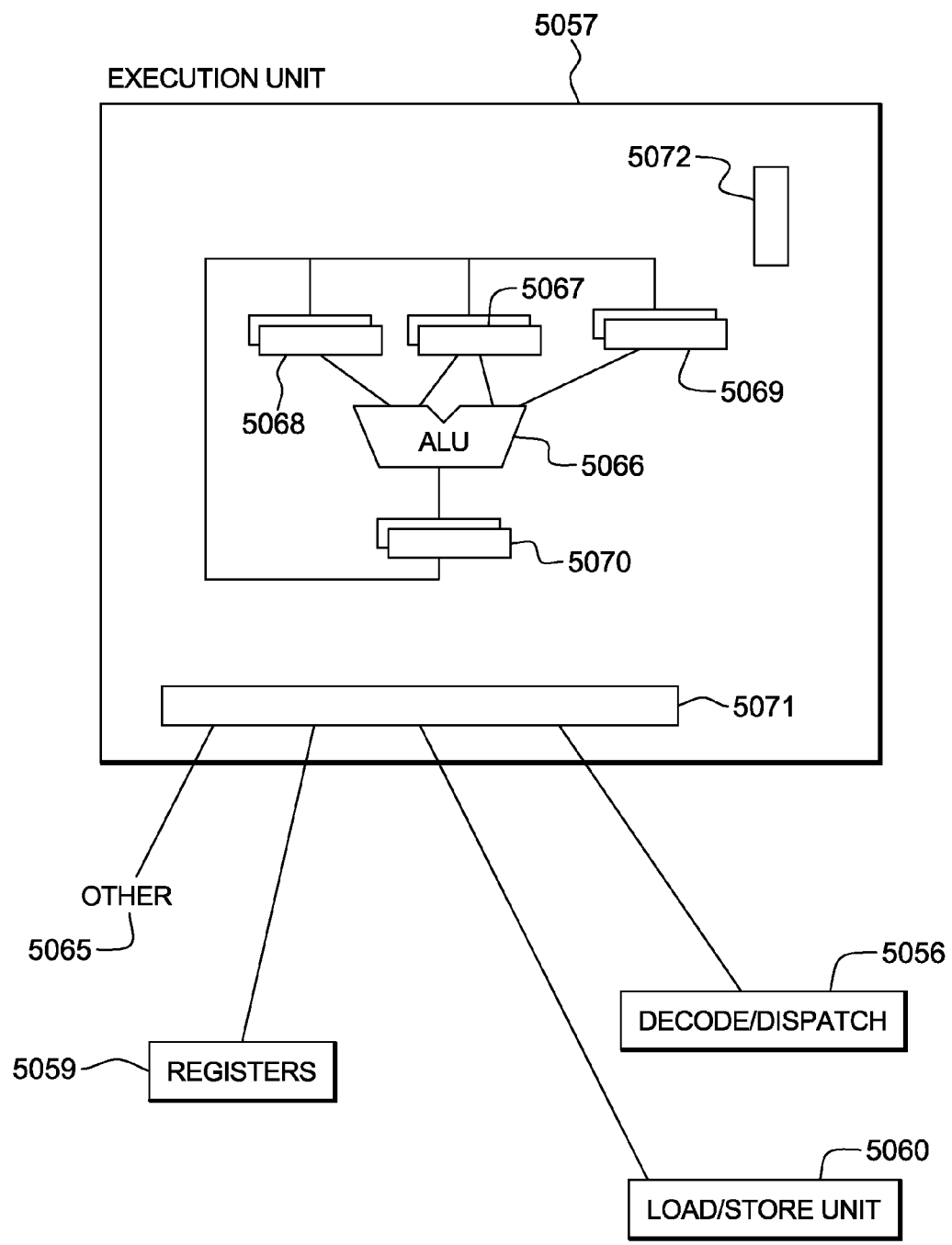
FIG. 26A depicts one embodiment of the execution unit of the computer system of FIG. 25.

A processor 5026 typically has one or more units 5057, 5058, 5060 for executing the function of the instruction. Referring to FIG. 26A, an execution unit 5057 may communicate 5071 with architected general registers 5059, a decode/dispatch unit 5056, a load store unit 5060, and other 5065 processor units by way of interfacing logic 5071. An execution unit 5057 may employ several register circuits 5067, 5068, 5069 to hold information that the arithmetic logic unit (ALU) 5066 will operate on. The ALU performs arithmetic operations such as add, subtract, multiply and divide as well as logical function such as and, or and exclusive-or (XOR), rotate and shift. Preferably the ALU supports specialized operations that are design dependent. Other circuits may provide other architected facilities 5072 including condition codes and recovery support logic for example. Typically the result of an ALU operation is held in an output register circuit 5070 which can forward the result to a variety of other processing functions. There are many arrangements of processor units, the present description is only intended to provide a representative understanding of one embodiment.

An ADD instruction for example would be executed in an execution unit 5057 having arithmetic and logical functionality while a floating point instruction for example would be executed in a floating point execution having specialized floating point capability. Preferably, an execution unit operates on operands identified by an instruction by performing an opcode defined function on the operands. For example, an ADD instruction may be executed by an execution unit 5057 on operands found in two registers 5059 identified by register fields of the instruction.

The execution unit 5057 performs the arithmetic addition on two operands and stores the result in a third operand where the third operand may be a third register or one of the two source registers. The execution unit preferably utilizes an Arithmetic Logic Unit (ALU) 5066 that is capable of performing a variety of logical functions such as Shift, Rotate, And, Or and XOR as well as a variety of algebraic functions including any of add, subtract, multiply, divide. Some ALUs 5066 are designed for scalar operations and some for floating point. Data may be Big Endian (where the least significant byte is at the highest byte address) or Little Endian (where the least significant byte is at the lowest byte address) depending on architecture. The IBM z/Architecture is Big Endian. The IBM Power ISA supports both Big Endian and Little Endian execution modes. Signed fields may be sign and magnitude, 1's complement or 2's complement depending on architecture. A 2's complement number is advantageous in that the ALU does not need to design a subtract capability since either a negative value or a positive value in 2's complement requires only an addition within the ALU. Numbers are commonly described in shorthand, where a 12 bit field defines an address of a 4,096 byte block and is commonly described as a 4 Kbyte (Kilo-byte) block, for example.

Figure 26B:
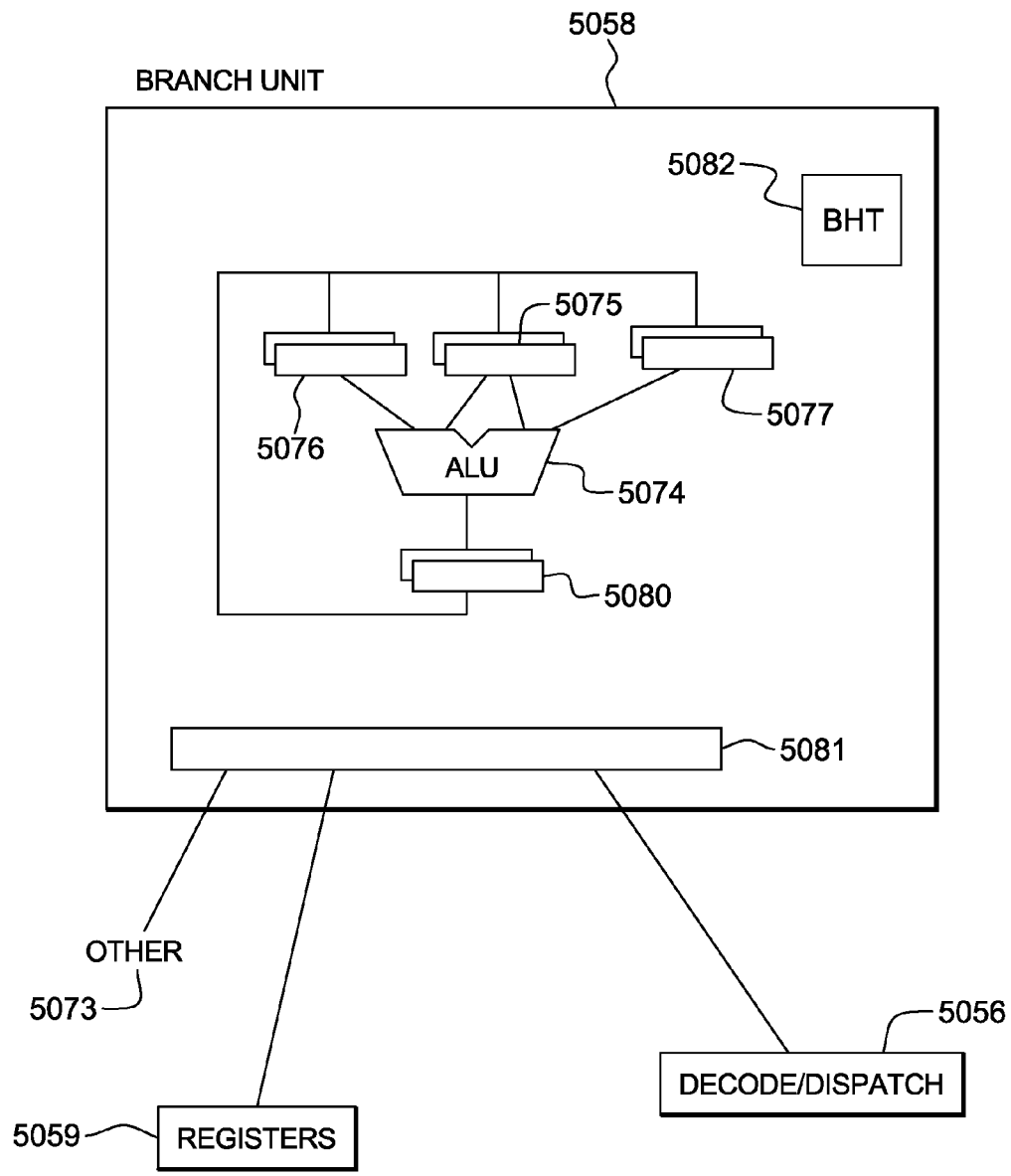
FIG. 26B depicts one embodiment of the branch unit of the computer system of FIG. 25.

Referring to FIG. 26B, branch instruction information for executing a branch instruction is typically sent to a branch unit 5058 which often employs a branch prediction algorithm such as a branch history table 5082 to predict the outcome of the branch before other conditional operations are complete. The target of the current branch instruction will be fetched and speculatively executed before the conditional operations are complete. When the conditional operations are completed the speculatively executed branch instructions are either completed or discarded based on the conditions of the conditional operation and the speculated outcome. A typical branch instruction may test condition codes and branch to a target address if the condition codes meet the branch requirement of the branch instruction, a target address may be calculated based on several numbers including ones found in register fields or an immediate field of the instruction for example. The branch unit 5058 may employ an ALU 5074 having a plurality of input register circuits 5075, 5076, 5077 and an output register circuit 5080. The branch unit 5058 may communicate 5081 with general registers 5059, decode dispatch unit 5056 or other circuits 5073, for example.

The execution of a group of instructions can be interrupted for a variety of reasons including a context switch initiated by an operating system, a program exception or error causing a context switch, an I/O interruption signal causing a context switch or multi-threading activity of a plurality of programs (in a multi-threaded environment), for example. Preferably a context switch action saves state information about a currently executing program and then loads state information about another program being invoked. State information may be saved in hardware registers or in memory for example. State information preferably comprises a program counter value pointing to a next instruction to be executed, condition codes, memory translation information and architected register content. A context switch activity can be exercised by hardware circuits, application programs, operating system programs or firmware code (microcode, pico-code or licensed internal code (LIC)) alone or in combination.

A processor accesses operands according to instruction defined methods. The instruction may provide an immediate operand using the value of a portion of the instruction, may provide one or more register fields explicitly pointing to either general purpose registers or special purpose registers (floating point registers for example). The instruction may utilize implied registers identified by an opcode field as operands. The instruction may utilize memory locations for operands. A memory location of an operand may be provided by a register, an immediate field, or a combination of registers and immediate field as exemplified by the z/Architecture long displacement facility wherein the instruction defines a base register, an index register and an immediate field (displacement field) that are added together to provide the address of the operand in memory for example; or the Power ISA addressing modes where D-Form addresses define a base register and an immediate field (displacement field) that are added together to provide the address of the operand in memory; and wherein X-Form addresses define a base register and an index register that are added together to provide the address of the operand in memory. Location herein typically implies a location in main memory (main storage) unless otherwise indicated.

Figure 26C:
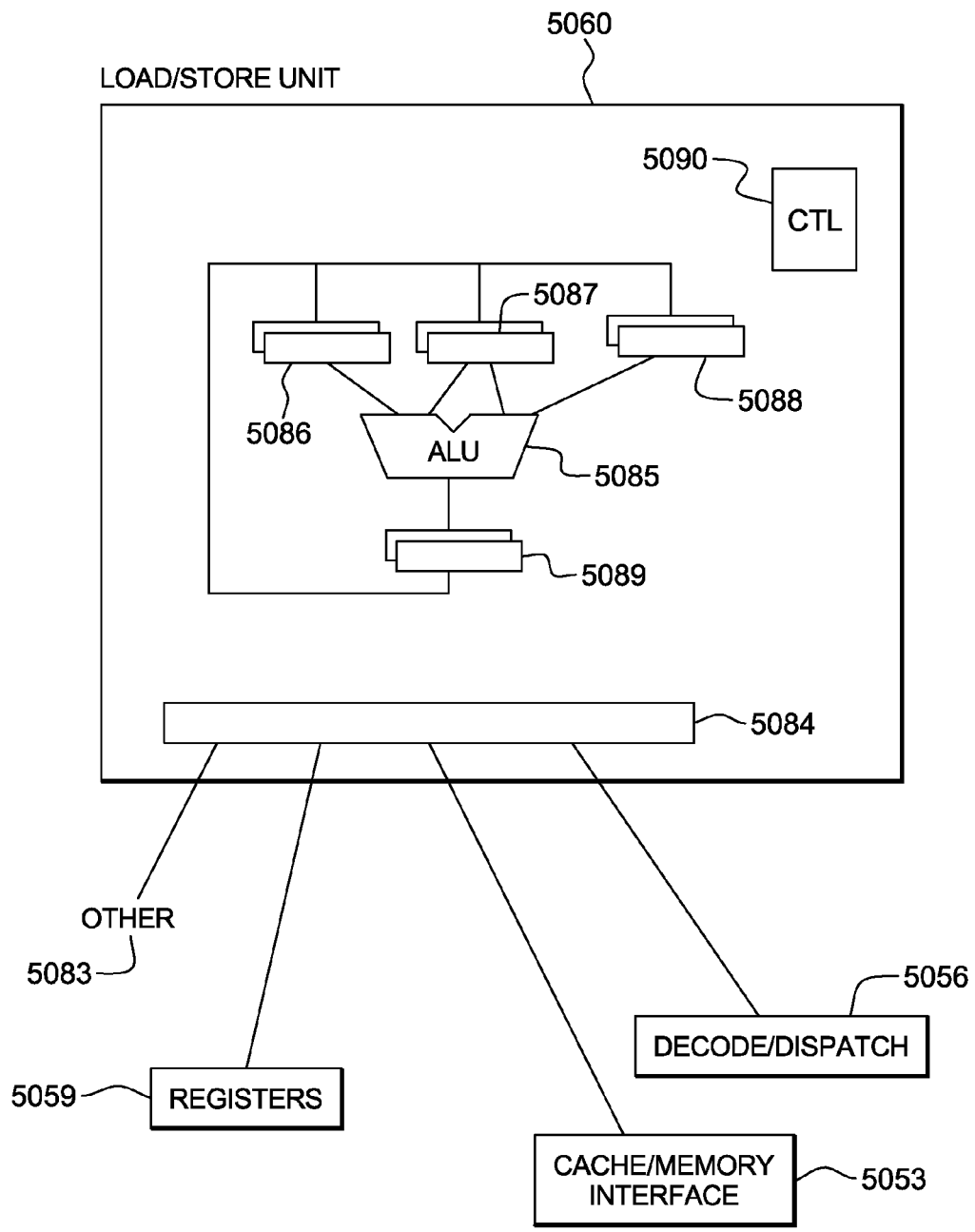
FIG. 26C depicts one embodiment of the load/store unit of the computer system of FIG. 25.

Referring to FIG. 26C, a processor accesses storage using a load/store unit 5060. The load/store unit 5060 may perform a load operation by obtaining the address of the target operand in memory 5053 and loading the operand in a register 5059 or another memory 5053 location, or may perform a store operation by obtaining the address of the target operand in memory 5053 and storing data obtained from a register 5059 or another memory 5053 location in the target operand location in memory 5053. The load/store unit 5060 may be speculative and may access memory in a sequence that is out-of-order relative to instruction sequence, however the load/store unit 5060 is to maintain the appearance to programs that instructions were executed in order. A load/store unit 5060 may communicate 5084 with general registers 5059, decode/dispatch unit 5056, cache/memory interface 5053 or other elements 5083 and comprises various register circuits 5086, 5087, 5088 and 5089, ALUs 5085 and control logic 5090 to calculate storage addresses and to provide pipeline sequencing to keep operations in-order. Some operations may be out of order but the load/store unit provides functionality to make the out of order operations to appear to the program as having been performed in order, as is well known in the art.

Preferably addresses that an application program "sees" are often referred to as virtual addresses. Virtual addresses are sometimes referred to as "logical addresses" and "effective addresses". These virtual addresses are virtual in that they are redirected to physical memory location by one of a variety of dynamic address translation (DAT) technologies including, but not limited to, simply prefixing a virtual address with an offset value, translating the virtual address via one or more translation tables, the translation tables preferably comprising at least a segment table and a page table alone or in combination, preferably, the segment table having an entry pointing to the page table. In the z/Architecture, a hierarchy of translation is provided including a region first table, a region second table, a region third table, a segment table and an optional page table. The performance of the address translation is often improved by utilizing a translation lookaside buffer (TLB) which comprises entries mapping a virtual address to an associated physical memory location. The entries are created when the DAT translates a virtual address using the translation tables. Subsequent use of the virtual address can then utilize the entry of the fast TLB rather than the slow sequential translation table accesses. TLB content may be managed by a variety of replacement algorithms including LRU (Least Recently used).

In the case where the processor is a processor of a multi-processor system, each processor has responsibility to keep shared resources, such as I/O, caches, TLBs and memory, interlocked for coherency. Typically, "snoop" technologies will be utilized in maintaining cache coherency. In a snoop environment, each cache line may be marked as being in any one of a shared state, an exclusive state, a changed state, an invalid state and the like in order to facilitate sharing.

I/O units 5054 (FIG. 25) provide the processor with means for attaching to peripheral devices including tape, disc, printers, displays, and networks for example. I/O units are often presented to the computer program by software drivers. In mainframes, such as the System z from IBM®, channel adapters and open system adapters are I/O units of the mainframe that provide the communications between the operating system and peripheral devices. In RISC servers, such as Power Systems from IBM®, proprietary adapters and open system adapters are I/O units that provide the communications between the operating system and peripheral devices.

Further, other types of computing environments can benefit from one or more aspects. As an example, an environment may include an emulator (e.g., software or other emulation mechanisms), in which a particular architecture (including, for instance, instruction execution, architected functions, such as address translation, and architected registers) or a subset thereof is emulated (e.g., on a native computer system having a processor and memory). In such an environment, one or more emulation functions of the emulator can implement one or more embodiments, even though a computer executing the emulator may have a different architecture than the capabilities being emulated. As one example, in emulation mode, the specific instruction or operation being emulated is decoded, and an appropriate emulation function is built to implement the individual instruction or operation.

In an emulation environment, a host computer includes, for instance, a memory to store instructions and data; an instruction fetch unit to fetch instructions from memory and to optionally, provide local buffering for the fetched instruction; an instruction decode unit to receive the fetched instructions and to determine the type of instructions that have been fetched; and an instruction execution unit to execute the instructions. Execution may include loading data into a register from memory; storing data back to memory from a register; or performing some type of arithmetic or logical operation, as determined by the decode unit. In one example, each unit is implemented in software. For instance, the operations being performed by the units are implemented as one or more subroutines within emulator software.

More particularly, in a mainframe, architected machine instructions are used by programmers, usually today "C" programmers, often by way of a compiler application. These instructions stored in the storage medium may be executed natively in a Power Systems or a z/Architecture IBM® Server, or alternatively in machines executing other architectures. They can be emulated in the existing and in future IBM® mainframe servers, Power Systems servers and on other machines of IBM® (e.g., System x Servers). They can be executed in machines running Linux on a wide variety of machines using hardware manufactured by IBM®, Intel®, AMD, and others. Besides execution on that hardware under a Power Architecture or z/Architecture, Linux can be used as well as machines which use emulation by Hercules, UMX, or FSI (Fundamental Software, Inc), where generally execution is in an emulation mode. In emulation mode, emulation software is executed by a native processor to emulate the architecture of an emulated processor.

The native processor typically executes emulation software comprising either firmware or a native operating system to perform emulation of the emulated processor. The emulation software is responsible for fetching and executing instructions of the emulated processor architecture. The emulation software maintains an emulated program counter to keep track of instruction boundaries. The emulation software may fetch one or more emulated machine instructions at a time and convert the one or more emulated machine instructions to a corresponding group of native machine instructions for execution by the native processor. These converted instructions may be cached such that a faster conversion can be accomplished. Notwithstanding, the emulation software is to maintain the architecture rules of the emulated processor architecture so as to assure operating systems and applications written for the emulated processor operate correctly. Furthermore, the emulation software is to provide resources identified by the emulated processor architecture including, but not limited to, control registers, general purpose registers, floating point registers, dynamic address translation function including segment tables and page tables for example, interrupt mechanisms, context switch mechanisms, Time of Day (TOD) clocks and architected interfaces to I/O subsystems such that an operating system or an application program designed to run on the emulated processor, can be run on the native processor having the emulation software.

A specific instruction being emulated is decoded, and a subroutine is called to perform the function of the individual instruction. An emulation software function emulating a function of an emulated processor is implemented, for example, in a "C" subroutine or driver, or some other method of providing a driver for the specific hardware as will be within the skill of those in the art after understanding the description of the preferred embodiment. Various software and hardware emulation patents including, but not limited to U.S. Pat. No. 5,551,013, entitled "Multiprocessor for Hardware Emulation", by Beausoleil et al.; and U.S. Pat. No. 6,009,261, entitled "Preprocessing of Stored Target Routines for Emulating Incompatible Instructions on a Target Processor", by Scalzi et al; and U.S. Pat. No. 5,574,873, entitled "Decoding Guest Instruction to Directly Access Emulation Routines that Emulate the Guest Instructions", by Davidian et al; and U.S. Pat. No. 6,308,255, entitled "Symmetrical Multiprocessing Bus and Chipset Used for Coprocessor Support Allowing Non-Native Code to Run in a System", by Gorishek et al; and U.S. Pat. No. 6,463,582, entitled "Dynamic Optimizing Object Code Translator for Architecture Emulation and Dynamic Optimizing Object Code Translation Method", by Lethin et al; and U.S. Pat. No. 5,790,825, entitled "Method for Emulating Guest Instructions on a Host Computer Through Dynamic Recompilation of Host Instructions", by Eric Traut, each of which is hereby incorporated herein by reference in its entirety; and many others, illustrate a variety of known ways to achieve emulation of an instruction format architected for a different machine for a target machine available to those skilled in the art.

Figure 27:
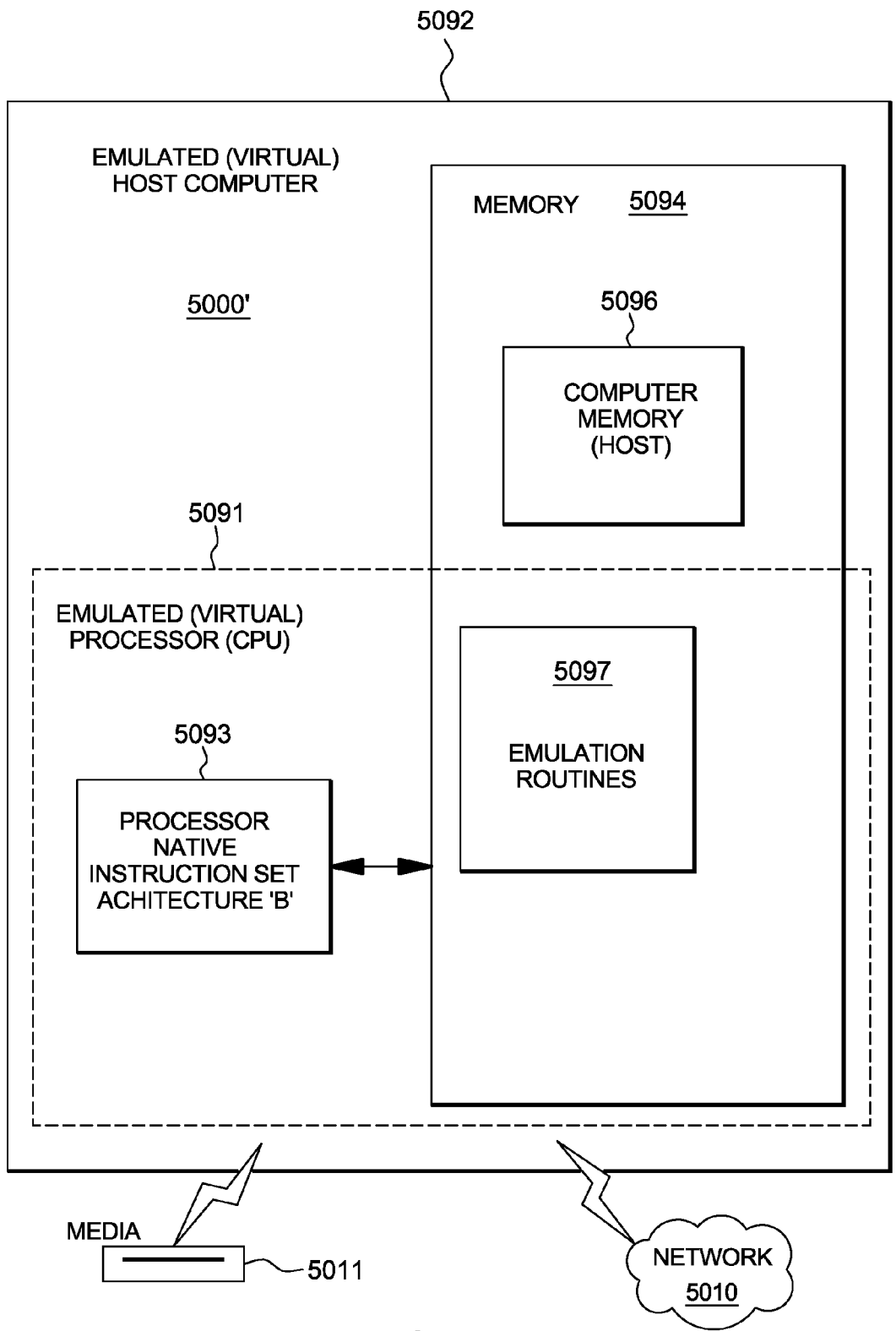
FIG. 27 depicts one embodiment of an emulated host computer system.

In FIG. 27, an example of an emulated host computer system 5092 is provided that emulates a host computer system 5000' of a host architecture. In the emulated host computer system 5092, the host processor (CPU) 5091 is an emulated host processor (or virtual host processor) and comprises an emulation processor 5093 having a different native instruction set architecture than that of the processor 5091 of the host computer 5000'. The emulated host computer system 5092 has memory 5094 accessible to the emulation processor 5093. In the example embodiment, the memory 5094 is partitioned into a host computer memory 5096 portion and an emulation routines 5097 portion. The host computer memory 5096 is available to programs of the emulated host computer 5092 according to host computer architecture. The emulation processor 5093 executes native instructions of an architected instruction set of an architecture other than that of the emulated processor 5091, the native instructions obtained from emulation routines memory 5097, and may access a host instruction for execution from a program in host computer memory 5096 by employing one or more instruction(s) obtained in a sequence & access/decode routine which may decode the host instruction(s) accessed to determine a native instruction execution routine for emulating the function of the host instruction accessed. Other facilities that are defined for the host computer system 5000' architecture may be emulated by architected facilities routines, including such facilities as general purpose registers, control registers, dynamic address translation and I/O subsystem support and processor cache, for example. The emulation routines may also take advantage of functions available in the emulation processor 5093 (such as general registers and dynamic translation of virtual addresses) to improve performance of the emulation routines. Special hardware and off-load engines may also be provided to assist the processor 5093 in emulating the function of the host computer 5000'.

In a further embodiment, one or more aspects relate to cloud computing. It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes.

Figure 28:
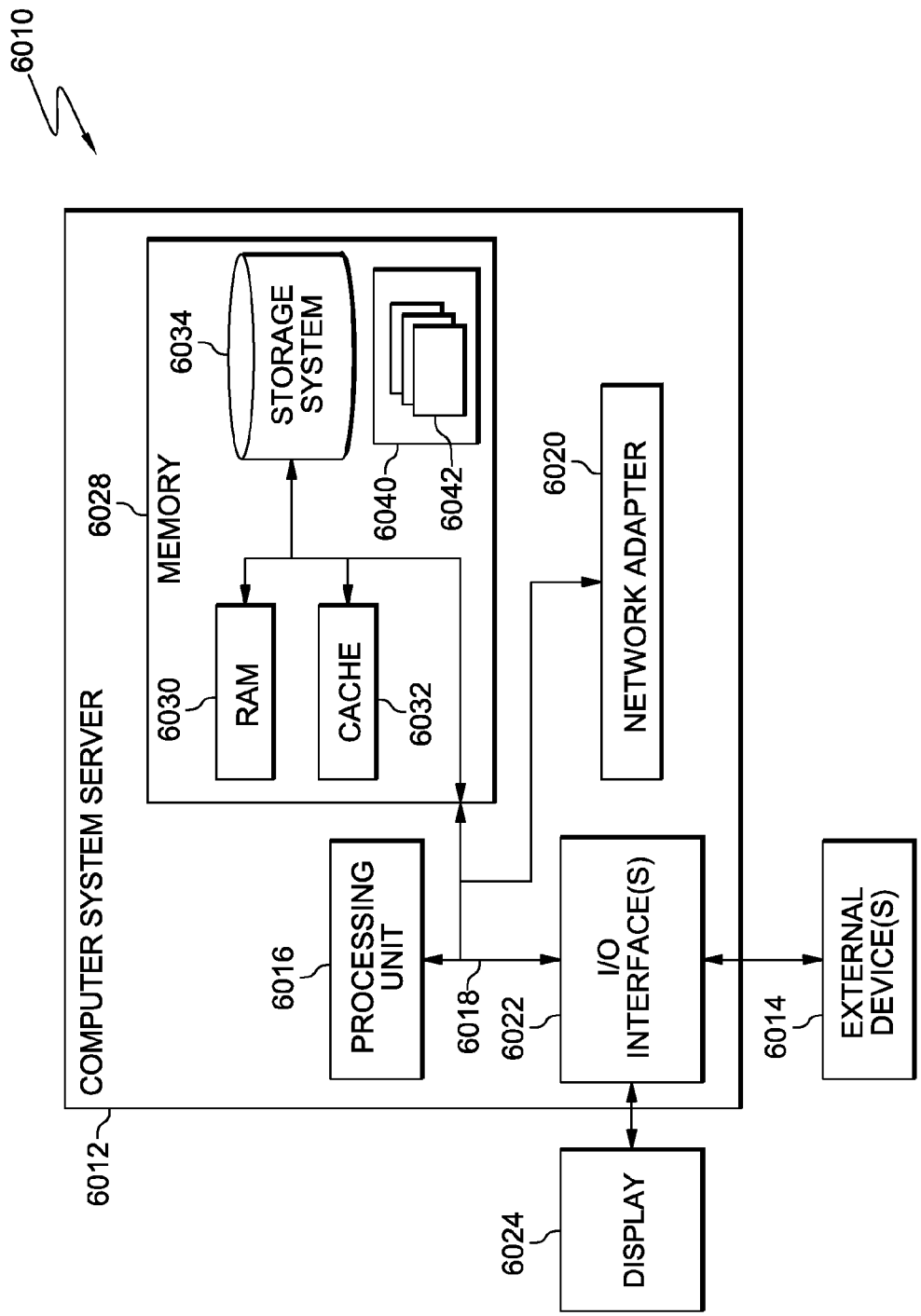
FIG. 28 depicts one embodiment of a cloud computing node.

Referring now to FIG. 28, a schematic of an example of a cloud computing node is shown. Cloud computing node 6010 is only one example of a suitable cloud computing node and is not intended to suggest any limitation as to the scope of use or functionality of embodiments of the invention described herein. Regardless, cloud computing node 6010 is capable of being implemented and/or performing any of the functionality set forth hereinabove.

In cloud computing node 6010 there is a computer system/server 6012, which is operational with numerous other general purpose or special purpose computing system environments or configurations. Examples of well-known computing systems, environments, and/or configurations that may be suitable for use with computer system/server 6012 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 6012 may be described in the general context of computer system executable instructions, such as program modules, being executed by a computer system. Generally, program modules may include routines, programs, objects, components, logic, data structures, and so on that perform particular tasks or implement particular abstract data types. Computer system/server 6012 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 28, computer system/server 6012 in cloud computing node 6010 is shown in the form of a general-purpose computing device. The components of computer system/server 6012 may include, but are not limited to, one or more processors or processing units 6016, a system memory 6028, and a bus 6018 that couples various system components including system memory 6028 to processor 6016.

Bus 6018 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 6012 typically includes a variety of computer system readable media. Such media may be any available media that is accessible by computer system/server 6012, and it includes both volatile and non-volatile media, removable and non-removable media.

System memory 6028 can include computer system readable media in the form of volatile memory, such as random access memory (RAM) 6030 and/or cache memory 6032. Computer system/server 6012 may further include other removable/non-removable, volatile/non-volatile computer system storage media. By way of example only, storage system 6034 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 6018 by one or more data media interfaces. As will be further depicted and described below, memory 6028 may include at least one program product having a set (e.g., at least one) of program modules that are configured to carry out the functions of embodiments of the invention.

Program/utility 6040, having a set (at least one) of program modules 6042, may be stored in memory 6028 by way of example, and not limitation, as well as an operating system, one or more application programs, other program modules, and program data. Each of the operating system, one or more application programs, other program modules, and program data or some combination thereof, may include an implementation of a networking environment. Program modules 6042 generally carry out the functions and/or methodologies of embodiments of the invention as described herein.

Computer system/server 6012 may also communicate with one or more external devices 6014 such as a keyboard, a pointing device, a display 6024, etc.; one or more devices that enable a user to interact with computer system/server 6012; and/or any devices (e.g., network card, modem, etc.) that enable computer system/server 6012 to communicate with one or more other computing devices. Such communication can occur via Input/Output (I/O) interfaces 6022. Still yet, computer system/server 6012 can communicate with one or more networks such as a local area network (LAN), a general wide area network (WAN), and/or a public network (e.g., the Internet) via network adapter 6020. As depicted, network adapter 6020 communicates with the other components of computer system/server 6012 via bus 6018. It should be understood that although not shown, other hardware and/or software components could be used in conjunction with computer system/server 6012. Examples, include, but are not limited to: microcode, device drivers, redundant processing units, external disk drive arrays, RAID systems, tape drives, and data archival storage systems, etc.

Figure 29:
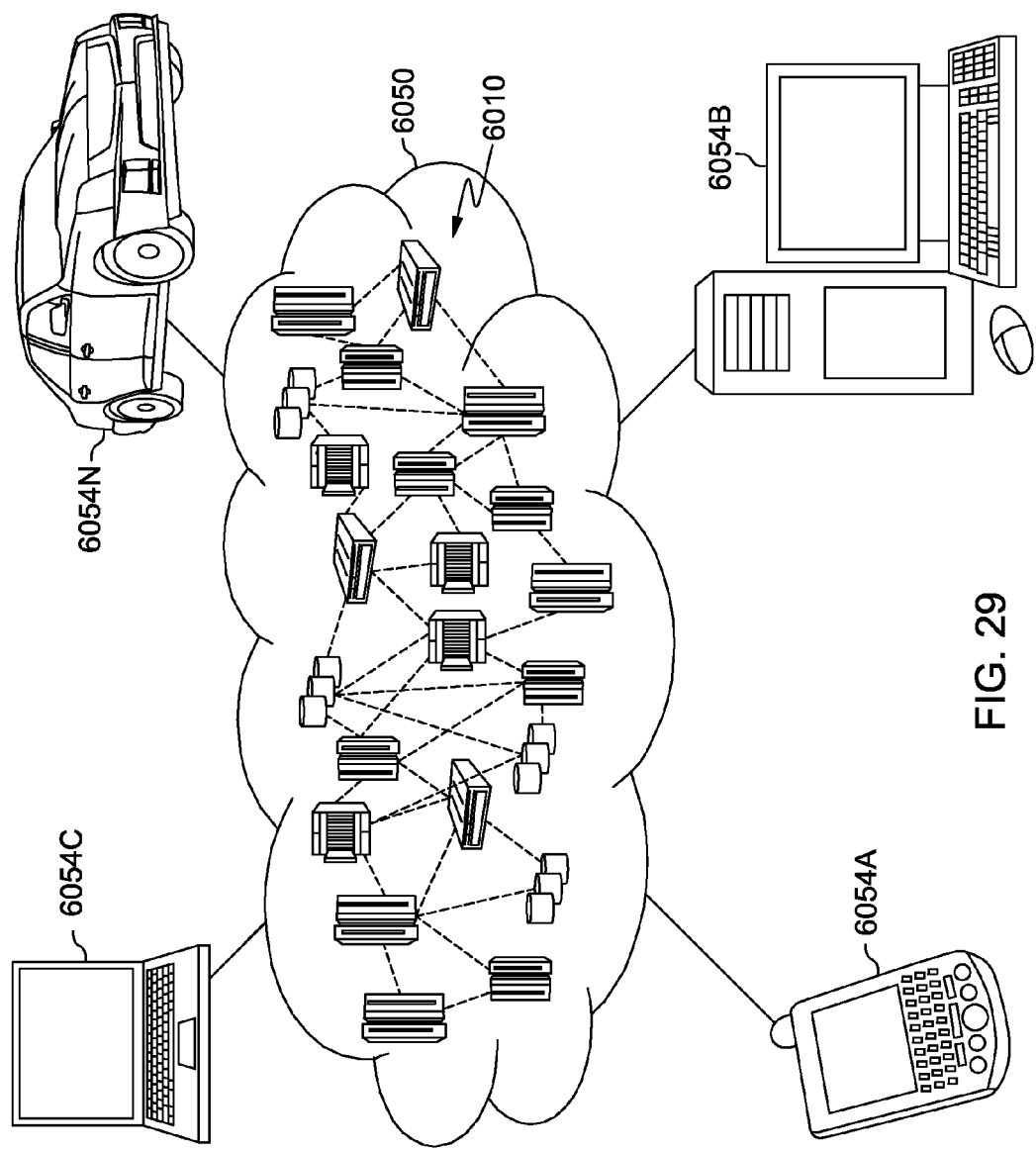
FIG. 29 depicts on embodiment of a cloud computing environment.

Referring now to FIG. 29, illustrative cloud computing environment 6050 is depicted. As shown, cloud computing environment 6050 comprises one or more cloud computing nodes 6010 with which local computing devices used by cloud consumers, such as, for example, personal digital assistant (PDA) or cellular telephone 6054A, desktop computer 6054B, laptop computer 6054C, and/or automobile computer system 6054N may communicate. Nodes 6010 may communicate with one another. They may be grouped (not shown) physically or virtually, in one or more networks, such as Private, Community, Public, or Hybrid clouds as described hereinabove, or a combination thereof. This allows cloud computing environment 6050 to offer infrastructure, platforms and/or software as services for which a cloud consumer does not need to maintain resources on a local computing device. It is understood that the types of computing devices 6054A-N shown in FIG. 29 are intended to be illustrative only and that computing nodes 6010 and cloud computing environment 6050 can communicate with any type of computerized device over any type of network and/or network addressable connection (e.g., using a web browser).

Figure 30:
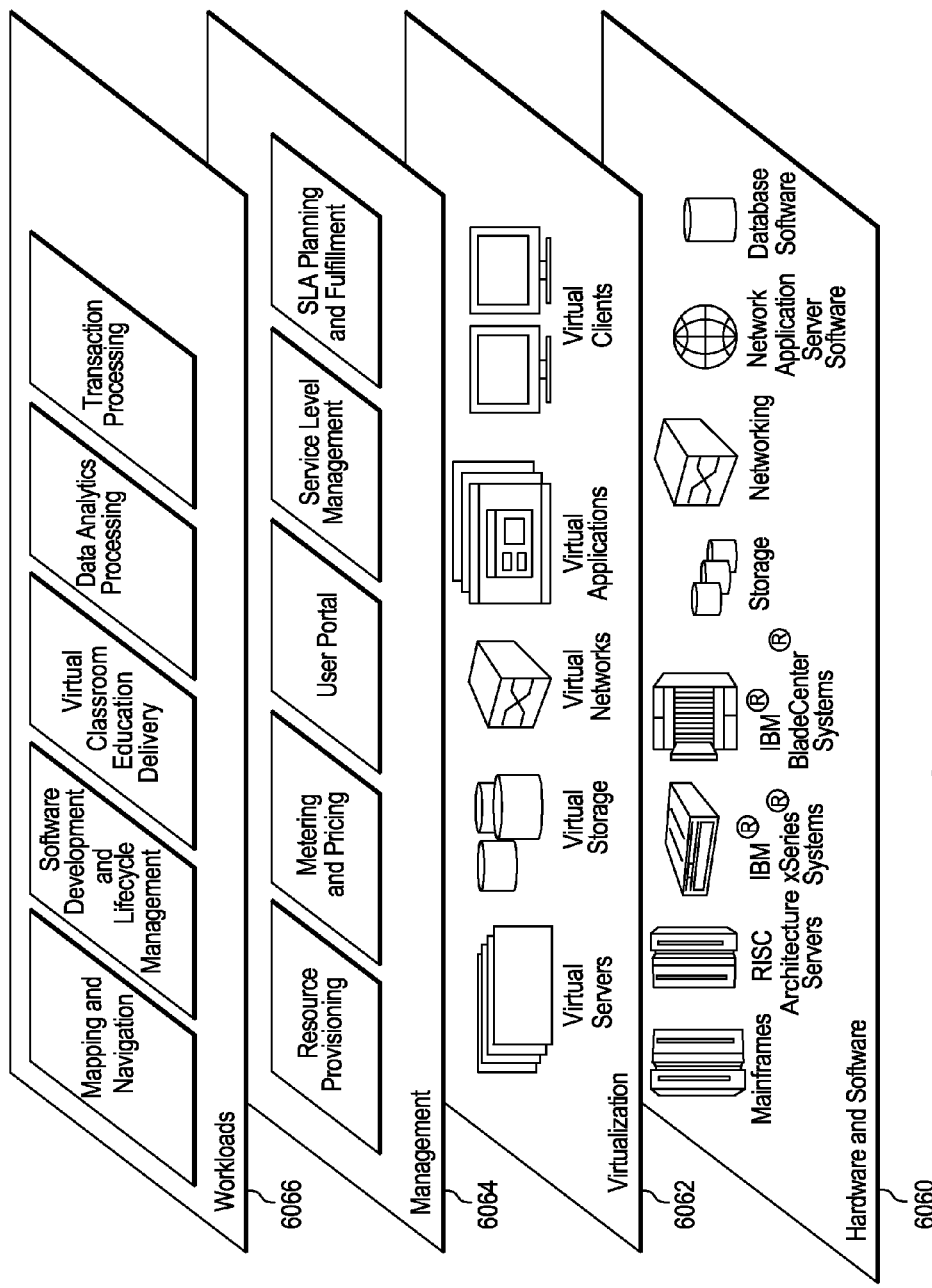
FIG. 30 depicts one example of abstraction model layers.

Referring now to FIG. 30, a set of functional abstraction layers provided by cloud computing environment 6050 (FIG. 29) is shown. It should be understood in advance that the components, layers, and functions shown in FIG. 30 are intended to be illustrative only and embodiments of the invention are not limited thereto. As depicted, the following layers and corresponding functions are provided:

Hardware and software layer 6060 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 6062 provides an abstraction layer from which the following examples of virtual entities may be provided: virtual servers; virtual storage; virtual networks, including virtual private networks; virtual applications and operating systems; and virtual clients.

In one example, management layer 6064 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 6066 provides examples of functionality for which the cloud computing environment may be utilized. Examples of workloads and functions which may be provided from this layer include: mapping and navigation; software development and lifecycle management; virtual classroom education delivery; data analytics processing; and transaction processing.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A method of facilitating address translation in a computing environment, said method comprising:
    obtaining, by a processor, information from an address translation structure comprising a segment lookaside buffer with a plurality of entries, wherein each entry comprises an attribute field indicating whether the entry can be utilized to translate a first address for a data access or for an instruction fetch, to be used to translate the first address to a second address, the first address being of a first address type and the second address being of a second address type, the address translation structure comprising a first set of information comprising a first entry of the plurality of entries to translate the first address to one address of the second address type and a second set of information comprising a second entry of the plurality of entries to translate the first address to another address of the second address type, the first set of information and the second set of information concurrently stored within the address translation structure to provide multiple addresses of the second address type to which the first address can be translated, and wherein the obtaining the information to be used to translate the first address comprises selecting, based on an attribute of the first address, wherein the attribute indicates whether to translate the first address for a data access or for an instruction fetch, the first set of information or the second set of information as the information obtained to be used to translate the first address to the second address, wherein the first address type comprises an effective address or a virtual address and the second address type comprises the virtual address or a real address; and
    translating the first address to the second address using the information obtained from the address translation structure, the second address being the one address of the second address type or the another address of the second address type depending on the information obtained.

2. The method of claim 1, wherein the attribute field comprises a first attribute indicator indicating whether the first set of information is to be used to translate the first address in the first set of information, and the attribute field comprises a second attribute indicator indicating whether the second set of information is to be used to translate the first address in the second set of information.

3. The method of claim 2, wherein the plurality of entries comprise, one entry comprising the first set of information including the first attribute indicator, another entry comprising the second set of information including the second attribute indicator, and one or more other entries comprising other sets of information including other attribute indicators, wherein a selected entry of the one or more other entries includes a selected attribute indicator indicating the selected information is to be used to translate an address regardless of the attribute of the address.

4. The method of claim 1, wherein the first type of address comprises an effective address, the second type of address comprises a virtual address.

5. The method of claim 1, wherein the attribute comprises one of an address translation for an instruction fetch or an address translation for a data access.

6. The method of claim 1, further comprising:
    translating the second address to a third address using another address translation structure; and
    storing the third address and the attribute of the first address in a further address translation structure.

7. The method of claim 6, wherein the translating the second address to the third address is independent of the attribute of the first address.

8. The method of claim 1, wherein the first type of address comprises a virtual address, the second type of address comprises a physical address, and the address translation structure comprises a translation lookaside buffer.

9. The method of claim 1, wherein the first address is one of a guest address or a host address to be translated to the second address.

* * * * *